US009019909B2

(12) United States Patent
Rinne et al.

(10) Patent No.: US 9,019,909 B2
(45) Date of Patent: Apr. 28, 2015

(54) METHOD, APPARATUS, AND COMPUTER PROGRAM PRODUCT FOR COEXISTENCE MANAGEMENT

(75) Inventors: Mika Rinne, Espoo (FI); Mikko Uusitalo, Helsinki (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 419 days.

(21) Appl. No.: 13/311,779

(22) Filed: Dec. 6, 2011

(65) Prior Publication Data

US 2013/0142129 A1   Jun. 6, 2013

(51) Int. Cl.
*H04W 4/00* (2009.01)
*H04W 24/00* (2009.01)
*H04W 52/36* (2009.01)
*H04W 28/18* (2009.01)
*H04W 16/14* (2009.01)

(52) U.S. Cl.
CPC .............. *H04W 4/001* (2013.01); *H04W 24/00* (2013.01); *H04W 28/18* (2013.01); *H04W 52/367* (2013.01); *H04W 16/14* (2013.01)

(58) Field of Classification Search
CPC ............... H04L 27/0006; H04N 21/00; H04N 2021/00; H04W 16/14; H04W 24/00; H04W 28/04; H04W 72/04
USPC ......... 370/329, 310; 709/219; 455/425, 556.1
See application file for complete search history.

(56) References Cited

U.S. PATENT DOCUMENTS

| | | | |
|---|---|---|---|
| 7,826,459 B2 | 11/2010 | Xhafa et al. | |
| 7,830,907 B1 | 11/2010 | Petranovich et al. | |
| 7,856,008 B2 | 12/2010 | Ayyagari et al. | |
| 7,915,867 B1 | 3/2011 | Bulthaup et al. | |
| 7,953,412 B2 | 5/2011 | Lee et al. | |
| 7,983,216 B2 | 7/2011 | Iyer et al. | |
| 8,068,440 B2 | 11/2011 | Stanwood et al. | |

(Continued)

FOREIGN PATENT DOCUMENTS

| | | |
|---|---|---|
| EP | 1863303 | 12/2007 |
| EP | 1 883 258 | 1/2008 |

(Continued)

OTHER PUBLICATIONS

"Part 15.2: Coexistence of Wireless Personal Area Networks with Other Wireless Devices Operating in Unlicensed Frequency Bands" Mar. 24, 2003, IEEE, Inc.

(Continued)

*Primary Examiner* — Jung Park
*Assistant Examiner* — Chuong M Nguyen
(74) *Attorney, Agent, or Firm* — Locke Lord LLP

(57) ABSTRACT

Method, apparatus, and computer program product embodiments are disclosed to provide a wireless device with suitable operating parameters for wireless resource sharing with heterogeneous wireless networks to enable coexistence of secondary networks in a shared band environment. An example embodiment includes a method, comprising: receiving a request from a wireless network, requesting device management information for coexistence within an unassigned frequency band with zero or more neighboring wireless networks of the wireless network; and providing the requested device management information for the wireless network, based on at least location of the wireless network, the device management information including at least allowed frequency and transmission power.

26 Claims, 38 Drawing Sheets

(56) References Cited

U.S. PATENT DOCUMENTS

| | | | |
|---|---|---|---|
| 8,165,106 B2 | 4/2012 | Yang et al. | |
| 8,194,549 B2 | 6/2012 | Huber et al. | |
| 8,300,624 B2 | 10/2012 | Zeller et al. | |
| 8,363,579 B2 | 1/2013 | Li et al. | |
| 8,379,551 B2 | 2/2013 | Wietfeldt et al. | |
| 8,451,789 B2 * | 5/2013 | Junell et al. | 370/329 |
| 2003/0058829 A1 | 3/2003 | Batra | |
| 2005/0027871 A1 | 2/2005 | Bradley et al. | |
| 2005/0286466 A1 * | 12/2005 | Tagg et al. | 370/329 |
| 2006/0002326 A1 | 1/2006 | Vesuna | |
| 2006/0034217 A1 | 2/2006 | Kwon et al. | |
| 2006/0286986 A1 | 12/2006 | Kim et al. | |
| 2007/0086426 A1 | 4/2007 | Bonta et al. | |
| 2007/0135162 A1 * | 6/2007 | Banerjea et al. | 455/556.1 |
| 2007/0161364 A1 | 7/2007 | Surineni et al. | |
| 2007/0192158 A1 * | 8/2007 | Kim | 705/9 |
| 2007/0207800 A1 * | 9/2007 | Daley et al. | 455/425 |
| 2007/0254596 A1 | 11/2007 | Corson et al. | |
| 2007/0274273 A1 | 11/2007 | Grushkevich et al. | |
| 2008/0040452 A1 * | 2/2008 | Rao et al. | 709/219 |
| 2008/0043705 A1 | 2/2008 | Desai et al. | |
| 2008/0089279 A1 | 4/2008 | Hu et al. | |
| 2008/0108363 A1 | 5/2008 | Yu et al. | |
| 2008/0108365 A1 | 5/2008 | Buddhikot et al. | |
| 2008/0137627 A1 | 6/2008 | Fischer et al. | |
| 2008/0159258 A1 | 7/2008 | Ji et al. | |
| 2008/0192806 A1 | 8/2008 | Wyper et al. | |
| 2008/0228878 A1 | 9/2008 | Wu et al. | |
| 2008/0233875 A1 | 9/2008 | Desai et al. | |
| 2008/0253341 A1 | 10/2008 | Cordeiro et al. | |
| 2008/0261639 A1 | 10/2008 | Sun et al. | |
| 2008/0268892 A1 | 10/2008 | Hamdi et al. | |
| 2008/0285525 A1 | 11/2008 | Hu | |
| 2008/0298310 A1 | 12/2008 | Hu | |
| 2009/0040937 A1 | 2/2009 | Xhafa et al. | |
| 2009/0059856 A1 | 3/2009 | Kermoal et al. | |
| 2009/0122755 A1 | 5/2009 | Seok et al. | |
| 2009/0149208 A1 | 6/2009 | Huttunen et al. | |
| 2009/0161614 A1 | 6/2009 | Grandblaise et al. | |
| 2009/0196180 A1 | 8/2009 | Bahl et al. | |
| 2009/0197627 A1 | 8/2009 | Kuffner et al. | |
| 2009/0225717 A1 | 9/2009 | Banerjea | |
| 2009/0247201 A1 | 10/2009 | Ye et al. | |
| 2009/0279449 A1 | 11/2009 | Kneckt et al. | |
| 2009/0279491 A1 | 11/2009 | Kim et al. | |
| 2009/0298522 A1 | 12/2009 | Chaudhri et al. | |
| 2010/0002608 A1 | 1/2010 | Goldhamer | |
| 2010/0046440 A1 | 2/2010 | Singh | |
| 2010/0087216 A1 | 4/2010 | Ko et al. | |
| 2010/0091735 A1 | 4/2010 | Kim et al. | |
| 2010/0097950 A1 | 4/2010 | Jeon | |
| 2010/0097952 A1 | 4/2010 | McHenry et al. | |
| 2010/0142463 A1 | 6/2010 | Hu | |
| 2010/0220676 A1 | 9/2010 | Grandblaise et al. | |
| 2010/0220687 A1 | 9/2010 | Reznik et al. | |
| 2010/0232380 A1 | 9/2010 | Choi et al. | |
| 2010/0248631 A1 | 9/2010 | Chaudhri et al. | |
| 2010/0273426 A1 | 10/2010 | Walley et al. | |
| 2010/0304685 A1 | 12/2010 | Wietfeldt et al. | |
| 2010/0309317 A1 | 12/2010 | Wu et al. | |
| 2010/0309806 A1 | 12/2010 | Wu et al. | |
| 2010/0331029 A1 | 12/2010 | Linsky et al. | |
| 2011/0039554 A1 | 2/2011 | Bims | |
| 2011/0090887 A1 | 4/2011 | Kim et al. | |
| 2011/0090890 A1 | 4/2011 | Seok et al. | |
| 2011/0116488 A1 | 5/2011 | Grandhi | |
| 2011/0179174 A1 | 7/2011 | Kasslin et al. | |
| 2011/0199989 A1 | 8/2011 | Wietfeldt et al. | |
| 2011/0207411 A1 | 8/2011 | Phillips | |
| 2011/0222493 A1 | 9/2011 | Mangold et al. | |
| 2011/0243094 A1 | 10/2011 | Dayal et al. | |
| 2011/0250857 A1 | 10/2011 | Reial et al. | |
| 2011/0250921 A1 | 10/2011 | Reial | |
| 2011/0287802 A1 | 11/2011 | Ma et al. | |
| 2011/0305206 A1 | 12/2011 | Junell et al. | |
| 2011/0310767 A1 | 12/2011 | Hu | |
| 2012/0057533 A1 | 3/2012 | Junell et al. | |
| 2012/0069746 A1 | 3/2012 | Park | |
| 2012/0077506 A1 | 3/2012 | Wietfeldt et al. | |
| 2012/0094681 A1 | 4/2012 | Freda et al. | |
| 2012/0106512 A1 | 5/2012 | Banerjea et al. | |
| 2012/0127011 A1 | 5/2012 | Lee et al. | |
| 2012/0134328 A1 | 5/2012 | Gauvreau et al. | |
| 2012/0182883 A1 | 7/2012 | Junell et al. | |
| 2012/0195269 A1 | 8/2012 | Kang et al. | |
| 2012/0201209 A1 | 8/2012 | Lee et al. | |
| 2012/0225662 A1 | 9/2012 | Jo et al. | |
| 2012/0329384 A1 * | 12/2012 | Boldyrev et al. | 455/39 |
| 2013/0155995 A1 * | 6/2013 | Jo et al. | 370/329 |

FOREIGN PATENT DOCUMENTS

| | | |
|---|---|---|
| EP | 2083591 | 7/2009 |
| GB | 2461724 | 1/2010 |
| JP | 2009153136 | 7/2009 |
| JP | 2012147256 | 8/2012 |
| JP | 201229177 | 9/2012 |
| WO | WO03/001742 | 1/2003 |
| WO | WO 2005/045689 | 5/2005 |
| WO | 2006/132487 A1 | 12/2006 |
| WO | 2007/031958 A2 | 3/2007 |
| WO | WO2010/027308 | 3/2010 |
| WO | WO2010/043270 | 4/2010 |
| WO | WO2011022506 | 2/2011 |
| WO | WO 2012028769 | 3/2012 |
| WO | WO 2012030174 | 3/2012 |
| WO | WO 2012051303 | 4/2012 |

OTHER PUBLICATIONS

J. Zhu, et al., Multi-Radio Coexistence: Challenges and Opportunities; "Proceedings—16th International Conference on Computer Communications and Networks", Aug. 3, 2007; pp. 358-364.

IEEE 802.15.2 (Part 15.2: Coexistence of Wireless Personal Area Networks with Other Wireless Devices Operating in Unlicensed Frequency Bands, dated Mar. 24, 2003; hereinafter IEEE 802.15.2.

Zhu et al (Proceedings—16th International Conference on Computer Communications and Networks, paper submitted "Multi-Radio Coexistence: Challenges and Opportunities" dated Aug. 13-16, 2007.

Extended European Search Report for Application No. 13154998.2-1854, completed Jun. 5, 2013.

Extended European Search Report for Application No. 13155031.1-1854, completed Jun. 6, 2013.

European Search Report dated Jun. 27, 2012 for European Application No. 12155105.5-1525.

Karama Hamdi, et al., "Power Control in Cognitive Radio Systems Based on Spectrum Sensing Side Information", Proc. IEEE International Conference on Communications (ICC'07), pp. 5161-5165, Jun. 2007.

Ian F. Akyildiz, et al. "A Survey on Spectrum Management in Cognitive Radio Networks", IEEE Communications Magazine • Apr. 2008, pp. 40-48.

Dong In Kim, et al., "Joint Rate and Power Allocation for Cognitive Radios in Dynamic Spectrum Access Environment", IEEE Transactions on Wireless Communications, vol. 7, No. 12, Dec. 2008, pp. 5517-5527.

Fabrizio Granelli, et al., "Standardization and Research in Cognitive and Dynamic Spectrum Access Networks: IEEE SCC41 Efforts and Other Activities", IEEE Communications Magazine • Jan. 2010, pp. 71-79.

Zander, "Can We Find (and Use) "Spectrum Holes"? Spectrum Sensing and Spatial Reuse Opportunities in "Cognitive" Radio Systems", Vehicular Technology Conference, 2009. VTC Spring 2009. IEEE 69th, Date: Apr. 26-29, 2009, pp. 1-5.

H. Harada, "Research and development on cognitive and software radio technologies—Devices and hardware platform—General assembly of URSI," Aug. 2008., 4pp.

A. Mody et al., "A Survey of IEEE Standards Supporting Cognitive Radio and Dynamic Spectrum Access" IEEE, 978-1-4244-2677-5/08, pp. 1-7.

(56) References Cited

OTHER PUBLICATIONS

R. Venkatesha Prasad et al., "Cognitive Functionality in Next Generation Wireless Networks: Standardization Efforts", IEEE Communications Magazine, Apr. 2008, pp. 72-78.
J. Junell, et al.; IEEE P802.19, Wireless Coexistence, Proposal on coexistence system services and protocols; Nov. 7, 2010, XP002681996; pp. 1-46.
J. Junell, et al.; Coexistence for unlicensed spectrum users in white spaces; Applied Sciences in Biomedical and Communication Technologies (ISABEL); 3rd International Symposium on, IEEE; Nov. 7, 2010, pp. 1-5.
Extended European Search Report dated Aug. 30, 2012 for EP Application No. 12162039.7-1525.
International Search Report for International Application No. PCT/FI2012/050522 mailed Sep. 25, 2012.
Baykas, T et al. Developing a standard for TV white space coexistence: technical challenges and solution approaches. IEEE Wireless Communications, Feb. 1, 2012, pp. 10-22, ISSN 1536-1284. the whole document.
International Search Report for International Application No. PCT/FI2013/050717 mailed Nov. 5, 2013.
IEEE P802.15.2 Draft No. 09; Coexistence of Wireless Personal Area Networks with Other Wireless Devices Operating in Unlicensed Frequency Bands; Mar. 24, 2003, IEEE Inc. Standards.
J. Zhu, et al.,: Multi-Radio Coexistence: Challenges and Opportunities; Proceedings 16th International Conference on Computer Communications and Networks; Aug. 3, 2007, pp. 358-364.
Cavalcanti et al, "IEEE 802.22-07/0121 r1 : Proposed text changes to Section 6.21.2 Self-coexistence in IEEE 802.22/D0.2 Draft Standard" published in Mar. 2007.
Cordeiro et al, "Cognitive PHY and MAC Layers for Dynamic Spectrum Access and Sharing of TV Bands", published by ACM on Aug. 5, 2006.
International Search Report and Written Opinion mailed Mar. 14, 2012 in International Application Serial No. PCT/FI2011/051128, 15pp.
International Search Report and Written Opinion mailed Apr. 2, 2012 in International Application Serial No. PCT/FI2011/051127, 15pp.
P. Camarda et al., "An Exclusive Self-Coexistence (ESC) Resource Sharing Algorithm for Cognitive 802.22 Networks," 2010 5th International Symposium on Wireless Pervasive Computing (ISWPC), pp. 128-133.
International Search Report and Written Opinion mailed Dec. 12, 2011 for International Application Serial No. PCT/FI2011/050777, 12pp.
Ruuska P. et al. "P802.19 System Architecture", IEEE Mentor, IEEE Standards Association, doc.: IEEE 802.19-10/46r3, Mar. 17, 2010, [online], [retrieved on Dec. 1, 2011]. Retrieved from the Internet: <URL: https://mentor.ieee.org/802.19/documents>.
Harada et al., "Research, Development, and Standards Related Activities on Dynamic Spectrum Access and cognitive Radio", New Frontiers in Dynamic Spectrum, 2010 IEEE Symposium on Apr. 6, 2010, IEEE, Piscataway, NJ, USA.
Akyildiz I. et al., "Next Generation/Dynamic Spectrum Access/Cognitive Radio Wireless Networks: A survey", Sep. 15, 2006, Elsevier Science Publishers B.V., Amsterdam, NL, ISSN 1389-1286, pp. 2127-2159.
Japanese Office Action dated Feb. 21, 2014 for Japanese Application No. 2013-038446.
M. Kasslin; IEEE 802.19-10/0055r02; Wireless Coexistence; System Design Document; Mar. 18, 2010, p. 1-12.

J. C. Zuniga, et al; IEEE 802-SG-WhiteSpace-09/0032r4; Media Independent Coexistence; Mar. 11, 2009, p. 1-10.
H. Wang, et al; IEEE 802.19-0910034r3; Media Independent Coexistence for Devices in TV White Spaces; Jul. 10, 2009, p. 1-12.
T. Baykas, et al; IEEE 802.19-1010055r3, "Wireless Coexistence"—System Design Document; Mar. 18, 2010, p. 1-15.
M. Rahman; IEEE 802.19-10-0010-00-tvws; "Possible Coexistence Cases in TVWS and Topics to be Considered in P802.19.1"; Jan. 18, 2009; pp. 1-12.
M. Sherman, sg-whitespace-09-0055-00-0000, IEEE 802 Executive Committee Study Group on TV White Spaces, "TV Whitespace Tutorial Intro"; Mar. 10, 2009, 197 pp.
Mark Cummings, "Perspectives on Architecture for IEEE 802.19.1", Nov. 11, 2010, pp. 1-15.
S. Filin et al., P802.19.1 General Architecture, IEEE 802.19-10/0007, Jan. 16, 2010, pp. 1-9.
Minnie Ingersoll, "White Spaces Database", IEEE 802.19-09-/0047r0, Jul. 16, 2009, pp. 1-23.
Paine et al., "WhiteSpace Coexistence Use Cases", IEEE P802.19 Wireless Coexistence, IEEE 802.19-09126r4, Jul. 16, 2009, pp. 1-14.
Chen Sun et al., "TVWS Coexistence Use Cases", IEEE 802.19 DCN 19-10-0008-01-0000, pp. 1-14.
Dong Heon Lee et al., "Self-coexistence techniques for cognitive radio LANs/PANS", 21st Annual IEEE International Symposium on Personal Indoor and Mobile Radio Communications (PIMRC), Sep. 26, 2010, IEEE, Piscataway, NJ, USA, pp. 1516-1520, Chapter III B.
Ashraf, I. et al., "Impact of Interfering Bluetooth Piconets on a Collocated p-Persistent CSMA-Based VVLAN", IEEE Transactions on Vehicular Technology, vol. 58, No. 9, Nov. 1, 2009, pp. 4962-4975.
Asterjadhi, A. et al., "JENNA: A jamming Evasive Network-Coding Neighbor-Discovery Algorithm for Cognitive radio Networks", IEEE Wireless Communications, vol. 17, No. 4, Aug. 1, 2010, pp. 24-32.
Baykas, T., et al., "Overview of TV White Spaces: Current regulations, standards and coexistence between secondary users", 2010 IEEE 21st International Symposium on Personal, Indoor and Mobile Radio Communications Workshops (PIMRC Workshops), Sep. 26-30, 2010, Istanbul, Turkey, IEEE, Piscataway, NJ, USA, pp. 38-43.
Peha, J.M.: "Sharing Spectrum Through Spectrum Policy reform and Cognitive Radio", Proceedings of teh IEEE, vol. 97, No. 4, Apr. 1, 2009, pp. 708-719.
International Search Report mailed Nov. 29, 2011 in International Application Serial No. PCT/FI2011/050714, 13pp.
International Search Report and Written Opinion mailed Jul. 29, 2011 in International Application Serial No. PCT/FI2011/050266, 13pp.
International Search Report for International Application No. PCT/FI20111050591 dated Sep. 3, 2011.
International Search Report issued Oct. 11, 2011 in International Serial No. PCT/FI2011/050703, 13pp.
U.S. Appl. No. 13/006,857, filed Jan. 14, 2011, Junell et al.
U.S. Appl. No. 13/006,802, filed Jan. 14, 2011, Junell et al.
U.S. Appl. No. 12/875,187, filed Sep. 3, 2010, Junell et al.
U.S. Appl. No. 12/875,183, filed Sep. 3, 2010, Junell et al.
U.S. Appl. No. 13/041,613, filed Mar. 7, 2011, Kasslin et al.
U.S. Appl. No. 12/915,141, filed Oct. 29, 2010, Kasslin et al.
U.S. Appl. No. 12/915,154, filed Oct. 29, 2010, Kasslin et al.
U.S. Appl. No. 13/019,615, filed Feb. 2, 2011, Junell et al.
U.S. Appl. No. 12/815,620, filed Jun. 15, 2010, Junell et al.
U.S. Appl. No. 13/100,734, filed May 4, 2011, Jari Junell.
U.S. Appl. No. 13/184,643, filed Jul. 18, 2011, Kasslin, et al.

* cited by examiner

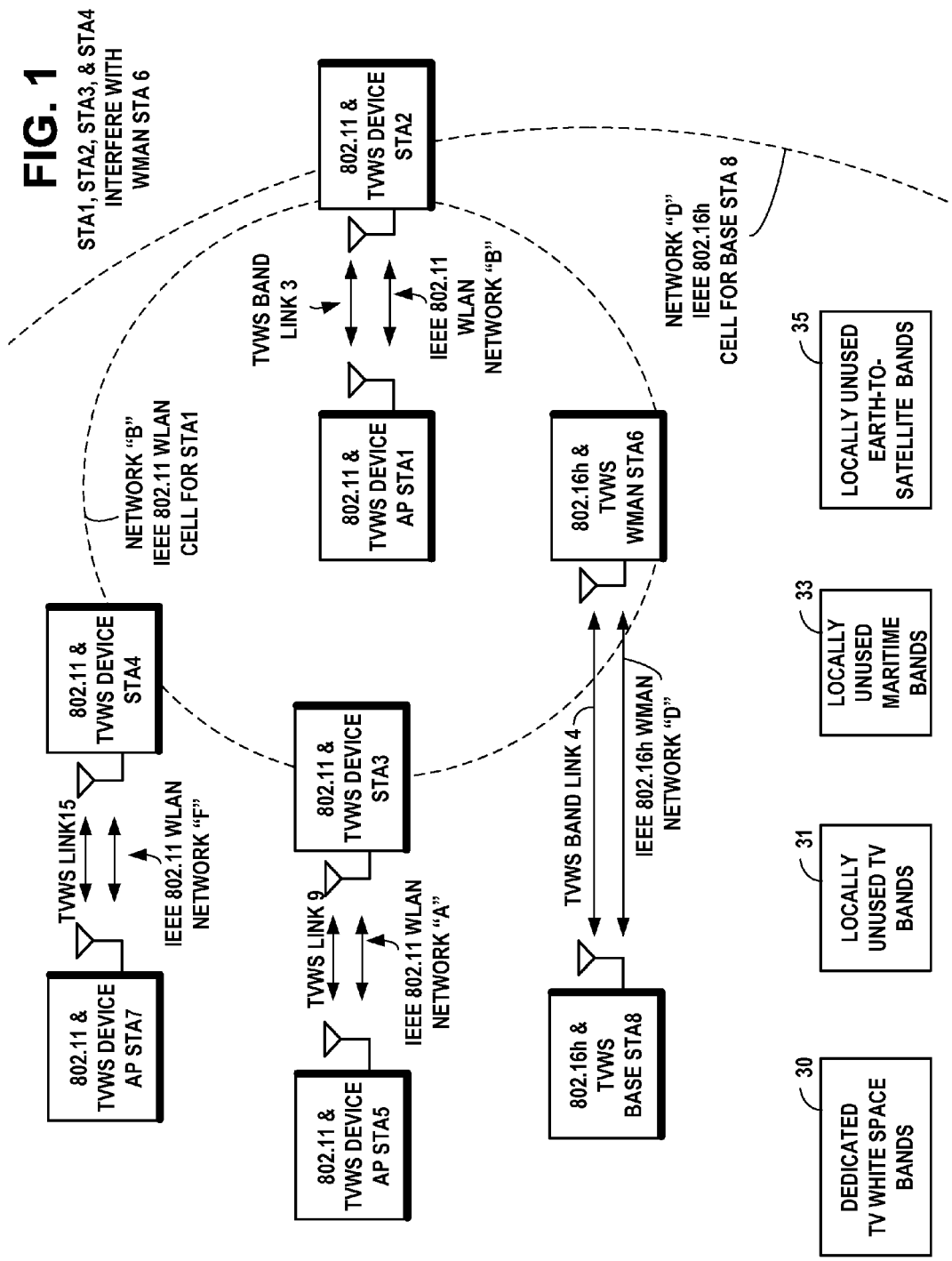

FIG. 1E

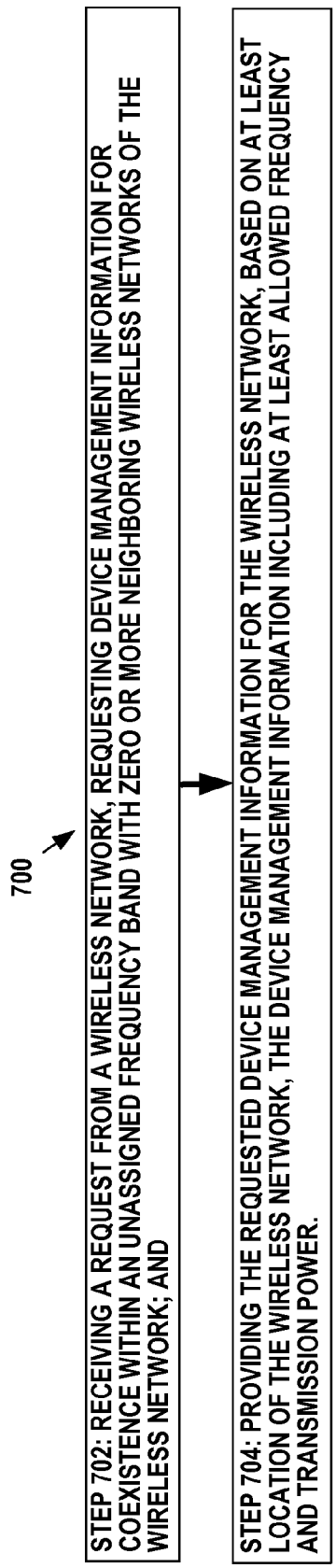

STEP 702: RECEIVING A REQUEST FROM A WIRELESS NETWORK, REQUESTING DEVICE MANAGEMENT INFORMATION FOR COEXISTENCE WITHIN AN UNASSIGNED FREQUENCY BAND WITH ZERO OR MORE NEIGHBORING WIRELESS NETWORKS OF THE WIRELESS NETWORK; AND

STEP 704: PROVIDING THE REQUESTED DEVICE MANAGEMENT INFORMATION FOR THE WIRELESS NETWORK, BASED ON AT LEAST LOCATION OF THE WIRELESS NETWORK, THE DEVICE MANAGEMENT INFORMATION INCLUDING AT LEAST ALLOWED FREQUENCY AND TRANSMISSION POWER.

FIG. 1F

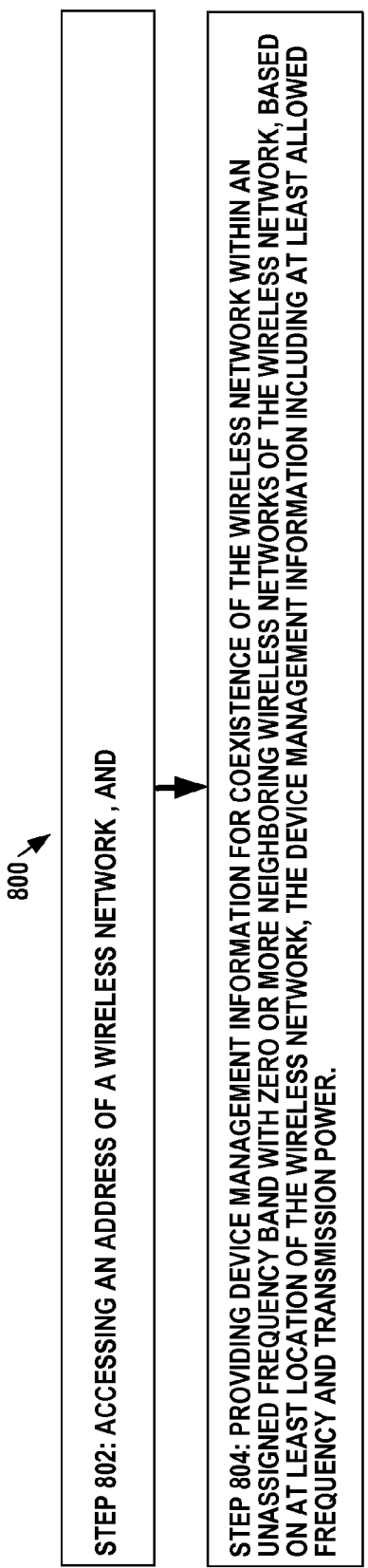

STEP 802: ACCESSING AN ADDRESS OF A WIRELESS NETWORK, AND

STEP 804: PROVIDING DEVICE MANAGEMENT INFORMATION FOR COEXISTENCE OF THE WIRELESS NETWORK WITHIN AN UNASSIGNED FREQUENCY BAND WITH ZERO OR MORE NEIGHBORING WIRELESS NETWORKS OF THE WIRELESS NETWORK, BASED ON AT LEAST LOCATION OF THE WIRELESS NETWORK, THE DEVICE MANAGEMENT INFORMATION INCLUDING AT LEAST ALLOWED FREQUENCY AND TRANSMISSION POWER.

STEP 902: TRANSMITTING A REQUEST, BY A NODE IN A WIRELESS NETWORK, REQUESTING DEVICE MANAGEMENT INFORMATION FOR COEXISTENCE WITHIN AN UNASSIGNED FREQUENCY BAND, WITH ZERO OR MORE NEIGHBORING WIRELESS NETWORKS OF THE WIRELESS NETWORK; AND

STEP 904: RECEIVING, BY THE NODE IN THE WIRELESS NETWORK, THE REQUESTED DEVICE MANAGEMENT INFORMATION BASED ON AT LEAST LOCATION OF THE WIRELESS NETWORK, THE DEVICE MANAGEMENT INFORMATION INCLUDING AT LEAST ALLOWED FREQUENCY AND TRANSMISSION POWER.

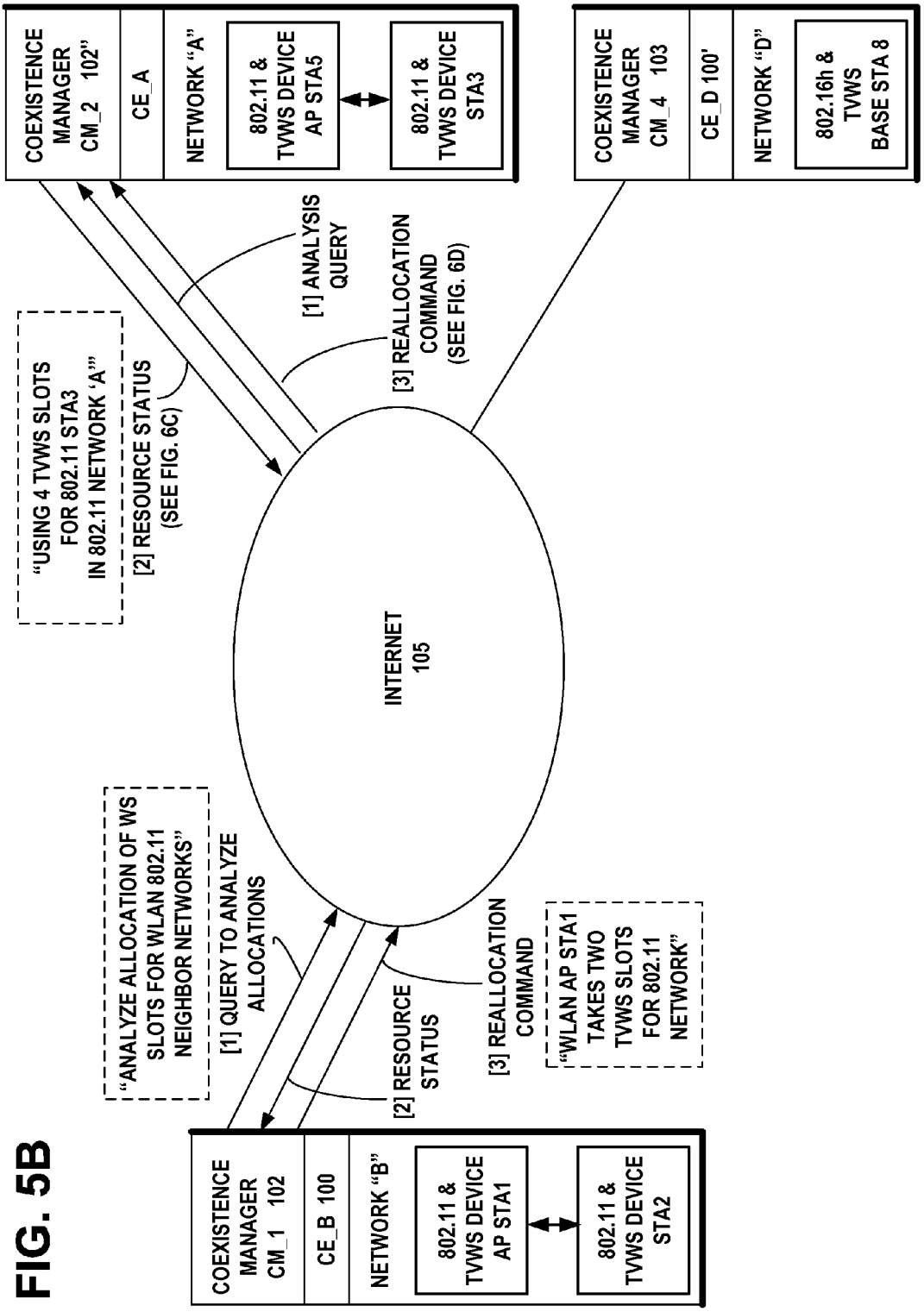

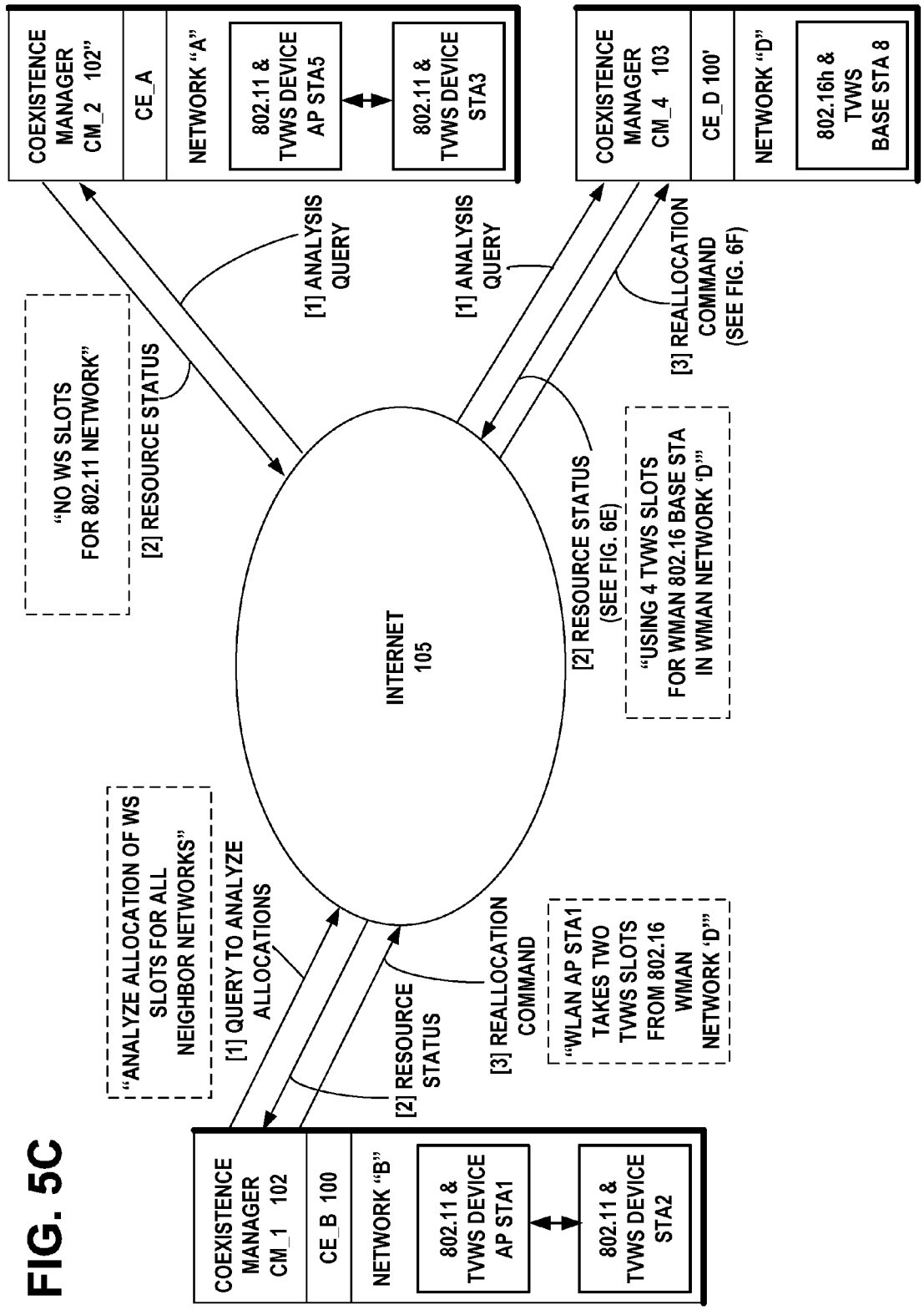

METHOD, APPARATUS, AND COMPUTER PROGRAM PRODUCT FOR COEXISTENCE MANAGEMENT

FIELD

The field of the invention relates to radio coexistence concepts and utilization of spectrum to enable coexistence of secondary networks.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, mobile networks such as CDMA2000, WCDMA, HSPA, LTE, and IMT, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. Unassigned or un-used frequencies also appear locally inside the frequency bands, which are otherwise allocated in other locations. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV band white spaces may be available. The FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band. Further, other schemes of secondary use of spectrum, other than unlicensed schemes may exist, such as licensing, regulator defined policies, cognitive principles, or authorized shared access.

SUMMARY

Method, apparatus, and computer program product embodiments are disclosed to provide a wireless device with suitable operating parameters for wireless resource sharing with heterogeneous wireless networks to enable coexistence of secondary networks in a shared band environment.

Example embodiments of the invention include a method comprising:

receiving a request from a wireless network, requesting device management information for coexistence within an unassigned frequency band with zero or more neighboring wireless networks of the wireless network; and providing the requested device management information for the wireless network, based on at least location of the wireless network, the device management information including at least allowed frequency and transmission power.

Example embodiments of the invention include the method further comprising:

the request being received from a network controller serving a control node associated with the wireless network; and the requested device management information being provided to the wireless network via the network controller and the control node.

Example embodiments of the invention include the method further comprising:

wherein the request is a GET command for accessing a management object for coexistence, to be accessed from a Device Management Objects tree.

Example embodiments of the invention include the method further comprising:

wherein the device management information is a subtree of a Device Management Objects tree, the subtree including information for coexistence with zero or more neighboring wireless networks of the wireless network.

Example embodiments of the invention include the method further comprising:

wherein the device management information includes one or more descriptions of
frequency of shared spectrum,
validity of granted access [time, period, area, height],
price and charging mechanism of granted access,
power limits of granted access,
certification requirements,
allowed device type,
radio systems and their priorities for access,
known incompatibilities,
scaling rules,
measurements,
device type(s), or
variation of the device management information by device type.

Example embodiments of the invention include the method further comprising:

wherein the providing the requested device management information is performed with a PUSH command to the wireless network.

Example embodiments of the invention include the method further comprising:

comparing the device management information with reference device management information; and replacing at least a portion of the device management information with a corresponding at least a portion of the reference device management information.

Example embodiments of the invention include the method further comprising:

loading device management information from a source when there is no prior device management information present.

Example embodiments of the invention include the method further comprising:

pushing the device management information to the wireless network when there is no prior device management information in the wireless network.

Example embodiments of the invention include the method further comprising:

comparing the device management information with reference device management information;

replacing at least a portion of the device management information with a corresponding at least a portion of the reference device management information; and providing the at least a portion of the reference device management information to the wireless network.

Example embodiments of the invention include a method comprising:

accessing an address of a wireless network, and providing device management information for coexistence of the wireless network within an unassigned frequency band with zero or more neighboring wireless networks of the wireless network, based on at least location of the wireless network, the device management information including at least allowed frequency and transmission power.

Example embodiments of the invention include the method further comprising:

the wireless network being associated with a control node served by a network controller, and the requested device management information being provided to the wireless network via the network controller and the control node.

Example embodiments of the invention include the method further comprising:

wherein the accessing is performed with a GET command for accessing a management object for coexistence, to be accessed from a Device Management Objects tree.

Example embodiments of the invention include the method further comprising:

wherein the providing the device management information is performed with a PUSH command to the wireless network.

Example embodiments of the invention include the method further comprising:

transmitting a request, by a node in a wireless network, requesting device management information for coexistence within an unassigned frequency band, with zero or more neighboring wireless networks of the wireless network; and receiving, by the node in the wireless network, the requested device management information based on at least location of the wireless network, the device management information including at least allowed frequency and transmission power.

Example embodiments of the invention include the method further comprising:

the wireless network being associated with a control entity served by a network controller, and the transmitting and receiving being via the control entity and the network controller.

Example embodiments of the invention include the method further comprising:

wherein the request is a GET command for accessing a management object for coexistence, to be accessed from a Device Management Objects tree in a server.

Example embodiments of the invention include the method further comprising:

wherein the device management information is a subtree of a Device Management Objects tree in a server, the subtree including information for coexistence with zero or more neighboring wireless networks of the wireless network.

Example embodiments of the invention include the method further comprising:

wherein the device management information includes one or more descriptions of
frequency of shared spectrum,
validity of granted access [time, period, area, height],
price and charging mechanism of granted access,
power limits of granted access,
certification requirements,
allowed device type,
radio systems and their priorities for access,
known incompatibilities,
scaling rules,
measurements,
device type(s), or
variation of the device management information by device type.

Example embodiments of the invention include the method further comprising:

wherein the receiving the requested device management information is performed with a PUSH command to the wireless network.

Example embodiments of the invention include the method further comprising:

comparing in the wireless network, the received device management information with stored device management information; and replacing in the wireless network, at least a portion of the stored device management information with a corresponding at least a portion of the received device management information.

Example embodiments of the invention include the method further comprising:

pushing in the wireless device, device management information from a source when there is no prior device management information present.

Example embodiments of the invention include the method further comprising:

wherein the device management information is a subtree of a Device Management Objects tree in a server, the subtree including information for coexistence with zero or more neighboring wireless networks of the wireless network; and applying in the wireless network, the device management information, to manage coexistence with zero or more neighboring wireless networks of the wireless network.

Example embodiments of the invention include the method further comprising:

wherein the wireless network and another wireless network receive the same device management information or receive at least a portion of the same device management information.

Example embodiments of the invention include the method further comprising:

wherein the wireless network receives different device management information than another wireless network for similar purposes of coexistence.

Example embodiments of the invention include an apparatus comprising:

at least one processor;

at least one memory including computer program code;

the at least one memory and the computer program code configured to, with the at least one processor, cause the apparatus at least to:

receive a request from a wireless network, requesting device management information for coexistence within an unassigned frequency band with zero or more neighboring wireless networks of the wireless network; and provide the requested device management information for the wireless network, based on at least location of the wireless network, the device management information including at least allowed frequency and transmission power.

Example embodiments of the invention include the apparatus further comprising:

the request being received from a network controller serving a control node associated with the wireless network; and the requested device management information being provided to the wireless network via the network controller and the control node.

Example embodiments of the invention include the apparatus further comprising:

the at least one memory and the computer program code configured to, with the at least one processor, cause the apparatus at least to:

compare the device management information with reference device management information; and replace at least a portion of the device management information with a corresponding at least a portion of the reference device management information.

Example embodiments of the invention include the apparatus further comprising:

the at least one memory and the computer program code configured to, with the at least one processor, cause the apparatus at least to:

compare the device management information with reference device management information;

replace at least a portion of the device management information with a corresponding at least a portion of the reference device management information; and provide the reference device management information to the wireless network.

Example embodiments of the invention include an apparatus comprising:

at least one processor;

at least one memory including computer program code;

the at least one memory and the computer program code configured to, with the at least one processor, cause the apparatus at least to:

transmit a request requesting device management information for coexistence within an unassigned frequency band with zero or more neighboring wireless networks for a wireless network of the apparatus; and receive the requested device management information based on at least location of the wireless network, the device management information including at least allowed frequency and transmission power.

Example embodiments of the invention include the apparatus further comprising:

the apparatus being associated with a control node served by a network controller, and the transmitting and receiving being via the control node and the network controller.

Example embodiments of the invention include the apparatus further comprising:

the at least one memory and the computer program code configured to, with the at least one processor, cause the apparatus at least to:

compare in the apparatus, the received device management information with stored device management information; and replace in the apparatus, at least a portion of the stored device management information with a corresponding at least a portion of the received device management information.

Example embodiments of the invention include the apparatus further comprising:

wherein the device management information is a subtree of a Device Management Objects tree in a server, the subtree including information for coexistence with zero or more neighboring wireless networks of the apparatus;

the at least one memory and the computer program code configured to, with the at least one processor, cause the apparatus at least to:

apply in the apparatus, the device management information, to manage coexistence with zero or more neighboring wireless networks of the apparatus.

Example embodiments of the invention include a computer program product comprising computer executable program code recorded on a computer readable, non-transitory storage medium, the computer executable program code comprising:

code for receiving a request from a wireless network, requesting device management information for coexistence within an unassigned frequency band with zero or more neighboring wireless networks of the wireless network; and code for providing the requested device management information for the wireless network, based on at least location of the wireless network, the device management information including at least allowed frequency and transmission power.

Example embodiments of the invention include a computer program product comprising computer executable program code recorded on a computer readable, non-transitory storage medium, the computer executable program code comprising:

code for accessing an address of a wireless network, and code for providing device management information for coexistence of the wireless network with zero or more neighboring wireless networks of the wireless network.

Example embodiments of the invention include a computer program product comprising computer executable program code recorded on a computer readable, non-transitory storage medium, the computer executable program code comprising:

code for transmitting a request requesting device management information for coexistence within an unassigned frequency band with zero or more neighboring wireless networks of a wireless network; and code for receiving the requested device management information based on at least location of the wireless network, the device management information including at least allowed frequency and transmission power.

The embodiments of the invention provide a wireless device with suitable operating parameters for wireless resource sharing with heterogeneous wireless networks to enable coexistence of secondary networks in a shared band environment.

DESCRIPTION OF THE FIGURES

FIG. 1 is a system architecture diagram according to an example embodiment of the invention, illustrating a wireless metropolitan area network's coverage area overlapped by a wireless local area network and the reallocation of channels from the wireless local area network to the TV band white space, in an example embodiment of the invention.

FIG. 1E is an example flow diagram of operational steps in the device management for coexistence (coexDM) server performing a GET coexMO operation, according to an embodiment of the present invention.

FIG. 1F is an example flow diagram of operational steps in the device management for coexistence (coexDM) server performing a PUSH coexMO operation, according to an embodiment of the present invention.

FIG. 1G is an example flow diagram of operational steps in the wireless network sending a GET coexMO command, according to an embodiment of the present invention.

FIG. 5B is an example network diagram according to an embodiment of the present invention, illustrating an example of communicating by the network controller or coexistence manager 102, with one or more coexistence managers managing neighboring wireless networks belonging to a same network allocation group as the coexistence manager, to analyze the allocation of white space slots for neighbor networks in the same network allocation group, according to an embodiment of the present invention.

FIG. 5C is an example network diagram according to an embodiment of the present invention, illustrating an example of communicating by the network controller or coexistence manager 102, with all of its coexistence managers managing neighboring wireless networks, to analyze the allocation of white space slots for all neighbor networks, according to an embodiment of the present invention.

DISCUSSION OF EXAMPLE EMBODIMENTS OF THE INVENTION

Figure 1A:
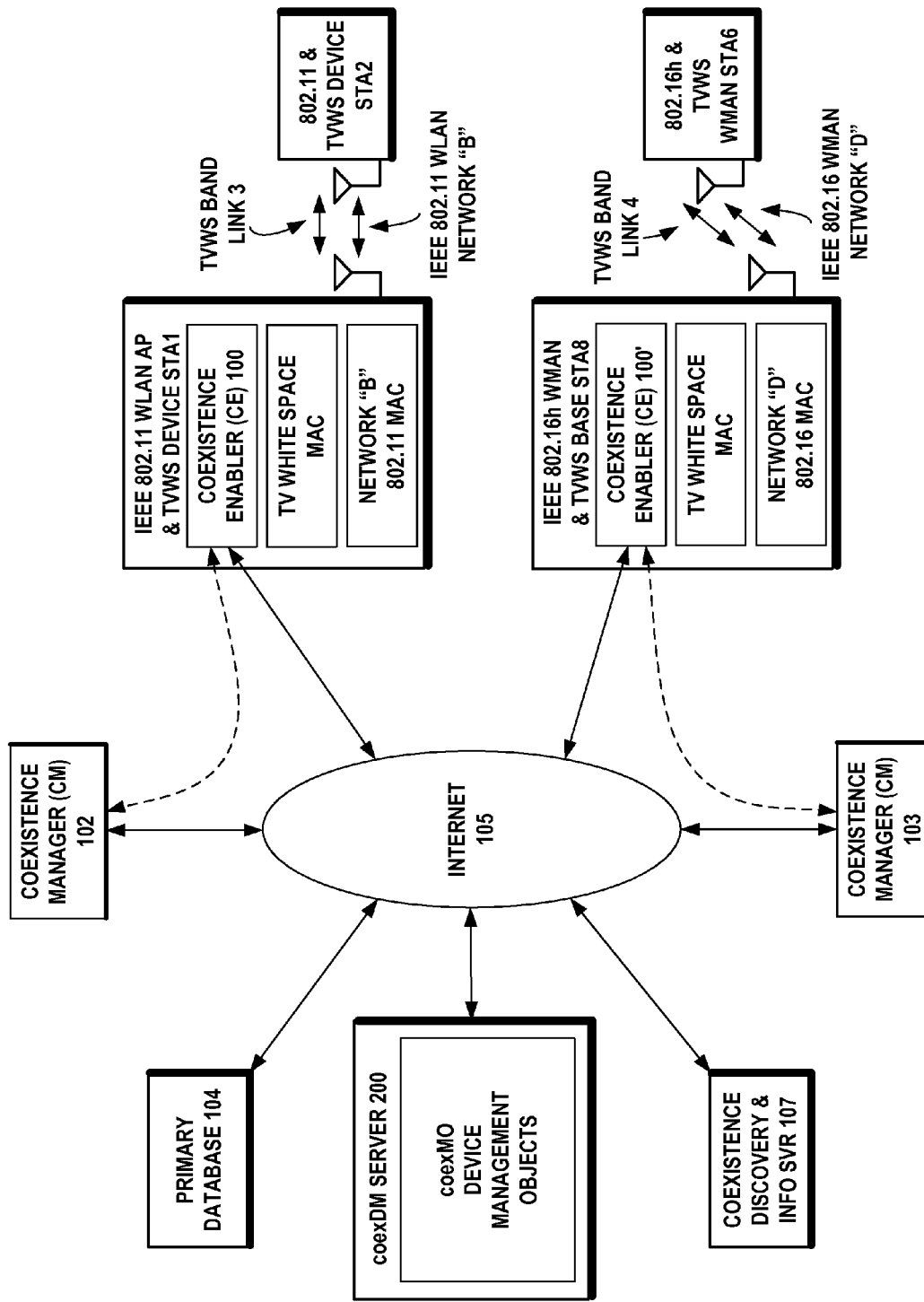
FIG. 1A is an example system architecture according to an example embodiment of the invention, illustrating example communication paths over the Internet between a control node or coexistence enabler CE for a WLAN device, a network controller or coexistence manager CM serving the WLAN device, a device management for coexistence (coexDM) server, a primary database, and a coexistence network element coexistence discovery and Information server (CDIS). Also shown is a control node or coexistence enabler for a WMAN device and a network controller or coexistence manager CM serving the WMAN device, in an example embodiment of the invention.

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using any radio technologies adapted for TV white space frequency bands, to access the same TV white space frequency band in the same location without mutual interference.

The IEEE 802.19 Working Group is currently defining coexistence rules for heterogeneous secondary networks. An example embodiment of the invention enables coexistence between heterogeneous secondary networks and coexistence between secondary networks and primary networks that are required to be protected. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable TVBD devices must be able to access geo-location data and include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV band white spaces may be available. The FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the RF white spaces may require new techniques for fairly sharing the available bandwidth among different heterogeneous secondary networks and accord the required preference for primary users of the band. Such new techniques may require some form of communication between the secondary networks to enable a fair usage of the local spectrum.

FIG. 1 is an example system architecture diagram according to an embodiment of the present invention, illustrating the coverage of an IEEE 802.16h wireless metropolitan area network (WMAN) cell overlapped by an IEEE 802.11 wireless local area network (WLAN) cell. An IEEE 802.16h WMAN STA 6 exchanges wireless broadband messages with an IEEE 802.16h WMAN base station 8 in a WMAN network "D". The WLAN access point STA1 exchanges wireless broadband messages with an IEEE 802.11 client device STA2, such as a personal computer over the WLAN network "B". Both IEEE 802.11 WLAN access point STA1 and the IEEE 802.11 client device STA2 interfere with the IEEE 802.16h WMAN STA 6. For example, WLAN devices are typically designed for better resistance to saturation than WMAN devices, since WMAN devices must be more sensitive to attenuated signals received over a greater range than are WLAN devices and are therefore more sensitive to interference. Both the WLAN access point STA1 and IEEE 802.11 client device STA2 are TV white space (TVWS) devices, meaning that they are equipped to communicate over the dedicated TV band white space 30. Similarly, the IEEE 802.16h WMAN STA 6 and the IEEE 802.16h WMAN base station 8 are TV white space (TVWS) devices, meaning that they are equipped to communicate over the dedicated TV band white space 30. Thus, the interference of the IEEE 802.16h WMAN STA 6 by both the IEEE 802.11 WLAN access point STA1 and the IEEE 802.11 client device STA2 may be ameliorated by reallocating the IEEE 802.11 frames from the WLAN network "B" to the TV band white space link 3. The dedicated TV band white space 30 may be shared by many terminals using diverse communication protocols. For example, if the WMAN network "D" reaches its maximum capacity, the traffic congestion may be alleviated by reallocating the IEEE 802.16h frames from the WMAN network "D" to the TV band white space link 4. A third device, STA3, is present in the 802.11 WLAN cell of STA1, as part of a neighboring network "A" with 802.11 AP STA5. STA3 is also a TV white space (TVWS) device and has reallocated frames on TVWS link 9 communicating over the dedicated TV band white space 30. A fourth device, STA4, is present in the 802.11 WLAN cell of STA1, as part of a neighboring network "F" with 802.11 AP STA7. STA4 is also a TV white space (TVWS) device and has reallocated frames on TVWS link 15 communicating over the dedicated TV band white space 30.

Similar examples include local area technologies implemented for example, by 3GPP standards, such as 3G, WCDMA, HSPA, LTE, LTE-A, IMT-A. Heterogeneous networks on unlicensed frequencies and RF white spaces are foreseen for cellular technologies, as well. These technologies define small cell operations such as hotspots, pico cells, femto cells, home nodes (HNB, HeNB) and the like. Further, integrated local nodes of secondary networks may consist of 3GPP technologies combined to the IEEE technologies, for example LTE HeNB with Wi-Fi.

Other network topologies may make use of example embodiments of the invention, for example more heterogeneous networks, each of which has an Internet connection that they may use first for neighboring network discovery.

FIG. 1 also shows three example white space bands locally unused by licensed primary users of their respective spectrum white spaces, which may be used by the WLAN access point STA1 or client device STA2, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. An example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the WLAN access point STA1 or client device STA2, then they could operate as unlicensed secondary users and make use of TV band white space 31. If either STA1 or STA2 were to detect a signal transmitted from a neighboring TV broadcaster in band 31, then they would have to relinquish their use of the TV band white space 31 and make a resource request, in accordance with an example embodiment of the invention.

A maritime radio operates in a number of licensed frequency allocations and is a primary user in the maritime radio band 33. If there were no licensed maritime radios in operation that would interfere with the WLAN access point STA1 or client device STA2, then they could operate as unlicensed secondary users and make use of maritime radio band 33. If either STA1 or STA2 were to detect a signal transmitted from a neighboring maritime radio, then they would have to relinquish their use of the maritime band 33 and make a resource request, in accordance with example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the WLAN access point STA1 or client device STA2, then they could operate as unlicensed secondary users and make use of earth-to-satellite radio band 35. If either STA1 or STA2 were to detect a signal transmitted from a neighboring earth station radio, then they would have to relinquish their use of the earth-to-satellite band 35 and make a resource request, in accordance with example embodiments of the invention.

FIG. 1A is an example system architecture according to an embodiment of the present invention, illustrating an example communication paths over the Internet 105 between the control node or coexistence enabler 100 for the IEEE 802.11 wireless device STA1, the network controller or coexistence manager CM 102 serving STA1, the device management for coexistence (coexDM) server 200, the primary database 104, and the coexistence network element coexistence discovery and information server (CDIS) 107. Also shown is the control node or coexistence enabler 100' for the IEEE 802.16h WMAN STA8 and the network controller or coexistence manager CM 103 serving STA8. A network of distributed coexistence managers may communicate with one another over the Internet, in an example embodiment of the invention.

In an example embodiment of the invention, a network of distributed coexistence managers 102 and 103 may communicate with one another over the Internet 105. According to an example embodiment of the invention, the control node or coexistence enabler 100 in the IEEE 802.11 WLAN access point STA1 for a Network "B" may communicate over the Internet 105 with the TVWS coexistence manager 102. According to an alternate example embodiment of the invention, the control node or coexistence enabler 100 in the IEEE 802.11 WLAN access point STA1 for a Network "B" may be collocated with the TVWS coexistence manager 102. The coexistence enabler 100' in the IEEE 802.16h WMAN base STA8 for a Network "D" may communicate over the Internet 105 with the TVWS coexistence manager 103. The distributed coexistence managers 102 and 103 may communicate over the Internet with the device management for coexistence (coexDM) server 200, the TVWS primary database 104, and the TVWS coexistence network element coexistence discovery and information server (CDIS) 107 assisting the coexistence managers 102 and 103 in neighbor discovery, in an example embodiment of the invention. STA1 may be a master device registered through the control node or coexistence enabler 100 to the network controller or coexistence manager 102. STA8 may be a master device registered through the control node or coexistence enabler 100' to the network controller or coexistence manager 103.

The coexistence enabler 100 has to obtain information required for coexistence from a traffic network or device representing it. This includes configuration and control of measurements. Also, the coexistence enabler 100 has to provide reconfiguration commands and control information to the Network "B" or the WLAN access point STA1, corresponding to coexistence decisions received from coexistence managers 102 and 103, respectively. The coexistence manager 102 is responsible for discovery of Coexistence Managers (CM)s 103 managing neighboring wireless networks, for example, and coexistence related information may be exchanged with them. The coexistence manager 102 or 103 may have the needed information to make decisions of resource sharing among the Coexistence Managers (CM)s managing neighboring wireless networks.

The coexistence manager 102 handles resource requests from the coexistence enabler 100 in STA1. The coexistence manager 103 handles resource requests from the coexistence enabler 100' in base STA 8. The TV white space (TVWS) WLAN access point STA1 in the Network "B" includes a Network "B" MAC and PHY to communicate over the Network "B". The IEEE 802.16h WMAN base STA 8 in the Network "D", includes a Network "D" MAC and PHY to communicate over the Network "D". Each TV white space (TVWS) wireless devices STA1 in the Network "B" and STA 6 in the Network "D", includes a TV white spaces MAC and PHY to communicate in channels in the TV white spaces band reallocated by the coexistence manager 102 and 103, respectively, without mutual interference. The coexistence enablers 100 and 100' in STA1 and in base STA 8 send resource requests to the respective coexistence managers 102 and 103.

The example system architecture of FIG. 1A shows the coexistence manager 102 receiving a resource request from the coexistence enabler 100 in TV white space (TVWS) WLAN access point STA1. The coexistence manager 102 has received Spectrum sensing results and network parameters from the coexistence enabler 100 in device STA1. Network parameters may include specific user requirements (user load, QoS, priority, etc), aggregate spectral efficiency, etiquette (first come, first served, etc.), and user or network policies. The coexistence manager 102 accesses the primary database 104 to obtain available secondary channels in the TV band white space. The coexistence manager 102 accesses the coexistence network element coexistence discovery and information server (CDIS) 107 to obtain potential neighbor networks' addresses. The coexistence manager 102 processes this data in conjunction with Spectrum maps, Operational parameters, and Time base sync, to determine a resource reallocation for the coexistence enabler 100 in device STA1. The coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls at least one of the medium access control (MAC) and the physical layer (PHY) and the Radio resource Control (RRC) and the Radio Resource Management (RRM) to communicate in channels in the TV white spaces band reallocated by the coexistence manager 102, without interference from other networks sharing the same white space channels. A similar operation may be carried out by the coexistence manager 103 in conjunction with the coexistence enabler 100' in base STA 8. A network of distributed coexistence managers 102 and 103 may communicate with one another over the Internet 105.

Device Management for Coexistence (coexDM)

In an example embodiment of the invention, the Coexistence Manager (CM) and Coexistence Enabler (CE) provide coexistence services for wireless devices that are expected to operate in a frequency band in which resource sharing with other devices is needed. These devices may be users' devices such as smartphones, tablets, communicators, pads, mobile phones, data terminals or they may be wireless machines or any other equipment for wireless communications, for example in use for machine type communications or safety services, energy meters, controllers, keys, surveillance cameras or such. These wireless devices may be fixed, portable or mobile. A wireless device may be offered two types of services: a) coexistence management service, b) coexistence information service. In coexistence management service, the CM determines operating parameters of a wireless device, while in coexistence information service, the wireless device is provided information about operating environment for decision making about operating parameters. The CE is an entity that interfaces a wireless device to a coexistence system and specifically to the CM. The interface between the CM and the CE may be an exposed interface that needs to be specified in detail with respect to the protocol used between the CM and the CE. But, the interface between a wireless device and the CE may be loosely defined. Example factors such as the radio access technology, the design of the wireless device, and the architecture of the wireless device may determine how the CE is integrated into the wireless device.

There may be a variability in the device characteristics of the wireless devices that need to be managed for coexistence. Some coexistence functions and entities are implemented in the wireless device and others are implemented in the network. The functional split between those functions in the device and other functions in the network may vary from device to device, depending on the type of device and type of network, for example. Further, the requirement to access an external database, such as the geo-location database for TVWS coexistence, may vary with the type of wireless device. Thus, there is a need to provide device management information to wireless devices in order to enable them to successfully coexist and be interoperable in a crowded radio spectrum.

In an example embodiment of the invention, the device management for coexistence (coexDM) server 200 provides provisioning of coexistence mechanisms and their parameters by means of a device management object (DMO) that the server sends to the wireless devices, such as STA1. The device management object for coexistence is referred to herein as the Coexistence Management Object coexMO. The Coexistence Management Object coexMO is provided by the coexDM server 200 to manage the shared spectrum access by wireless devices, such as STA1. In an example embodiment of the invention, the values stored in the nodes of the Coexistence Management Object coexMO may be set by a governmental authority or an authorized representative. Alternately, in an example embodiment of the invention, the values stored in the nodes of the Coexistence Management Object coexMO may be set by the network provider. In example embodiments, the Coexistence Management Object coexMO may be provided by a wireless device for the use by other wireless devices in device to device provisioning.

In an example embodiment of the invention, the Coexistence Management Object coexMO may be described by an extensible markup language (XML). The Coexistence Management Object coexMO may be organized as a sub-tree of nodes within a larger object tree of nodes of a device management object (DMO). Examples of the larger device management object (DMO) have been published by the Open Mobile Alliance (OMA) Device Management (DM) Working Group, by the 3GPP consortium, by industry alliances, and by device vendors. The DMO object uses XML for data exchange. The device management takes place by communication between a server, such as coexDM server 200 and the client, such as the wireless device STA1.

In an example embodiment of the invention, the coexMO object is contained as a sub-tree within the DMO object, enabling the coexistence provisioning of a client wireless device, such as STA1, by the device management coexDM server 200. Device configuration information for coexistence is transmitted to the wireless device STA1 in the XML elements comprising the nodes of the coexMO object. The coexDM server 200 may perform device management by sending the DMO object and server management commands to the client wireless device STA1. The client wireless device STA1 may reply with status information and the provisioning session may end at that time or the provisioning session may continue with the coexDM server 200 sending of additional objects or server management commands to the client wireless device STA1.

In an example embodiment of the invention, in the client wireless device STA1, the configuration information to be managed may be arranged as an XML tree of management objects that may be managed by management commands from the coexDM server 200. The DMO management object tree is formed of nodes, and the management coexMO object is a subtree to the DMO management tree and may be formed of one or more nodes. A node may be a single parameter, a subtree or a collection of data, for example in a form of a data structure. An interior node in the tree has child nodes, whereas a leaf node has no further child nodes. The nodes may be permanent or dynamic. The nodes may inherit some properties of their parent nodes, may be independent child nodes of at least a parent and may further have child nodes. Permanent nodes typically may not be deleted. Dynamic nodes may be added, modified, updated or replaced by a client wireless device STA1 or by the coexDM server 200. Dynamic nodes may be added, modified, updated, replaced using device management commands.

In an example embodiment of the invention, each node may contain an access control list (ACL) defining what changes may be made to the node and by which entities. The changes that may be made are defined by one or more access rights specified in the ACL, such as (1) add access; (2) replace access; (3) get access; (4) delete access; and (5) execute access. If a dynamic node is created by the coexDM server 200, the coexDM server 200 may have replace access rights for the created node.

An example description the principles of a DMO may be found, for example, in the OMA Device Management Tree, DMO object, and DM server management commands published in the publication: *OMA Device Management Tree and Description*, Candidate Ver. 1.3, Open Mobile Alliance Ltd., Dec. 7, 2010, which is incorporated herein by reference.

In an example embodiment of the invention, the Coexistence Management Object coexMO may be pushed to a wireless device by the coexDM server 200 or by another wireless device. Alternately, a wireless device may perform a GET command to access the Coexistence Management Object coexMO from the coexDM server 200.

In an example embodiment of the invention, the Coexistence Management Object coexMO may be set to protect the operation of the primary licensed users of the spectrum, from spontaneous uses by the secondary users, by applying a set of definitions that are provided to wireless devices by the Coexistence Management Object coexMO. The Coexistence Management Object coexMO may additionally or alternately define operations of the secondary users in a spectrum without presence of primary licensed users.

Figure 1B:
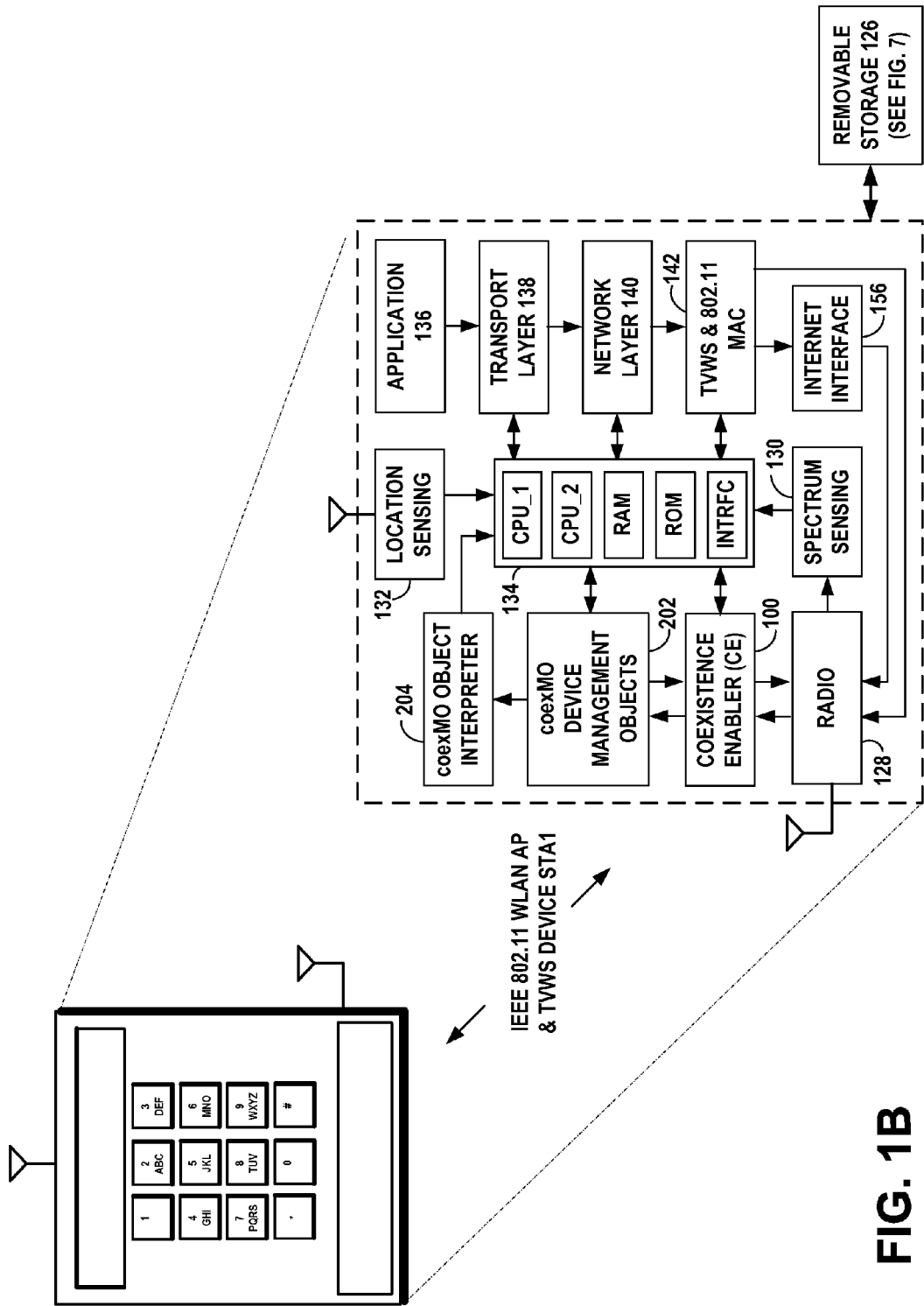
FIG. 1B is a functional block diagram according to an example embodiment of the invention, illustrating an example TV white space wireless device including a cache storing the device management object (coexMO), a coexMO Object interpreter, and the control node or coexistence enabler for the wireless device. The device may be configured to operate in the TVWS coexistence bands or additional RF spectrum white space bands there may be no primary user radios operating in the neighboring wireless networks, in an example embodiment of the invention.

FIG. 1B is a functional block diagram according to an example embodiment of the invention, illustrating an example TV white space wireless device STA1, including a cache 202 storing the device management object (coexMO), a coexMO Object interpreter 204, and the control node or coexistence enabler 100 for the wireless device STA1. The device STA1 may be configured to operate in the TVWS coexistence bands or additional RF spectrum white space bands there may be no primary user radios operating in the neighboring wireless networks, in an example embodiment of the invention.

In an example embodiment of the invention, device STA1 includes a protocol stack for Network "B", including the radio 128 and the Network "B" IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example device STA1 may include a processor 134 that includes a dual or multi core central processing unit CPU_1 and CPU_2, a RAM memory, a ROM memory, and an interface for a keypad, display, and other input/output devices. A location sensor 134, such as a GPS may be included to establish the geographic location of the device STA1, and the location of the STA1 is reported to the network controller or coexistence manager 102. The coexistence enabler 100 may send resource requests to the coexistence manager 102. The MAC 142 includes integrated TV white space features to communicate using the radio 128 in channels in the TV white spaces band reallocated by the coexistence manager 102, without mutual interference. The spectrum sensor 130 senses the electromagnetic environment of the STA1 and reports it to the coexistence manager 102.

In an example embodiment of the invention, the device management coexDM server 200 may push the coexMO object via the Internet 105 to the coexistence manager CM 102, which forwards the coexMO object via the Internet 105 to coexistence enabler 100 in the wireless device STA1. The coexistence enabler 100 buffers the received coexMO object in the cache 202.

In an example embodiment of the invention, a number of operations may be performed by the wireless device STA1 on the received coexMO object in the cache 202. For example, an existing coexMO object in the cache 202 may need to be compared with the received coexMO object to determine whether any of the device management values needs to be updated in the XML element nodes of the existing coexMO object. Another example operation may be to apply the device management values in the received coexMO object, using the coexMO object interpreter 204. For example, the value for the validity of the granted access time, may be loaded into registers in the RAM of the processor 134.

In an example embodiment of the invention, the interface circuits in FIG. 1B may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

In an example embodiment of the invention, the RAM in the processor 134 of the wireless device STA1 of FIG. 1B, may be programmed to cause the device to transmit to the coexDM server 200, a GET command for accessing the coexMO management object for coexistence. The RAM in the processor 134 of the wireless device STA1 of FIG. 1B, may be programmed to receive the requested device management coexMO object from the coexDM server 200 and buffer the received object in the cache 202. The RAM in the processor 134 of the wireless device STA1 of FIG. 1B, may be programmed to compare the received device management coexMO object with a currently stored version of the coexMO object. The RAM in the processor 134 of the wireless device STA1 of FIG. 1B, may be programmed to replace at least a portion of the stored version of the coexMO object with a corresponding at least a portion of the received coexMO object. The RAM in the processor 134 of the wireless device STA1 of FIG. 1B, may be programmed to apply the device management coexMO object, to manage coexistence with neighboring wireless networks of the wireless device STA1.

The wireless device STA1 of FIG. 1B includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, and semiconductor memory circuit devices are shown at 126 and in FIG. 7, and may serve, for instance, as a data input/output means. Code may include any interpreted or compiled computer language including computer-executable instructions. The code and/or data may be used to create software modules such as operating systems, communication utilities, user interfaces, more specialized program modules, etc.

Figure 1C:
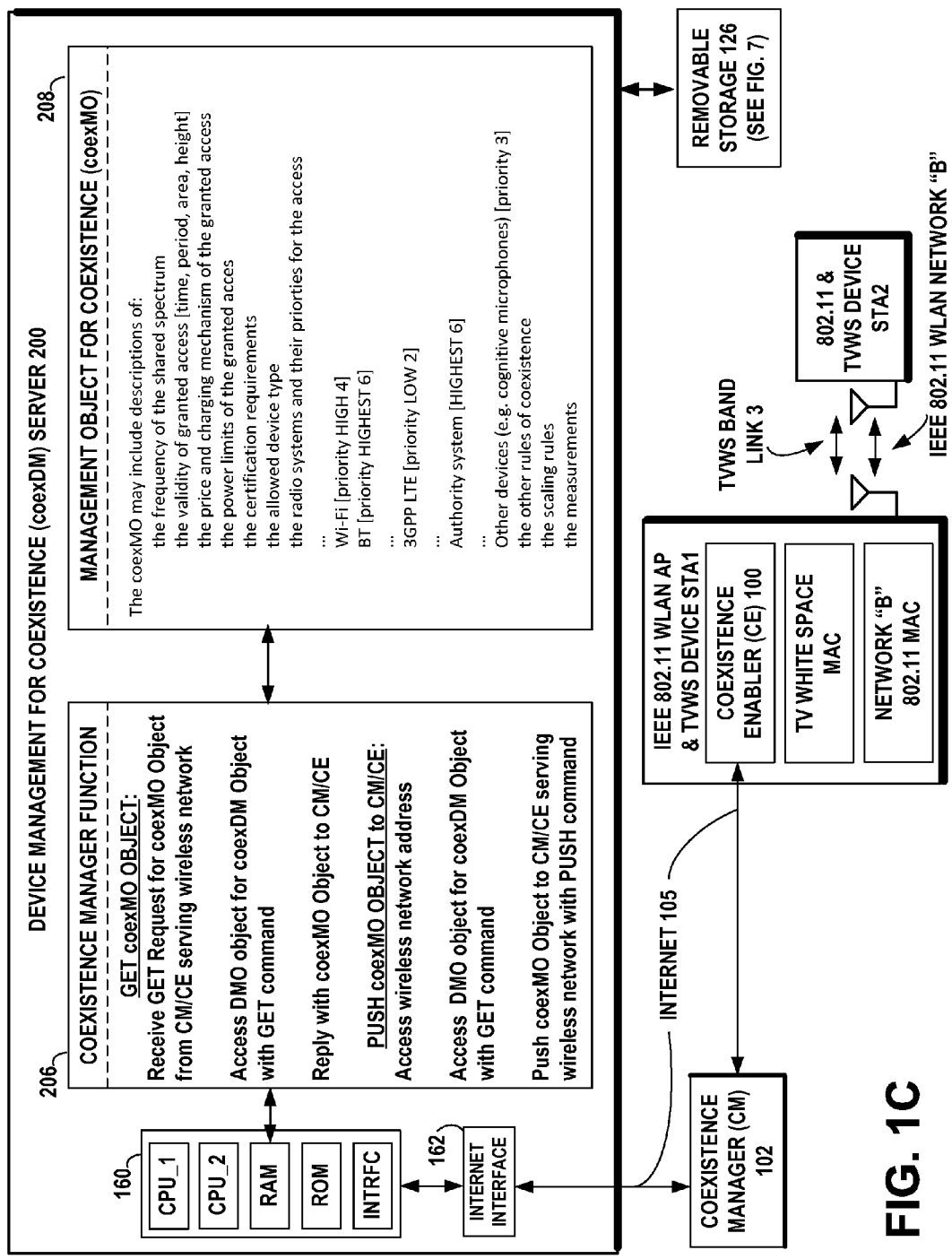
FIG. 1C is an example functional block diagram according to an embodiment of the present invention, illustrating the device management for coexistence (coexDM) server, in an example embodiment of the invention.

FIG. 1C is an example functional block diagram according to an embodiment of the present invention, illustrating the device management for coexistence (coexDM) server 200, in an example embodiment of the invention. The coexDM server 200 includes a processor 160 that includes a RAM storing the coexMO object 208 in a memory partition of the RAM. The RAM in the processor 160 also stores the coexistence manager function 206 in a memory partition of the RAM, which enables pushing the coexMO object via the Internet interface 162 and the Internet 105 to the coexistence manager CM 102, for forwarding via the Internet 105 to coexistence enabler 100 in the wireless device STA1. In example embodiments of the invention, the coexMO object 208 may also be stored in a separate storage device coupled to the processor 160.

In an example embodiment of the invention, the coexMO object nodes are addressable with a uniform resource locator (URL) identifying the sequence of interior nodes and child nodes leading the leaf node containing the device management value being accessed.

In an example embodiment of the invention, the coexistence manager function 206 in the RAM in the processor 160 of the coexDM server 200, is programmed to perform server management functions such as responding to a GET command to retrieve the coexMO object from the RAM. It is also programmed to perform a PUSH command based on information preferences expressed in advance or subscribed to. For example, whenever new content is available for the coexMO object, the coexDM server 200 may push that information out to the wireless device STA1.

In an example embodiment of the invention, the GET command issues an HTTP GET request to retrieve the coexMO object or a specified sub-tree or node of the coexMO object, expressed as a URL. For example, a GET command may be issued by the wireless device STA1 for the coexMO object or a specified sub-tree or node of the coexMO object, which will cause the coexDM server 200 to perform a GET function to retrieve the specified device management object or portion thereof and return it to the requesting wireless device STA1.

In an example embodiment of the invention, the PUSH command issues an HTTP PUSH operation to send to a subscriber, the coexMO object or a specified sub-tree or node of the coexMO object, expressed as a URL. For example, a PUSH command may be performed by the coexDM server 200 for the coexMO object or a specified sub-tree or node of the coexMO object, which will cause the coexDM server 200 to send the specified device management object or portion thereof to the subscribing wireless device STA1.

In an example embodiment of the invention, the device management information that may be included in the coexMO object includes one or more descriptions of
 frequency of shared spectrum,
 validity of granted access [time, period, area, height],
 price and charging mechanism of granted access,
 power limits of granted access,
 certification requirements,
 allowed device type,
 radio systems and their priorities for access,
 known incompatibilities,
 scaling rules,
 measurements,
 device type(s), or
 variation of the device management information by device type.

The example descriptions of the device information that may be included in the coexMO object may be described as follows:

Frequency of the shared spectrum: In an example embodiment of the invention, the frequency of the shared spectrum may be given as a frequency band, a full set of frequency ranges that are allowed to be accessed in a manner defined by the coexistence rules. It may also include a set of bandwidths inside a spectrum between two frequencies, the bandwidths of which are allowed to be accessed. The frequency information may further include a set of proposed center frequencies and bandwidths for operation inside the shared spectrum. Further definitions may limit the coexistence frequencies to, for example, frequency hopping systems, spread spectrum systems, OFDMA systems, listen-before-talk systems, and the like.

Validity of the granted access: In an example embodiment of the invention, the validity of the granted access time may be given as a set of time instants beginning from a given date and time and lasting until the defined ending time, or it may be a defined discrete range of time events. It may further consist of defined time periods in a day over a longer validity period. Validity may also include the geographic area over which the validity applies, including altitude. Validity may be further restricted by the device type.

Price and charging mechanism: In an example embodiment of the invention, the price and charging mechanism of the granted access will define, who charges and how much for the use of the granted spectrum. The charging mechanism may also be informed. Typically, this information may be a URL-link to a charging entity, where the actual charging information and charging policy may be available. They may also be directly stated by the coexMO object. Example charging types may include; season charging, daily charging, flat rate, prepaid, free, per registration, per session, per use of frequency proportion. Pricing and access to the spectrum may alternately be based on auctions or spectrum brokering.

Power limits: In an example embodiment of the invention, the power limits may define how the device has to apply transmit power on the shared spectrum. This may be the maximum limit of emitted power on a communication proportion of the spectrum, and/or the maximum power allowed to be emitted to the spectrum outside of the communication proportion, but still inside the shared spectrum. The power limit may also have frequency and time dependent masks, so that some time-frequency proportions of the spectrum are better protected against interference. In this manner, for example keep-alive signals of the connections may appear in the protected time-frequency zones and data boosting zones may apply elsewhere in the time-frequency-space spectrum. Power limits may further include beam forming properties, for example some emitted power to a given spatial angle is more limited compared to another angle.

Certification: In an example embodiment of the invention, the certification requirements may define whether the access to the shared spectrum requires the device be certified by a specified certification authority, for example, Wi-Fi Alliance, Wireless Gigabit Alliance, WiMax Forum, Bluetooth SIG, and the like.

Device type: In an example embodiment of the invention, the device type may define whether the device is a fixed, portable, or mobile device, and hence may be capable of sharing local spectra in different ways. Device type may further consist of a defined purpose of allowed use.

Allowed radio systems and priorities: In an example embodiment of the invention, the allowed radio systems include a list of access systems and their priorities that are allowed to use the shared spectrum. This may define, for example, whether the spectrum is accessible by a specified version of Wi-Fi protocol, such as spread spectrum Wi-Fi or OFDMA Wi-Fi, or whether the spectrum is accessible by a device to device communication mode, such as IEEE 802.11s or WFA direct mode. For each access, a relative priority may be given, for example an access by an authority may have a higher priority. Further, certain short range access technologies, such as Bluetooth (headsets), may have a higher priority. Wi-Fi and other widely used, friendly (listen-before-talk) access protocols may have a higher priority compared to scheduled access protocols, such as 3GPP systems that tend to consume more bandwidth. It may not be necessary to fully disable 3GPP access on a shared spectrum, if the power limits are set low, and if there is a lot of local shared spectrum available, which appears to be free. It is also foreseen that 3GPP technologies may include future evolutions to access local spectrum in a manner of coexistence principles and spectrum sharing. For any access to the shared spectrum, it may not always be the case that a full spectrum may be colonized by a single access. The coexistence use of spectrum should to be such that any device at any time, may be capable of using shared spectrum and yet leave at least an opportunity for other devices to access the spectrum.

Known incompatibilities: In an example embodiment of the invention, device types that have interfering emission spectra, such as IEEE 802.11 WLAN and Bluetooth emissions both using the same ISM band.

Scaling rules: In an example embodiment of the invention, the scaling rules may include definitions of how a device operating on a shared spectrum may measure and monitor its resource use and other devices' operation, so that it does not monopolize opportunity for other devices to access the spectrum. The scaling may, for example, be a limit of use of the bandwidth or allowed activity of communications by a single device.

Measurements: In an example embodiment of the invention, the measurements may, for example, define a requirement to measure interference rise over the thermal noise and set the device's communication bandwidth narrower or activity less, if the interference in the surroundings is sufficiently high that other devices are likely to be unable to compete with it or are likely to be unable to operate due to its presence.

Device type(s): In an example embodiment of the invention, other device types may be included, for example is it a user equipment, a machine, a meter, a sensor or a type of device that accesses the spectrum. A device may also be differentiated by type, referring to the services it is capable of handling; such as a data device, a video camera, an Internet handset, and the like.

Variation of the device management information by device type: In an example embodiment of the invention, this variation includes information whether or not a device type is allowed.

The coexMO device management object may define filters and exceptions such as allowed device type(s), known incompatibilities, variation of the device management information by device type, variation of the device management action by device type and priority. Such filters and attributes may be expressed in a script language, for example XML.

In an example embodiment of the invention, two or more devices may receive exactly the same device management information or may receive at least a portion of the same device management information, in relevant parts. In an example embodiment of the invention, different devices may receive different device management information for similar purposes of coexistence.

In an example embodiment of the invention, the granted access does not mean that the access itself is necessarily granted, it may merely mean that the grant defines what are the terms and conditions for accessing the shared spectrum. When applying these terms and conditions, it may be subject to other issues, whether the actual spectrum access is successful or not. The actual amount and frequencies of spectrum that may be acquired may depend on many other issues than the actual grant of the coexistence opportunity.

In an example embodiment of the invention shown in FIG. 1C, the coexistence manager function 206 in the RAM in the processor 160 of the coexDM server 200 may be programmed to perform server management functions such as comparing the device management information with reference device management information and replacing at least a portion of the device management information with a corresponding at least a portion of the reference device management information. The coexDM server 200 may provide the reference device management information to the coexistence manager CM 102 serving the coexistence enabler 100 associated with the wireless device STA1.

In an example embodiment of the invention, the RAM and ROM of the coexDM server 200 shown in FIG. 1C, may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of an example embodiment of the invention. The program logic may be delivered to the writeable RAM, PROMS, flash memory devices, etc. of the coexistence enabler from a computer program product or article of manufacture in the form of a non-transitory computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

In an example embodiment of the invention, the coexMO object may include priorities and data flow, or media type dependent filters. If the coexMO object is pushed by the local infrastructure, it may advise the wireless device about the services and offerings that may be available locally via the shared spectrum. As an example, a local sensor network may offer available environmental metrics about the surroundings. A wireless device may receive a pushed local coexMO object describing sensor network in this shared spectrum, so that the device may find communicating sensors that provide environmental metrics. Hence, a device that uses environmental information may start communicating with the sensor devices according to the coexistence schemes in the specified spectrum, in the specified location. The device may therefore benefit from the environmental information available locally. At the same time, another device which receives the same coexMO object may analyze the service offering on the shared spectrum and recognizes that it does not have applications or an interest in the available environmental data and thus, the device may choose to not use the local spectrum opportunities.

The coexDM server 200 of FIG. 1C includes processor 160 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, and semiconductor memory circuit devices are shown at 126 and in FIG. 7, and may serve, for instance, as a data input/output means. Code may include any interpreted or compiled computer language including computer-executable instructions. The code and/or data may be used to create software modules such as operating systems, communication utilities, user interfaces, more specialized program modules, etc.

Figure 1D:
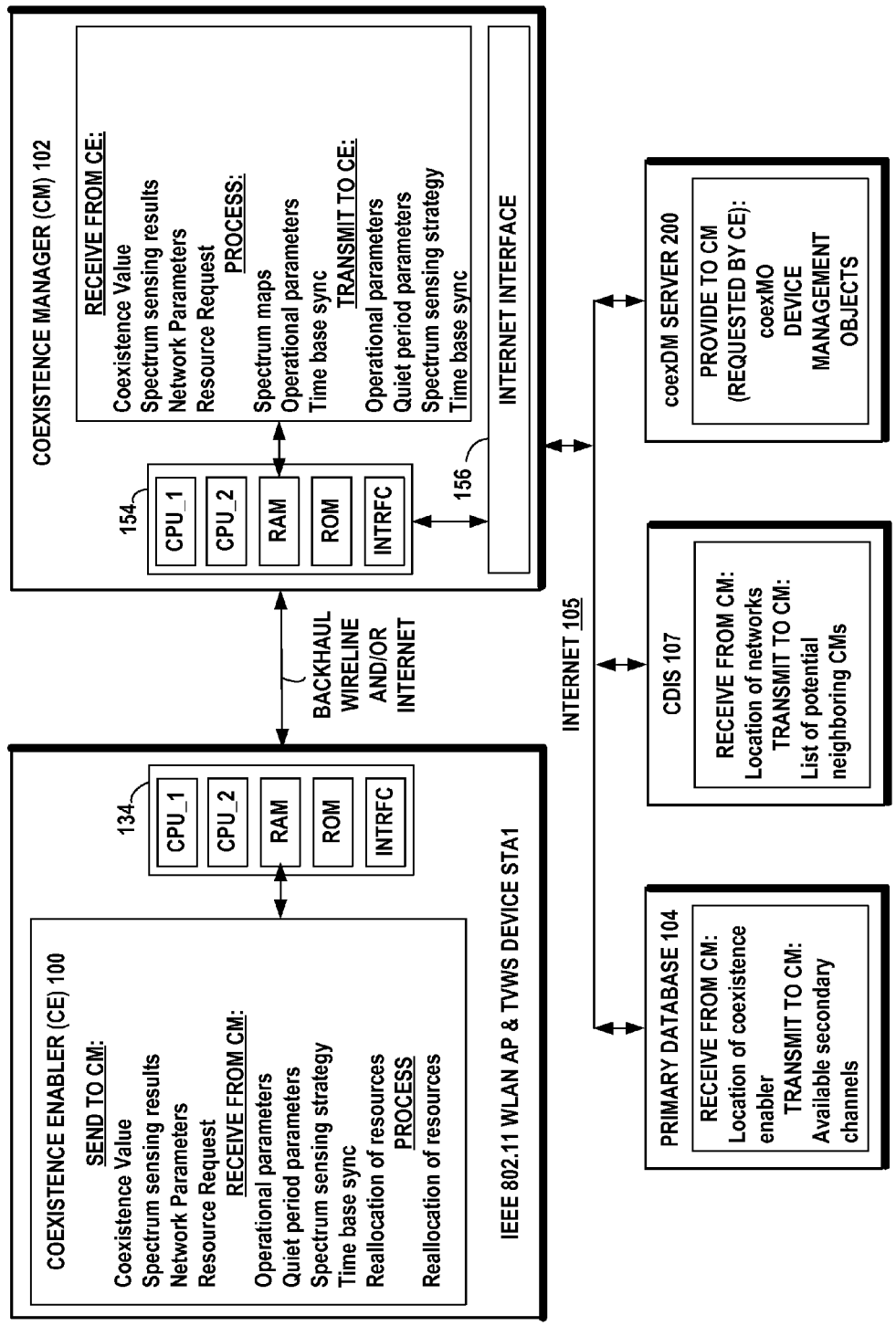
FIG. 1D is an example network diagram according to an embodiment of the present invention, illustrating the IEEE 802.11 WLAN AP and TVWS device STA1, which includes the control node or coexistence enabler, communicating over a backhaul wireline and/or internet link with the network controller or coexistence manager, in an example embodiment of the invention.

FIG. 1D is an example network diagram according to an embodiment of the present invention, illustrating the IEEE 802.11 WLAN AP and TVWS device STA1, which includes the control node or coexistence enabler CE 100, communicating over a backhaul wireline and/or internet link with the network controller or coexistence manager CM 102. The coexistence manager CM 102 may communicate over the internet 105 with the coexDM server 200, the primary database 104, and the coexistence network element coexistence discovery and Information server (CDIS) 107, in an example embodiment of the invention.

FIG. 1E is an example flow diagram of operational steps in the device management for coexistence coexDM server 200 performing a GET coexMO operation, according to an embodiment of the present invention. The steps of the flow diagram 700 of FIG. 1E may represent computer code instructions stored in the RAM and/or ROM memory of the coexDM server 200, which when executed by the central processing units (CPU), carry out the functions of an example embodiment of the invention. The steps may be carried out in another order than shown and individual steps may be combined or separated into component steps.

Step 702 receiving a request from a wireless network, requesting device management information for coexistence within an unassigned frequency band with zero or more neighboring wireless networks of the wireless network; and Step 704 providing the requested device management information for the wireless network, based on at least location of the wireless network, the device management information including at least allowed frequency and transmission power.

FIG. 1F is an example flow diagram of operational steps in the device management for coexistence coexDM server performing a PUSH coexMO operation, according to an embodiment of the present invention. The steps of the flow diagram 800 of FIG. 1F may represent computer code instructions stored in the RAM and/or ROM memory of the coexDM server 200, which when executed by the central processing units (CPU), carry out the functions of an example embodiment of the invention. The steps may be carried out in another order than shown and individual steps may be combined or separated into component steps.

Step 802: accessing an address of a wireless network, and

Step 804: providing device management information for coexistence of the wireless network within an unassigned frequency band with zero or more neighboring wireless networks of the wireless network, based on at least location of the wireless network, the device management information including at least allowed frequency and transmission power.

FIG. 1G is an example flow diagram of operational steps in the wireless network sending a GET coexMO command, according to an embodiment of the present invention. The steps of the flow diagram 900 of FIG. 1G may represent computer code instructions stored in the RAM and/or ROM memory of the wireless device STA1, which when executed by the central processing units (CPU), carry out the functions of an example embodiment of the invention. The steps may be carried out in another order than shown and individual steps may be combined or separated into component steps.

Step 902: transmitting a request, by a node in a wireless network, requesting device management information for coexistence within an unassigned frequency band, with zero or more neighboring wireless networks of the wireless network; and Step 904: receiving, by the node in the wireless network, the requested device management information based on at least location of the wireless network, the device management information including at least allowed frequency and transmission power.

Figure 2:
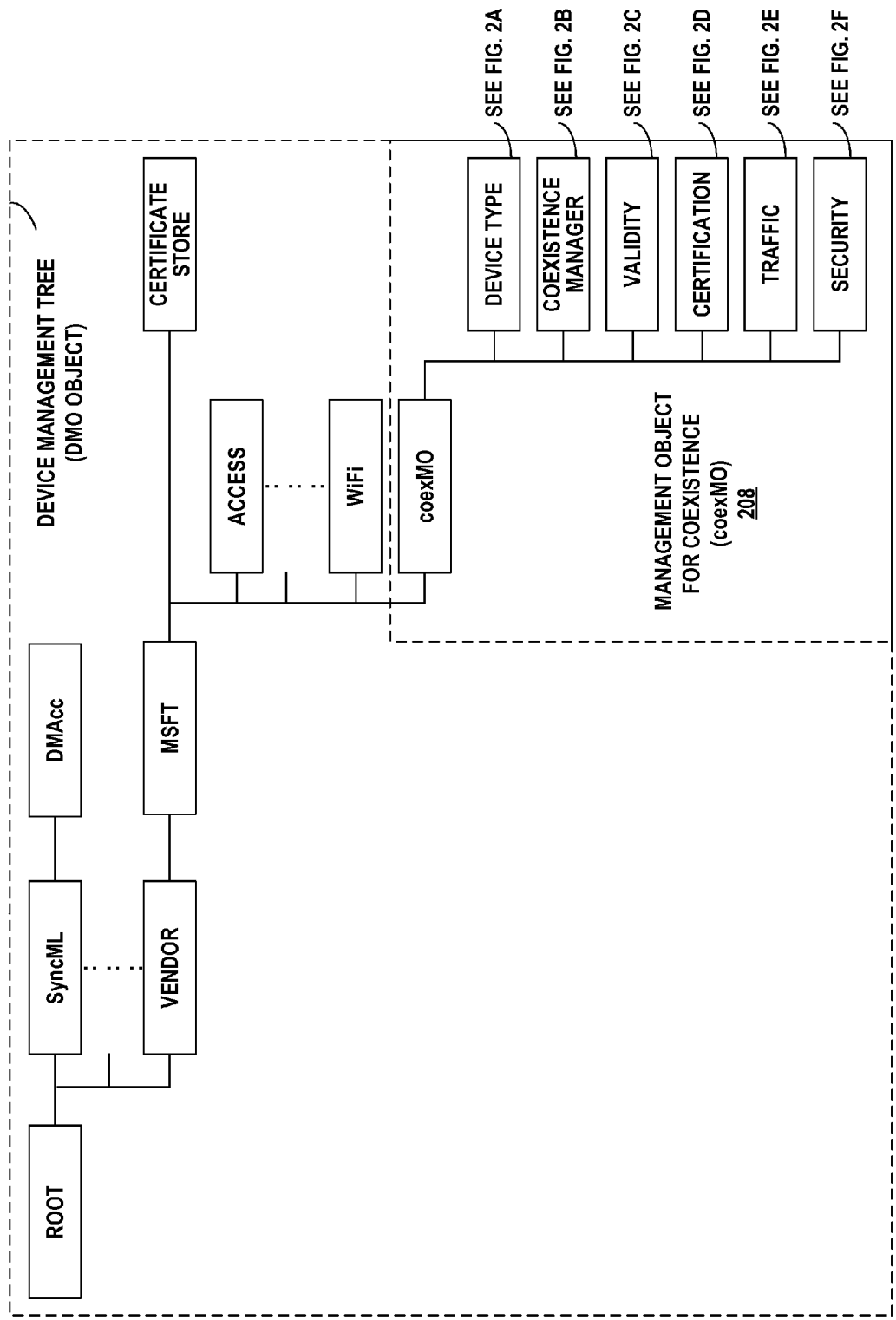
FIG. 2 is an example embodiment of the device management object for coexistence coexMO 208, incorporated as a portion of a device management object (DMO), according to an embodiment of the present invention.

FIG. 2 is an example embodiment of the device management object for coexistence coexMO 208, incorporated as a portion of the DMO object, according to an embodiment of the present invention. The coexMO object may be organized as a sub-tree of nodes within the larger object tree of nodes of the DMO object. The DMO object uses XML for data exchange. The device management takes place by communication between a server, such as coexDM server 200 and the client, such as the wireless device STA1.

In an example embodiment of the invention, the coexMO object is contained as a sub-tree within the DMO object, enabling the coexistence provisioning of a client wireless device, such as STA1, by the device management coexDM server 200. Device configuration information for coexistence is transmitted to the wireless device STA1 in the XML elements comprising the nodes of the coexMO object. The coexDM server 200 may perform device management and provisioning by sending portions of the DMO object and sending server management commands to the client wireless device STA1. The client wireless device STA1 may reply with status information and the provisioning session may end at that time or the provisioning session may continue with the coexDM server 200 sending of additional objects or server management commands to the client wireless device STA1.

In an example embodiment of the invention, in the client wireless device STA1, the configuration information to be managed may be arranged as an XML tree of management objects that may be managed by management commands from the coexDM server 200. The DMO device management object tree is formed of nodes, and the management coexMO object is a subtree to the DMO management tree and may be formed of one or more nodes. A node may be a single parameter, a subtree or a collection of data. An interior node in the tree has child nodes, whereas a leaf node has no child nodes. The nodes may be permanent or dynamic. Permanent nodes typically may not be deleted. Dynamic nodes may be added by a client wireless device STA1 or by the coexDM server 200. Dynamic nodes may be added using device management commands.

In an example embodiment of the invention, each node may contain an access control list (ACL) defining what changes may be made to the node and by which entities. The changes that may be made are defined by one or more access rights specified in the ACL, such as (1) add access; (2) replace access; (3) get access; (4) delete access; and (5) execute access. If a dynamic node is created by the coexDM server 200, the coexDM server 200 may have replace access rights for the created node.

An example description the principles of a DMO may be found, for example, in the OMA Device Management Tree, DMO object, and DM server management commands published in the publication: *OMA Device Management Tree and Description*, Candidate Ver. 1.3, Open Mobile Alliance Ltd., Dec. 7, 2010, which is incorporated herein by reference.

Figure 2A:
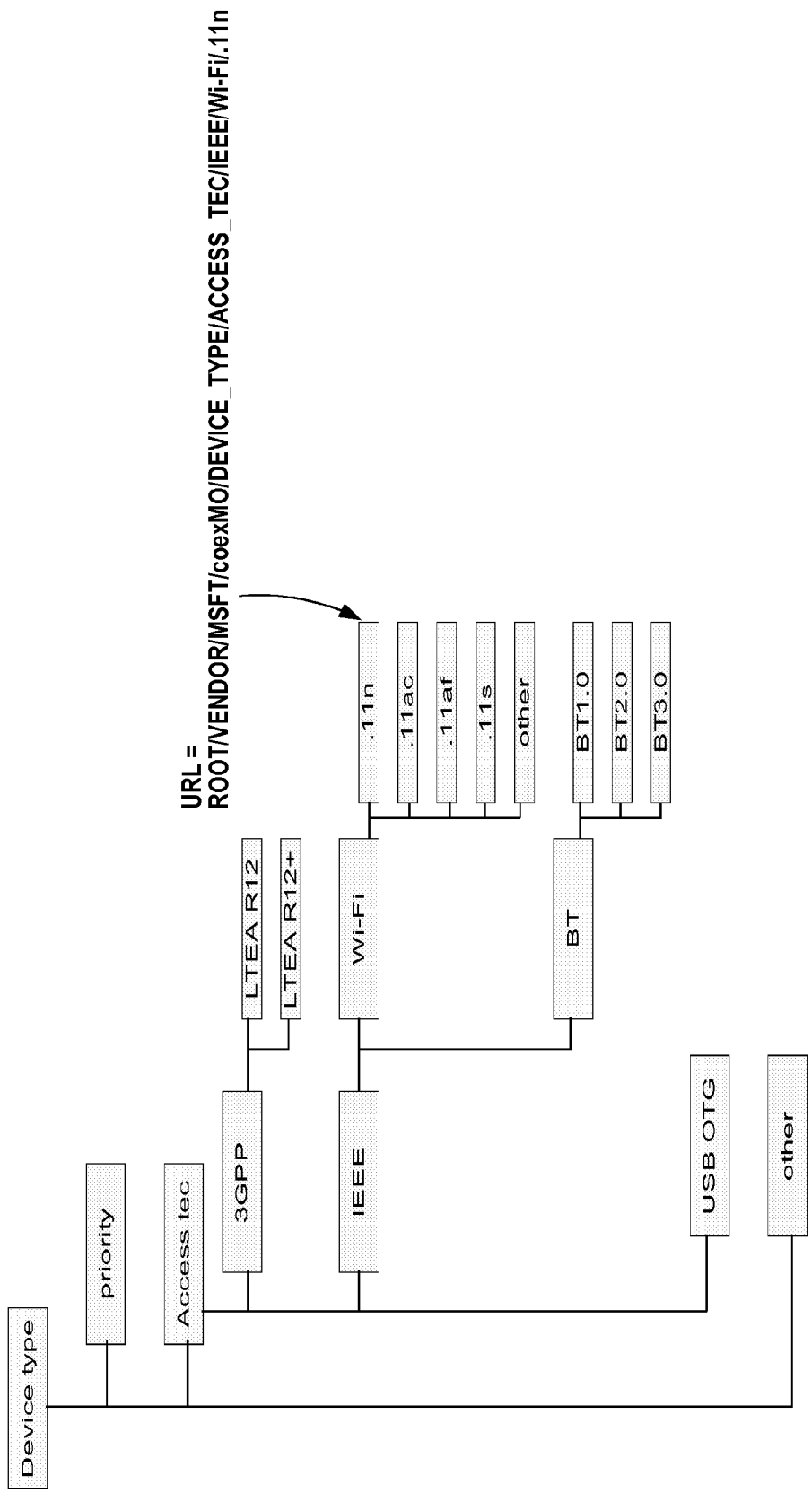
FIG. 2A is an example embodiment of the radio access technology dependent part. of the management object for coexistence (coexMO) 208 incorporated as a portion of the DMO device management object tree, according to an embodiment of the present invention.

FIG. 2A is an example embodiment of the radio access technology dependent part of the management object for coexistence (coexMO) 208 incorporated as a portion of the DMO device management object tree, according to an embodiment of the present invention. The radio access technology dependent part may, for example, define for IEEE or 3GPP technologies, or their future evolutions.

In an example embodiment of the invention, the coexMO object 208 nodes are addressable with a uniform resource locator (URL) identifying the sequence of interior nodes and child nodes leading the leaf node containing the device management value being accessed. For example, the wireless device STA1 in FIG. 1C may be a device type that uses IEEE 802.11n as an access technology. The coexistence enabler 100 may transmit an HTTP GET request via the coexistence manager 102 to the coexDM server 200 to retrieve the coexMO object 208 or a specified sub-tree or node of the coexMO object, expressed as the following URL, as shown in FIGS. 2 and 2A:

URL=ROOT/VENDOR/MSFT/coexMO/DEVICE_TYPE/ACCESS_TEC/IEEE/Wi-Fi/0.11n

In an example embodiment of the invention, such a GET request may cause the coexDM server 200 to perform a GET function to retrieve the specified device management object or portion thereof and return the device management information to the requesting wireless device STA1. The device management information returned by the coexDM server 200 may be based on at least the location of the wireless device STA1 and may include at least an allowed frequency and an allowed transmission power appropriate for a device type that uses IEEE 802.11n as an access technology.

Figure 2B:
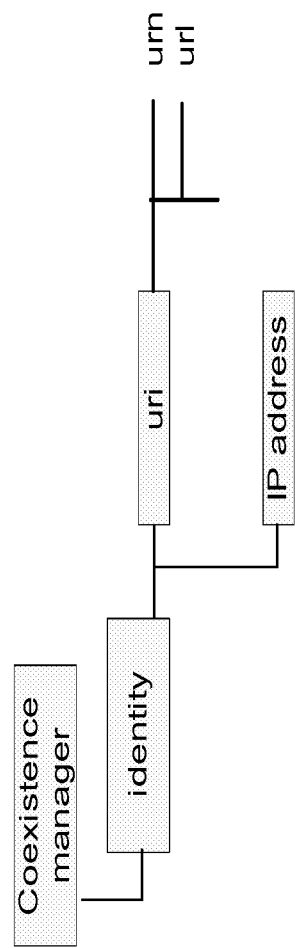
FIG. 2B is an example embodiment of the coexistence manager identification part of the management object for coexistence (coexMO) 208 incorporated as a portion of the DMO device management object tree, according to an embodiment of the present invention.

FIG. 2B is an example embodiment of the coexistence manager identification part of the management object for coexistence (coexMO) 208 incorporated as a portion of the DMO device management object tree, according to an embodiment of the present invention. The identity may, for example, have forms of uniform resource identifier such as the uniform resource location (URL) or uniform resource name (URN). The identity may further have forms of an Internet Protocol address, that is globally addressable or a subnet address with a given or unknown prefix. The address may have forms of a permanent allocated address, a dynamic address, the form of which may be IP version 6 or IP version 4 or a Host Identity protocol (HIP) address.

Figure 2C:
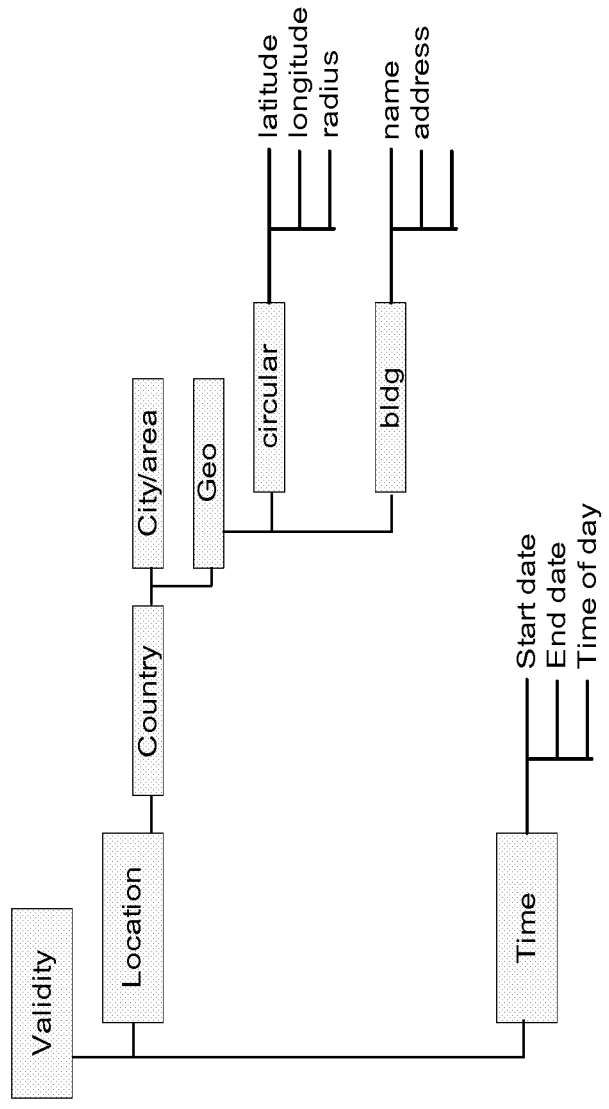
FIG. 2C is an example embodiment of the validity part of the management object for coexistence (coexMO) 208 incorporated as a portion of the DMO device management object tree, according to an embodiment of the present invention.

FIG. 2C is an example embodiment of the validity part of the management object for coexistence (coexMO) 208 incorporated as a portion of the DMO device management object tree, according to an embodiment of the present invention. The validity may consist, for example, of geographical and time definitions. Geographical location may be based on coordinates, latitude, longitude, altitude or on names of a city, area, a building or its street address.

Figure 2D:
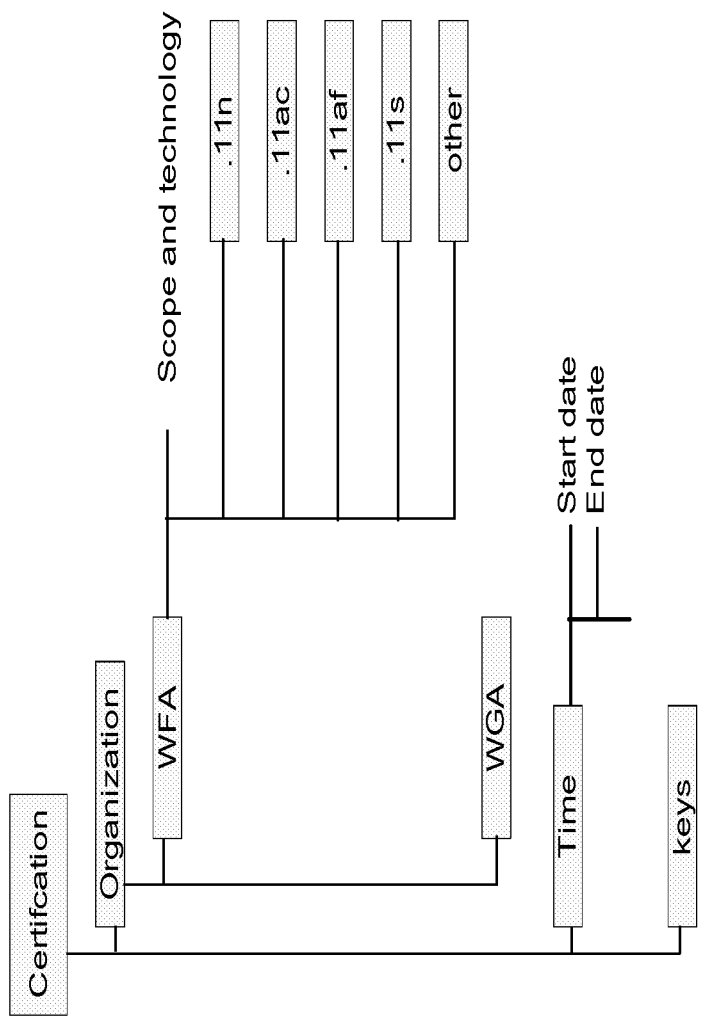
FIG. 2D is an example embodiment of the certification part of the management object for coexistence (coexMO) 208 incorporated as a portion of the DMO device management object tree, according to an embodiment of the present invention.

FIG. 2D is an example embodiment of the certification part of the management object for coexistence (coexMO) 208 incorporated as a portion of the DMO device management object tree, according to an embodiment of the present invention.

Figure 2E:
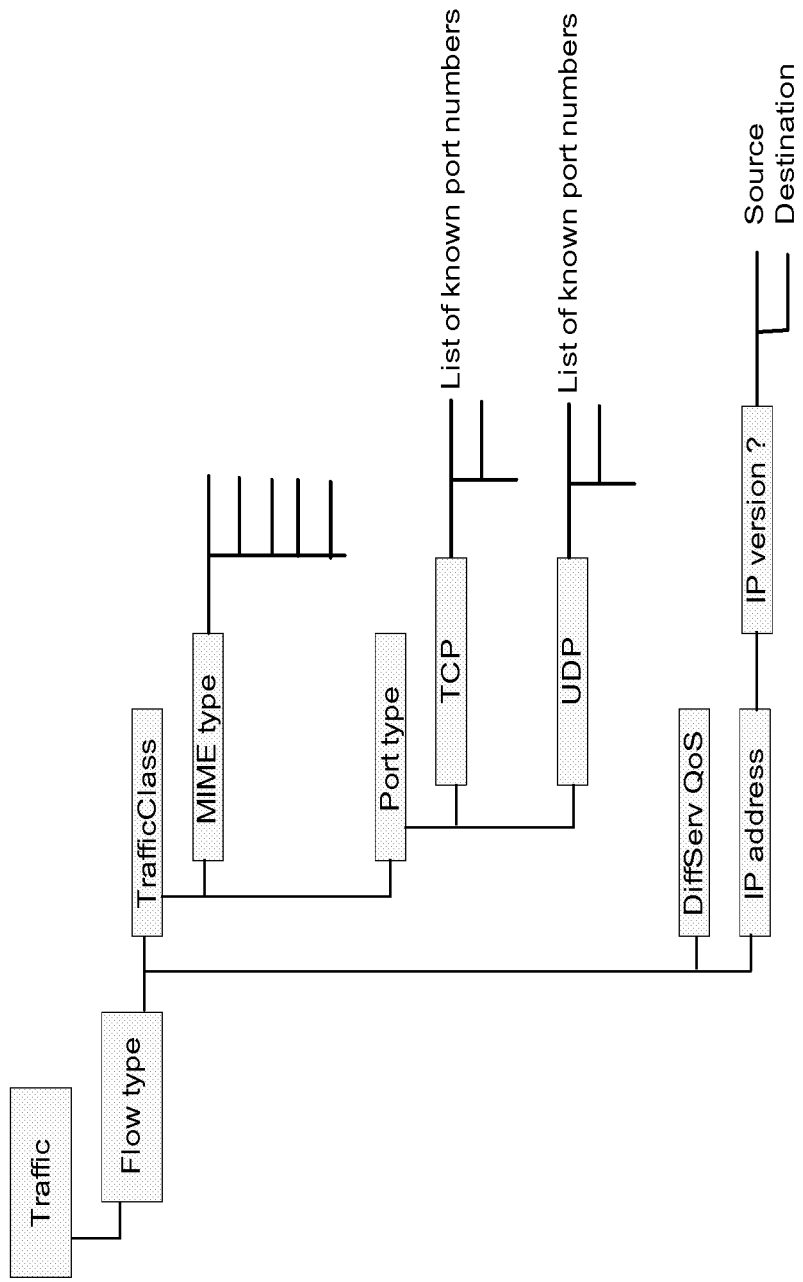
FIG. 2E is an example embodiment of the traffic dependent part of the management object for coexistence (coexMO) 208 incorporated as a portion of the DMO device management object tree, according to an embodiment of the present invention.

FIG. 2E is an example embodiment of the traffic dependent part of the management object for coexistence (coexMO) 208 incorporated as a portion of the DMO device management object tree, according to an embodiment of the present invention. Traffic dependent part may, for example, consist of Multipurpose Internet Media types, port types, email types, codec types or the like. Traffic dependent part may also include traffic classes of the differentiated services or their codepoints, or notations of the IP version and their acting sources and/or destinations, subnets or domains (domain names).

Figure 2F:
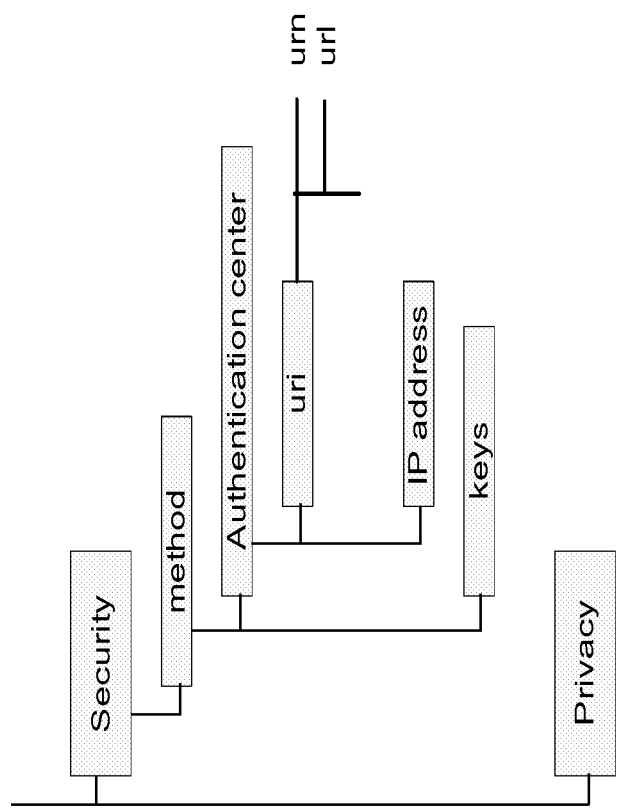
FIG. 2F is an example embodiment of the security and privacy dependent part of the management object for coexistence (coexMO) 208 incorporated as a portion of the DMO device management object tree, according to an embodiment of the present invention.

FIG. 2F is an example embodiment of the security and privacy dependent part of the management object for coexistence (coexMO) 208 incorporated as a portion of the DMO device management object tree, according to an embodiment of the present invention. Privacy definitions may, for example, be PIM codes, PIN codes, certificates, passwords, credentials or identities or defined levels of requested privacy that may further depend on the time and/or place and/or service.

Figure 3A:
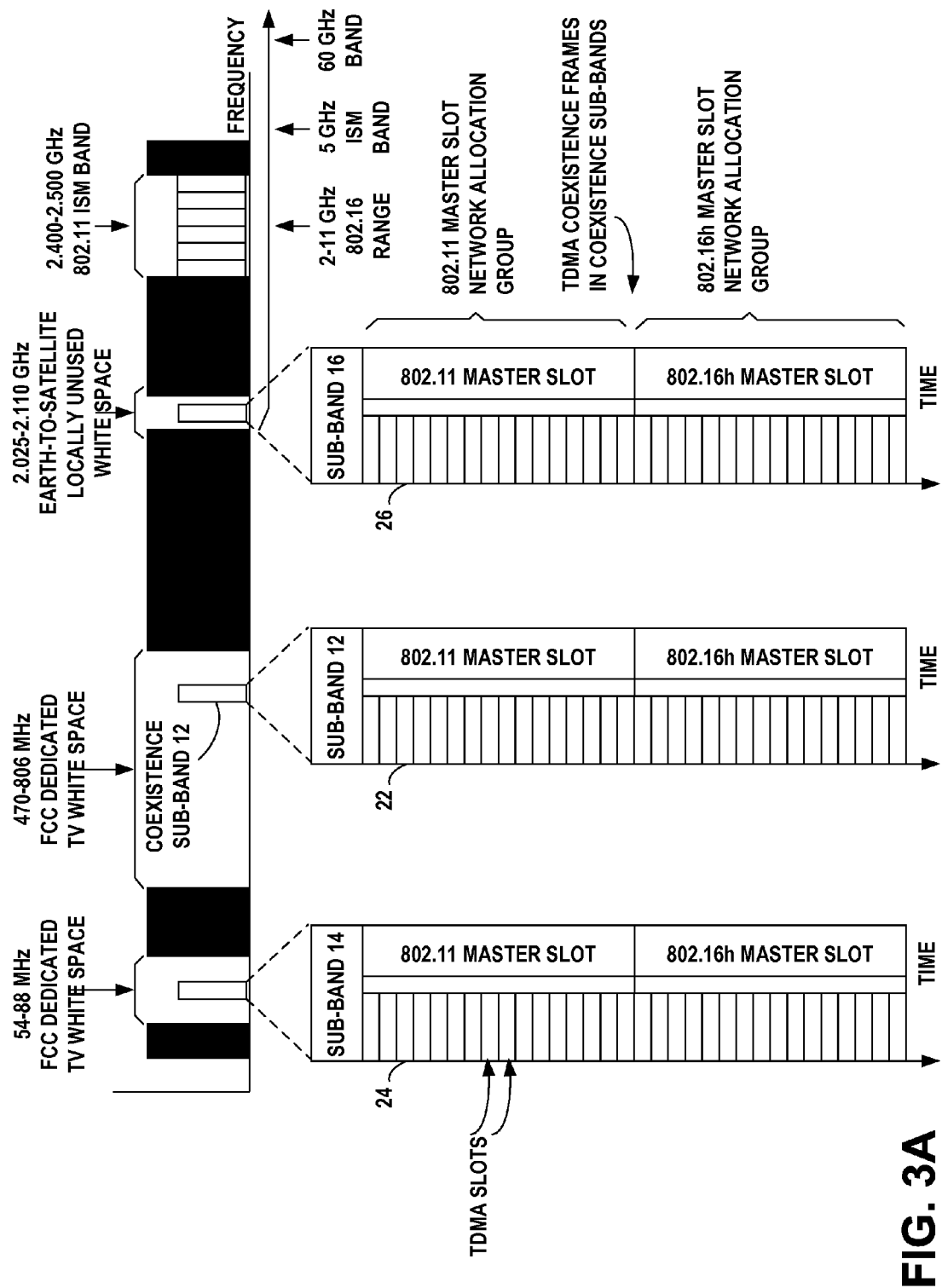
FIG. 3A is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention.

FIG. 3A is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention. License-exempt access to these bands as a secondary use for coexistence of networks requesting additional resources, may include restrictions on geographic location, transmission power, range, and bandwidth of the transmissions of the requesting networks.

For example, the 802.11 WLAN standards specify frequencies for operation in the 2.400-2.500 GHz ISM band, the 5 GHz ISM band, and the IEEE 802.11ad Very High Throughput 60 GHz band. The 802.11 WLAN standards specify an OFDM-based physical layer with a bandwidth of 20 MHz channel separation. At 11 MHz from the center of the channel, the energy is approximately 20 dB lower than the maximum signal level. Further away from the centre frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space band at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 3A shows an example of the location of the white spaces in the RF spectrum and example TDMA coexistence frames in the white space bands, showing the freely available time slots before any networks have been allocated slots. The white spaces include the FCC dedicated TV white space 54-88 MHz band, the FCC dedicated TV white space 470-806 MHz band, and locally unused the earth station-to-satellite white space band 2.025 GHz to 2.110 GHz.

In an example embodiment of the invention, there are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

In an example embodiment of the invention, the example coexistence technique illustrated here for each sub-band 12, 14, and 16, is time division multiplexing of the slots in TDMA coexistence frames allocated to different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA1, may include Internet access and geo-location capability. The TDMA coexistence frame may be divided into a IEEE 802.11 master slot network allocation group and an IEEE 802.16h master slot network allocation group. The IEEE 802.11 master slot network allocation group carries twelve free IEEE 802.11 WLAN white space slots. The IEEE 802.16h master slot network allocation group carries the twelve free IEEE 802.16h WMAN white space slots.

Figure 3B:
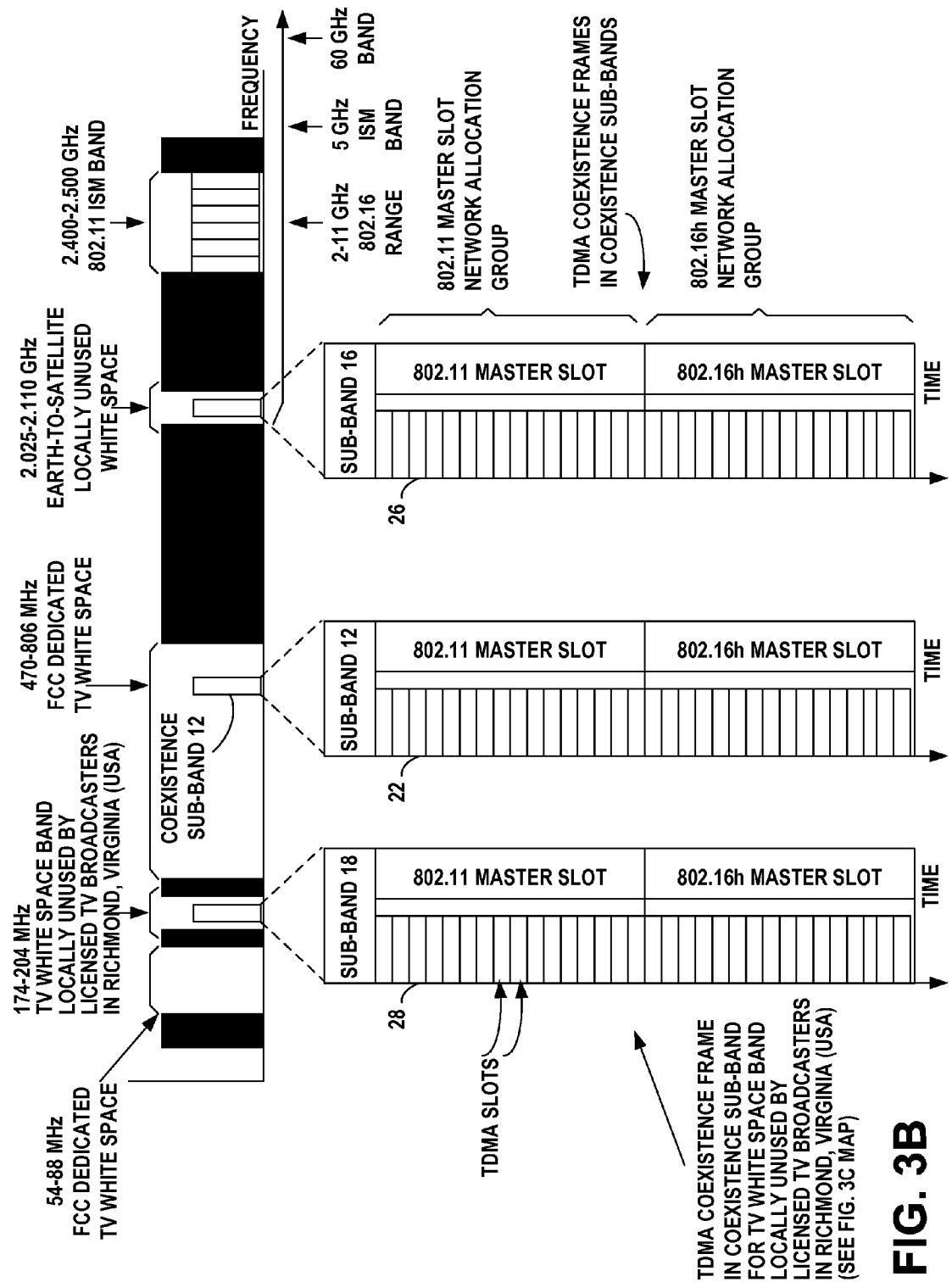
FIG. 3B is an example frequency band diagram illustrating an example TDMA coexistence frame 28 in sub-band 18 in the TV band white space locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV band white space of 470-806 MHz, and an example TDMA coexistence frame 26 in sub-band 16 in the earth station-to-satellite locally unused white space band 2.025 GHz to 2.110 GHz, according to an embodiment of the present invention.

In an example embodiment of the invention, FIG. 3B is an example frequency band diagram illustrating an example TDMA coexistence frame 28 in sub-band 18 in the TV band white space locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV band white space of 470-806 MHz, and an example TDMA coexistence frame 26 in sub-band 16 in the earth station-to-satellite locally unused white space band 2.025 GHz to 2.110 GHz, according to an embodiment of the present invention.

Figure 3C:
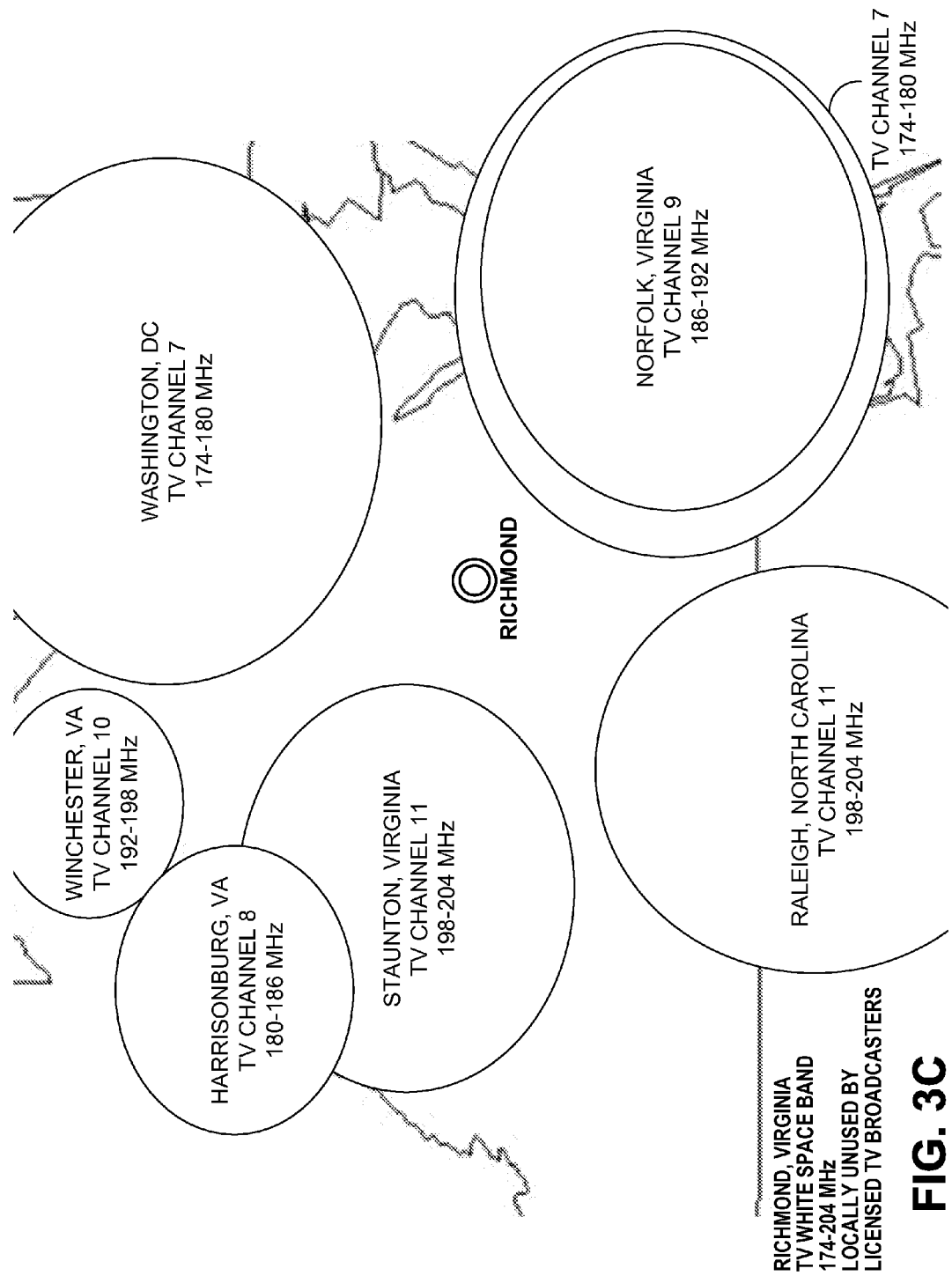
FIG. 3C is an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, according to an embodiment of the present invention.

In an example embodiment of the invention, FIG. 3C is an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, as shown in FIG. 3B. The cities where there are TV broadcasters for TV channels 7, 8, 9, 10, and 11 in a circular area of approximately 160 kilometers in diameter surrounding the city of Richmond, Va., are shown in the following table. The map of FIG. 3C shows that there is no coverage by licensed TV broadcasters in the 174-204 MHz band, which is therefore a locally available TV band white space.

| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 4A:
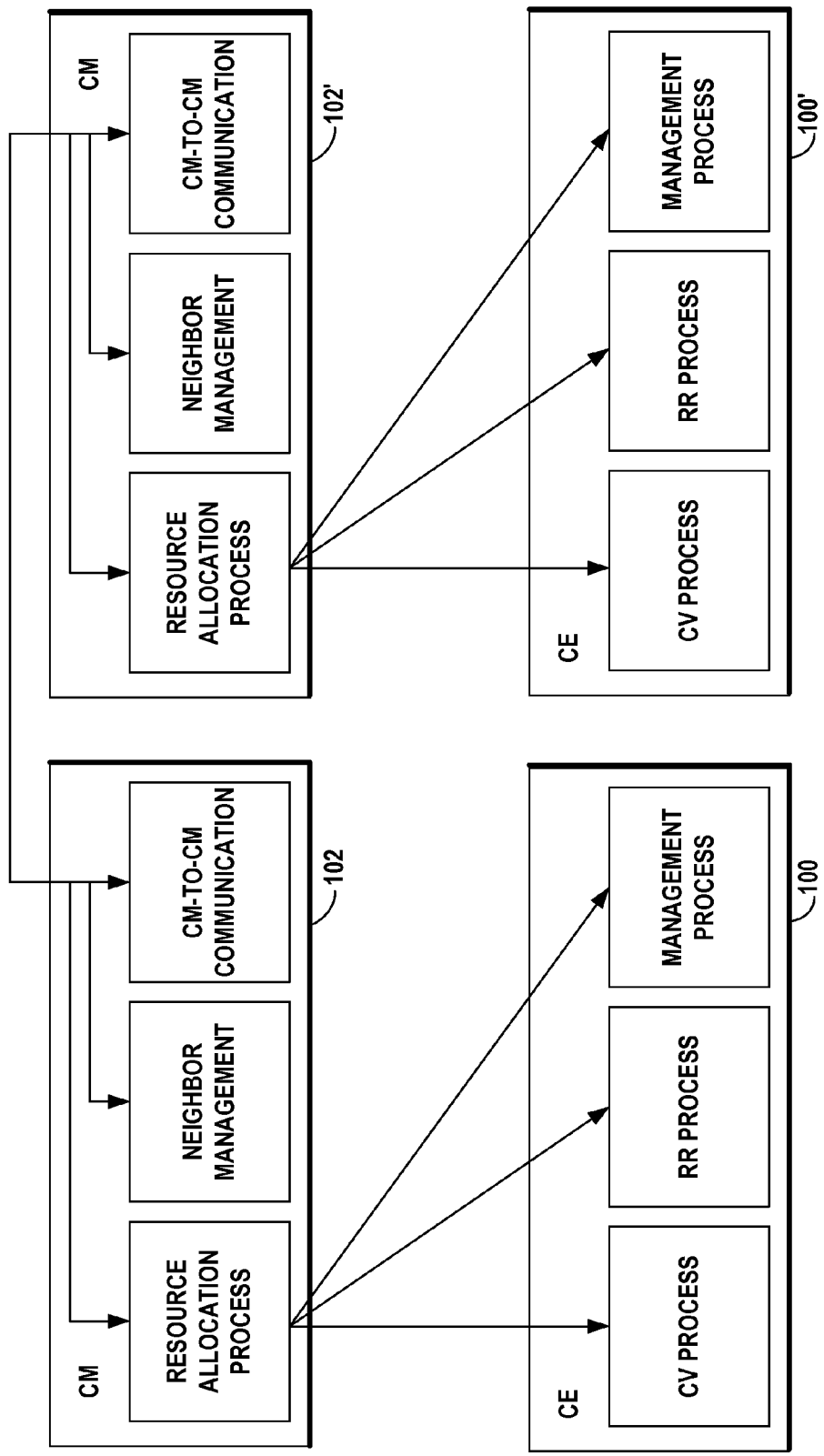
FIG. 4A is an example of the basic functionalities of the network controller or coexistence manager and the control node or coexistence enabler, according to an embodiment of the present invention.

FIG. 4A is an example of the basic functionalities of the network controller or coexistence manager and the control node or coexistence enabler.

For the control node or coexistence enabler (CE):

Coexistence Value (CV) process: Determine a parameter that characterizes the network's eligibility level to the spectrum resources. The parameter is determined from certain parameters of the network. The parameter may be called a coexistence value. Provide the CV of the network to the CM serving the CE.

Resource Request (RR) process: Form a resource request and issue it to the serving CM. Formed based upon information gathered from the network on its resource needs.

Management process: Registers the CE to a CM in order to become served by the CM. Maintains connection to the CM and provides information e.g. about network capabilities and CE features. Contains support functions that make the actual coexistence management functionality possible.

For the network controller or coexistence manager (CM):

Resource allocation process: Shares CVs from the CEs one is serving with the CMs of the neighboring networks. Exchanges spectrum maps with the CMs of the neighboring networks. Determines resource allocations using the CVs and spectrum maps.

Neighbor management: Determines neighbors for the CEs/networks the CM serves and facilitates connection setup between CMs serving neighboring networks.

CM-to-CM communication: Provides basic communication services for other functions/processes of the CM to exchange information with other CMs. Communication is needed between CMs that serve CEs of neighboring networks to exchange e.g. CV parameter values and RR process related information.

Figure 4B:
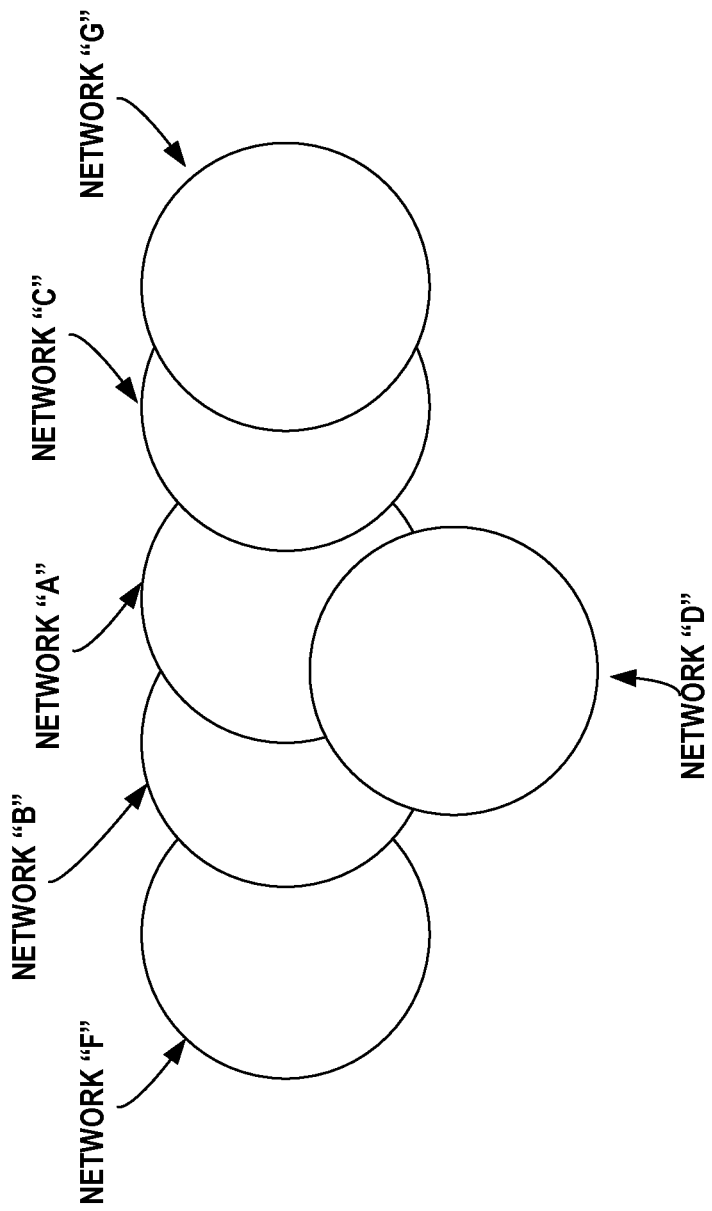
FIG. 4B is an example network topology scenario where the network "B" needs more resources, according to an embodiment of the present invention.

FIG. 4B is an example network topology scenario where the network "B" needs more resources, according to an embodiment of the present invention. An example embodiment of the invention specifies the coexistence entities, their relationships and the resource request method, as illustrated by the following example. The FIG. 4B shows a network scenario, where the circles A, B, C, D, E, F, and G represent the coverage area of each network. These networks are controlled in coexistence by the control node or coexistence enabler and the coexistence manager. Each network has its own coexistence enabler and may have its own coexistence manager or alternately one coexistence manager may control several networks, for example a company WLAN network with several APs.

Figure 4C:
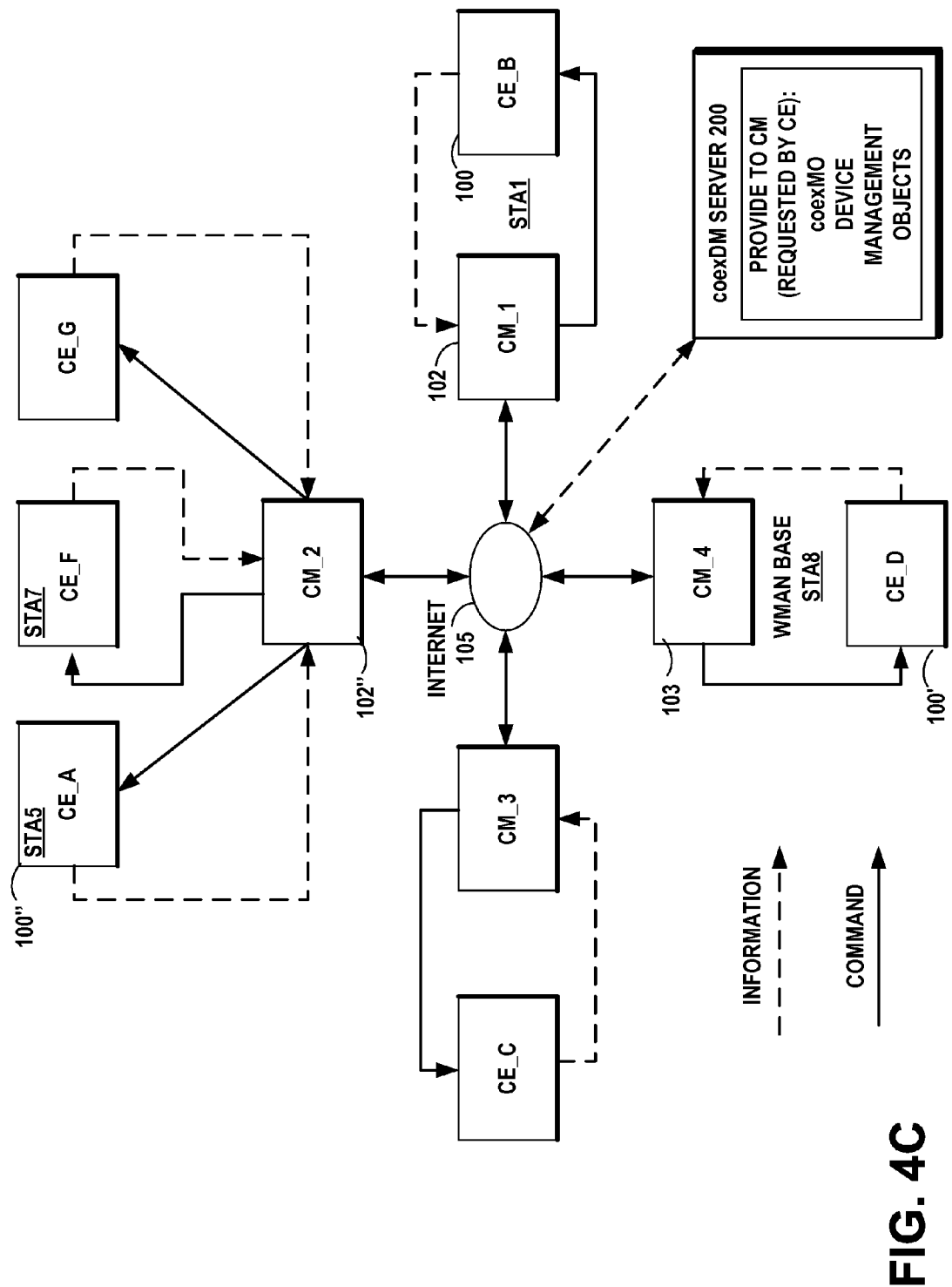
FIG. 4C is an example of coexistence management of the several networks shown in FIG. 4B and the coexDM server, according to an embodiment of the present invention.
Figure 4D:
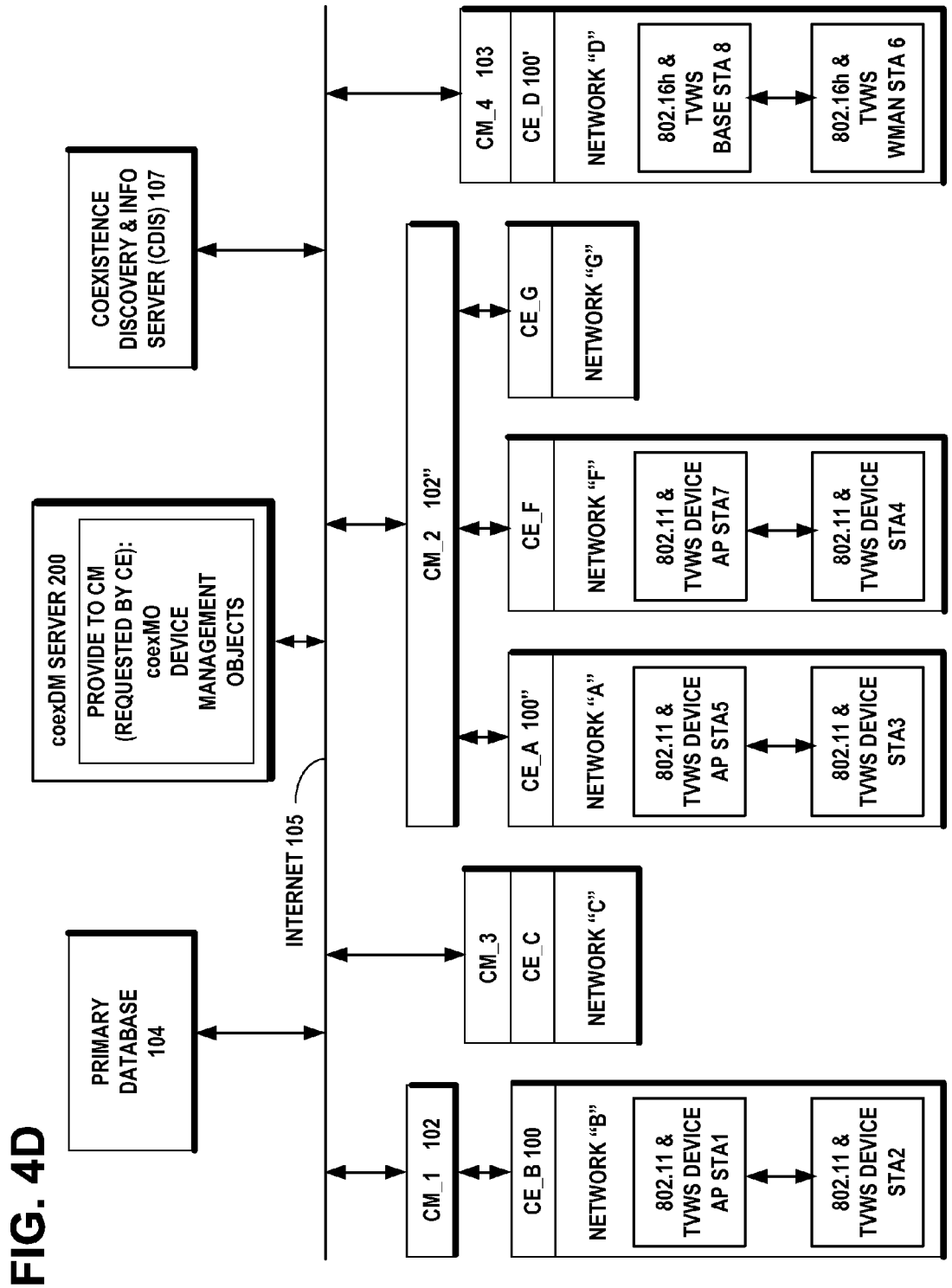
FIG. 4D is an example arrangement of the control node or coexistence enablers for networks A through G, the network controller or coexistence managers serving the coexistence enablers, the coexDM server, the primary database, and the coexistence network element Coexistence Discovery & Info Server (CDIS), according to an embodiment of the present invention.

FIG. 4C is an example of coexistence management of the several networks shown in FIG. 4B, according to an embodiment of the present invention. Different network controller or coexistence managers 102 are connected together based on actual network overlapping below them. Also networks A, F, and G may form a company network, where each network has its own control node or coexistence enabler 100", but all are managed by one network controller or coexistence manager 102". To complete the architecture view all coexistence managers have a connection to the coexDM server 200, primary database 104 and coexistence network element Coexistence Discovery & Info Server (CDIS) 107, as shown in FIG. 4D. It is possible that some networks may rely only on spectrum sensing (a special mode in FCC TV white spaces) or some cognitive spectrum access means.

FIG. 4D is an example arrangement of the control node or coexistence enablers 100 for networks A through G, the network controller or coexistence managers 102 and 103 respectively serving the coexistence enablers 100 and 100', the coexDM server 200, the primary database 104, and the coexistence network element Coexistence Discovery & Info Server (CDIS) 107, according to an embodiment of the present invention. For example, the coexistence manager CM_1 serves a single coexistence enabler CE_B for network "B" that includes STA1. The coexistence manager CM_3 serves a single coexistence enabler CE_C for network "C". The coexistence manager CM_4 serves a single coexistence enabler CE_D 100' for the 802.16 network "D" that includes base STA 8. Coexistence manager CM_2 102" serves three coexistence enablers CE_A, CE_F, and C_G. Coexistence enabler CE_A 100" serves network "A" that includes STA5 and STA3. Coexistence enabler CE_F serves network "F" that includes STA4. All four coexistence managers CM_1, CM_2, CM_3, and CM_4 may access each other over the Internet 105, based on actual network overlapping of the networks they serve. All of the coexistence managers CM_1, CM_2, CM_3, and CM_4 have a connection to the primary database 104 and coexistence network element Coexistence Discovery & Info Server (CDIS) 107.

In an example embodiment of the invention, the coexistence manager 102 applies rules in making its determination of which of two networks based on different technologies, should be given priority in spectrum reallocation. For example, WLAN devices are typically designed for better resistance to saturation than WMAN devices, since WMAN devices must be more sensitive to attenuated signals received over a greater range than are WLAN devices. Thus, in an example embodiment of the invention, the coexistence manager 102 will generally favor the reallocation of an 802.11 network to the TVWS band, instead of reallocating the 802.16 network, when spectrum reallocation is requested, so as to remove the source of disturbance from the vicinity of 802.16 network.

In an example embodiment of the invention, the coexistence manager (CM) 102 decides, if no free channel or enough advertised resources were available, whether to grant the request by determining whether resource allocation requires an extensive reallocation or a light reallocation of a number of secondary channels or networks. In a light resource request process, for example, a change in the number of terminals within a single frequency channel may require changes only among the allocations between the users of that channel. In an extensive resource request process, for example, if a primary user reserves a channel, then all secondary users of that channel need to be reallocated to other channels, and a more complete resource reallocation may be initiated.

In an example embodiment of the invention, the coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls the TV white space MAC to communicate in channels in the TV white spaces band reallocated by the coexistence manager 102, without interference from other networks sharing the same white space channels.

An example embodiment of the types of information exchanged between the coexistence manager 102, primary database 104, Coexistence Discovery & Info Server (CDIS) 107, and control node or coexistence enabler 100 may be as follows.

Between coexistence manager and Primary database:
→Location of coexistence enabler to Primary database
←Available channels for secondary usage to coexistence manager Between coexistence manager and Coexistence Discovery & Info Server (CDIS):
→Location of networks to CDIS
→Network parameters for neighbor discovery such as maximum transmit power, receiver sensitivity, interference tolerance and operating frequency capabilities,
←Potential neighbor coexistence managers to coexistence manager Processing in coexistence manager:
↔ Spectrum maps
↔ Operational parameters of its own (alternative 1), operational parameters of its own and real neighbors (alternative 2)
↔ time base sync Between coexistence manager and coexistence enabler:
→Operational parameters to coexistence enabler
→Quiet period parameters to coexistence enabler
→Spectrum sensing strategy to coexistence enabler
→Time base sync to coexistence enabler
←Coexistence value (CV) to coexistence manager
←Spectrum sensing results to coexistence manager
←Network parameters to coexistence manager
←Resource Request to coexistence manager Procedures to find real neighbors, how to analyze fair resource allocation between the real neighbors, and what content is to be communicated between real neighbors is described in the copending U.S. patent application Ser. No. 12/689,663, filed Jan. 19, 2010, entitled "Apparatus Identification In Coexistence Networking", by Mika Kasslin, Jari Junell, Juha Salokannel, assigned to Nokia Corporation and incorporated herein by reference.

In an example embodiment of the invention, the objective in the resource request process is to keep the changes in spectrum allocations within as small a number of networks as possible, but still maintain fairness between the secondary networks. The operating principle to accomplish this is to first search for a free channel and/or advertised free resources, these two first steps may be implemented in opposite order or one of them may be skipped. And then divide spectrum reallocation into light and more extensive resource requests, corresponding to the stimulus that invokes the resource request process. This results in more stability, on an average, to changes in allocations and avoids a request causing an avalanche of new allocation requests to neighboring networks. The discussion concerning fairness may also apply to weighted or priorized fairness in a manner favoring some users, some authority, some device, some device type, some service, some application, or some purpose of use.

In an example embodiment of the invention, when a need for new resources is requested by the coexistence enabler, the coexistence manager of a secondary network may first check if there was a free channel or enough free advertised resources in neighborhood. If there are not enough resources seen, the coexistence manager may analyze the local network environment and then select a suitable resource request process. Example reasons for causing a resource request may include:

1. A primary has appeared in a channel currently available for secondary usage; a) occupied at the moment by a secondary network or b) free or backup/evacuation channel.

2. A new secondary network has entered the area

3. Interference level by some cause has raised to intolerable level
4. A new channel is found available for secondary usage
5. A secondary network in the area has closed its operation
6. A secondary network has need for more resources
7. A secondary network is releasing resources In an example embodiment of the invention, the first three example reasons for causing a resource request may initiate a more extensive resource request, since there is either a change in the number of available networks or the number of secondary networks is reduced. The appearance of a primary network may be found by spectrum sensing or cognition with the coexistence enabler and the coexistence enabler will then report that appearance to the coexistence manager. The appearance of a primary network may also be found when the primary database 104 communicates that information to the coexistence manager, causing the coexistence manager to command the coexistence enabler to shift the network.

In an example embodiment of the invention, the appearance of a new secondary network may also be found by spectrum sensing or cognition with the coexistence enabler and the coexistence enabler will then report that appearance to the coexistence manager. The appearance of a new secondary network may also be found directly from the network to the coexistence manager, with the help of the CDIS 107 to sort out whether these two networks are real neighbors or logical neighbors.

The fourth and fifth reasons for a resource request, either a new channel is found available for secondary usage or a secondary network in the area has closed its operation, may be a cause for some networks to initiate more extensive resource allocation.

The sixth and seventh reasons for a resource request, either a secondary network has need for more resources or a secondary network is releasing resources, may result in a light resource allocation.

In an example embodiment of the invention, after a more extensive resource request has been made, each network has been allocated to a certain network allocation group and to each of these groups is allocated a certain quantity of channels based on the number of networks in each group and network parameters characterizing the group. In a light resource request, the resources are only reallocated among those networks that belong to the same network allocation group.

Figure 5A:
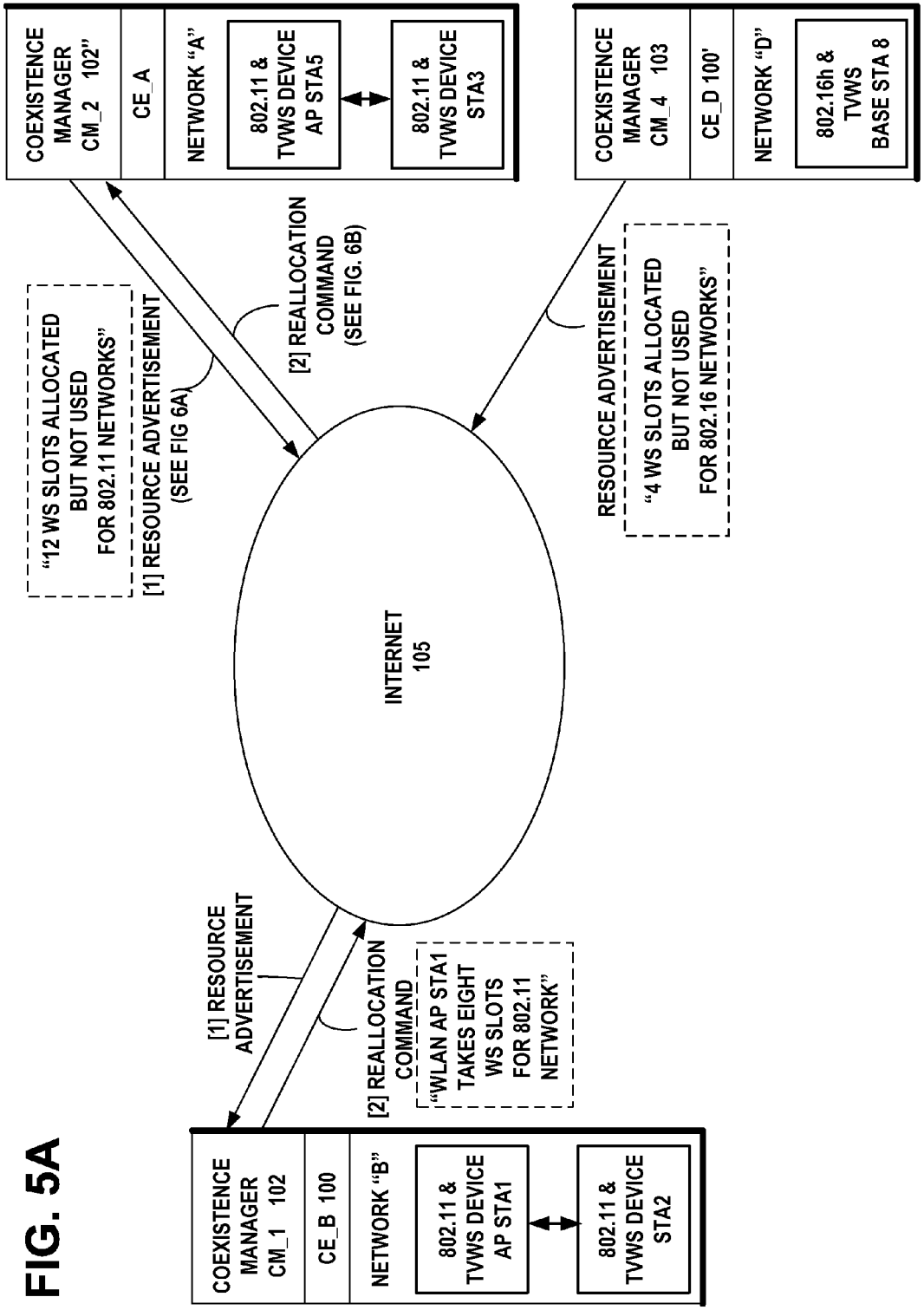
FIG. 5A is an example network diagram according to an embodiment of the present invention, illustrating an example of communicating by the network controller or coexistence manager 102, with one or more coexistence managers managing neighboring wireless networks, which advertise white space slots allocated but not used in a coexistence band, according to an embodiment of the present invention.

FIG. 5A is an example network diagram according to an embodiment of the present invention, illustrating if there are no or an insufficient number of available free resources in the coexistence band, then checking by the network controller or coexistence manager for availability of allocated but unused resources in the coexistence band, as advertised by one or more coexistence managers managing neighboring wireless networks in the network allocation group. As an example, the coexistence manager CM_1 102, receives from one or more coexistence managers CM_2 and CM_4 103 managing neighboring wireless networks, advertisements of an availability of allocated but unused resources in a coexistence band. CM_2 transmits in step [1] a resource advertisement, "12 WS slots allocated but not used for 802.11 networks", as shown in the spectrum diagram of FIG. 6A. CM_1 replies in step [2] with a reallocation command "WLAN AP STA1 takes eight WS slots for 802.11 network", as shown in the spectrum diagram of FIG. 6B.

FIG. 5B is an example network diagram according to an embodiment of the present invention, illustrating if there are no or an insufficient number of available free resources or not enough advertised allocated but unused resources in the coexistence band for the network allocation group, then analyzing by the network controller or coexistence manager an allocation of used resources in the coexistence band for neighboring wireless networks in the network allocation group, for which the control node or coexistence enabler is eligible. As an example, in step [1] the coexistence manager CM_1 102 sends a query "Analyze Allocation Of WS Slots For WLAN 802.11 Neighbor Networks" to analyze allocations. In step [2] CM_2 then receives a resource status "Using 4 TVWS Slots For 802.11 STA3 in 802.11 Network 'A'" from coexistence manager CM_2, as shown in the spectrum diagram of FIG. 6C. In step [3] CM_1 then sends a reallocation command to CM_2 "WLAN AP STA1 Takes Two TVWS Slots For 802.11 Network", as shown in the spectrum diagram of FIG. 6D.

In an example embodiment of the invention, coexistence managers may advertise the resource status information of the networks they serve and keep the neighboring networks aware of the availability of both allocated but unused resources in the coexistence band and used resources in the coexistence band. In this manner, a coexistence manager serving networks requiring resources may review the previously distributed advertisements of both allocated but unused resources in the coexistence band and used resources in the coexistence band and then proceed immediately to a reallocation command.

FIG. 5C is an example network diagram according to an embodiment of the present invention, illustrating if there are insufficient available resources and insufficient reallocatable used resources in the coexistence band for neighboring networks in the network allocation group, for which the control node or coexistence enabler is eligible, then extending analysis by the network controller or coexistence manager to an allocation of used resources in the coexistence band for all neighboring wireless networks regardless of the network allocation group, i.e., both those networks within and outside of the same network allocation group, for which the coexistence enabler is eligible. As the result, reallocation commands may be issued to all the neighboring networks regardless of their network allocation group. As an example, in step [1] the coexistence manager CM_1 102 sends a query "Analyze Allocation Of WS Slots For All Neighbor Networks" to analyze allocations. In step [2] CM_2 then receives a resource status "No WS Slots For 802.11 Network" from coexistence manager CM_2. Also, CM_2 then receives a resource status "Using 4 TVWS Slots For WMAN 802.16 Base STA in WMAN Network 'D'" from coexistence manager CM_4, as shown in the spectrum diagram of FIG. 6E. In step [3] CM_1 then sends a reallocation command to CM_4 "WLAN AP STA1 Takes Two TVWS Slots From 802.16 WMAN Network 'D'", as shown in the spectrum diagram of FIG. 6F.

Figure 6A:
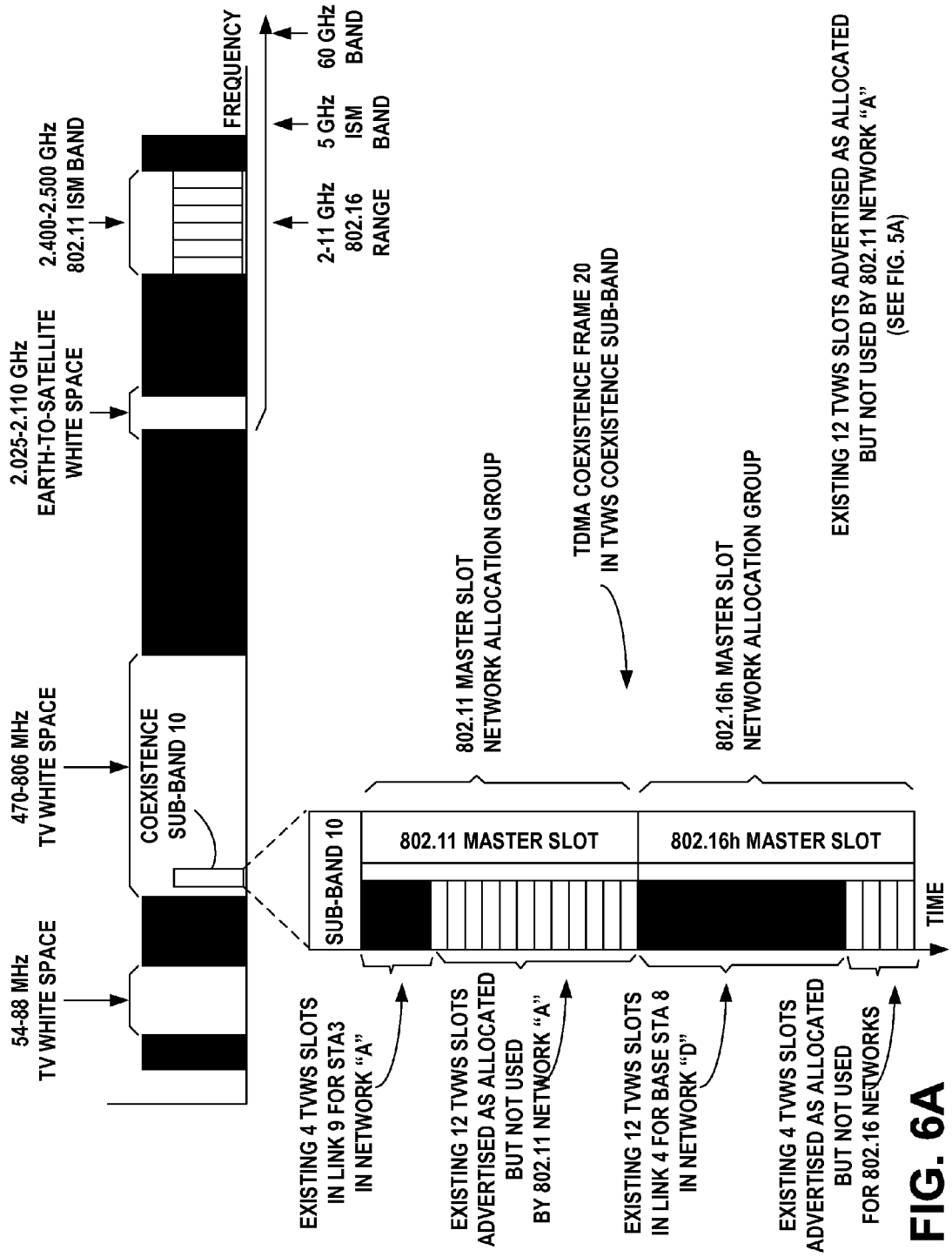
FIG. 6A is an example frequency band diagram illustrating a coexistence sub-band 10 in the TV band white space according to an embodiment of the present invention, illustrating an example of existing twelve TVWS slots advertised as allocated but not used by 802.11 network "A" (see FIG. 5A), according to an embodiment of the present invention.

FIG. 6A is an example frequency band diagram illustrating a coexistence sub-band 10 in the TV band white space according to an embodiment of the present invention, illustrating an example of existing twelve TVWS slots advertised as allocated but not used by 802.11 network "A" (see FIG. 5A).

Also shown in FIG. 6A is the location of the TV white spaces and an example TDMA coexistence frame in the TV band white space, showing the occupancy of the time slots before the WLAN access point STA1 has any slots allocated to the TV band white space. The TV white spaces include 54-88 MHz band and 470-806 MHz band in the electromagnetic spectrum. Other locally unused white spaces may be present in certain geographic locations, such as frequency allocations from 2.025 GHz to 2.110 GHz for earth stations to transmit to communications satellites in areas remote from such earth stations. Also shown is the ISM band at 2.400-2500 GHz, in which the IEEE 802.11 signals are transmitted, for example in WLAN Network "B". For the wireless metropolitan area network (WMAN), the original version of the IEEE 802.16 standard specified a physical layer operating in the 10 to 66 GHz range. IEEE 802.16a, updated in 2004, added specifications for the 2 to 11 GHz range. For this example, example spectrum diagram shows the 2 to 11 GHz range, in which the IEEE 802.16 signals are transmitted, for example in WMAN Network "D".

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

The example TVWS coexistence technique used here is to time division multiplexing different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA1, may include Internet access and geo-location capability. The MAC 142 in the WLAN access point STA1 includes integrated TV white space features to communicate with the radio 128 in channels in the TV white spaces band reallocated by the coexistence manager 102, without mutual interference. The IEEE 802.16h WMAN STA 6, for example, may also include a MAC with integrated TV white space features to communicate using a radio in frequency sub-bands in the TV white spaces band reallocated by the coexistence manager 102, without mutual interference. Other known multiplexing techniques than time, such as frequency multiplexing, code multiplexing, spatial multiplexing, angular multiplexing or any of their combinations, may have an application for coexistence.

The spectrum diagram of FIG. 6A shows the TDMA coexistence frame 20 in TVWS coexistence sub-band. The 802.11 master slot network allocation group includes existing 4 TVWS slots in link 9 for STA3 in network "A" and existing 12 TVWS slots advertised as allocated but not used by 802.11 network "A". The 802.16h master slot network allocation group includes existing 12 TVWS slots in link 4 for base STA8 in network "D" and existing 4 TVWS slots advertised as allocated but not used for 802.16 networks.

Figure 6B:
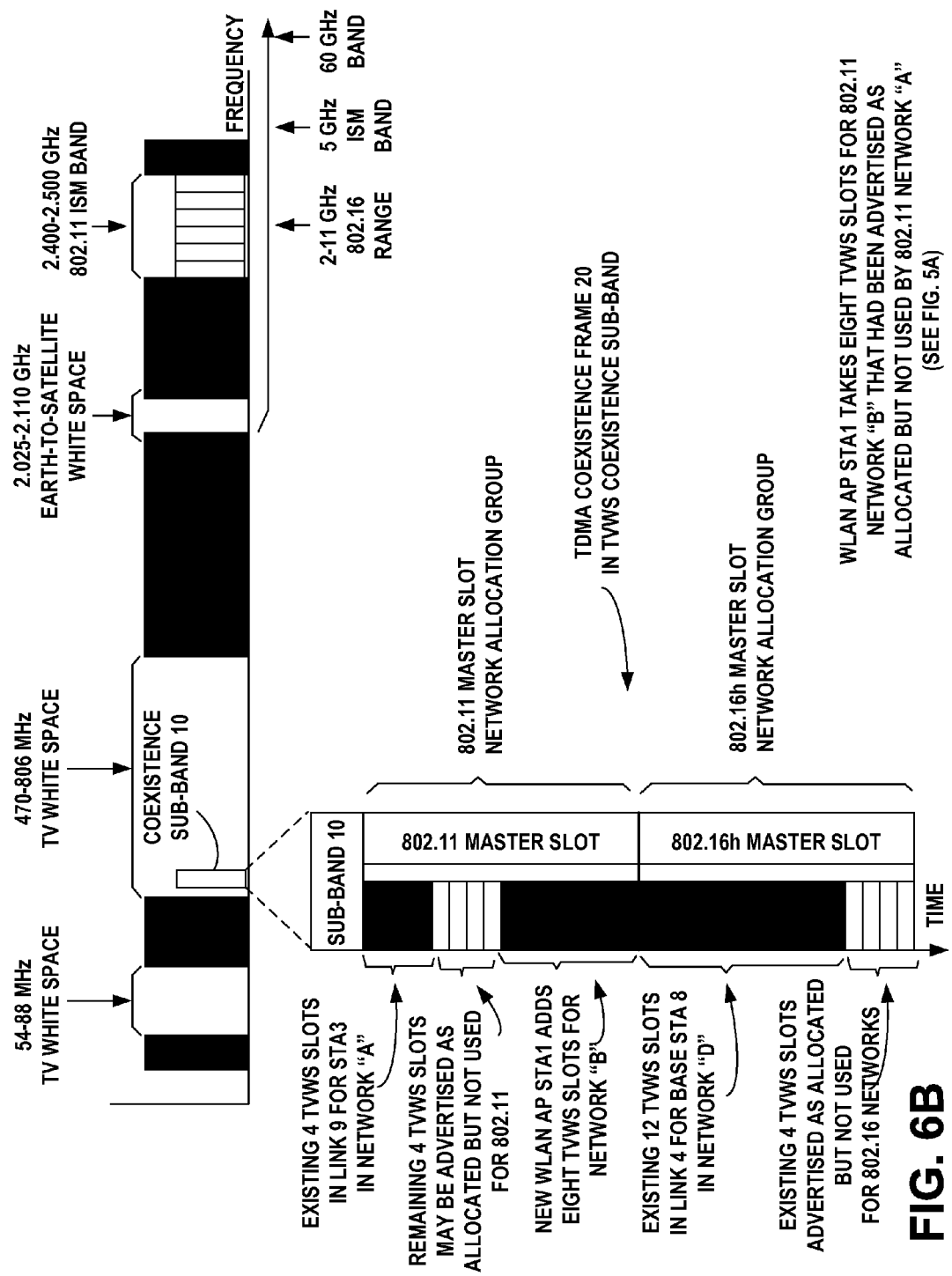
FIG. 6B is an example frequency band diagram illustrating a coexistence sub-band 10 in the TV band white space according to an embodiment of the present invention, illustrating an example of WLAN AP STA1 taking eight TVWS slots for 802.11 network "B" that had been advertised as allocated but not used by 802.11 network "A" (see FIG. 5A), according to an embodiment of the present invention.

FIG. 6B is an example frequency band diagram illustrating a coexistence sub-band 10 in the TV band white space according to an embodiment of the present invention, illustrating WLAN AP STA1 takes eight TVWS slots for 802.11 network "B" that had been advertised as allocated but not used by 802.11 network "A" (See FIG. 5A).

A light reallocation typically is available in the following circumstances:
1. When a secondary network has need for more resources.
2. When a secondary network is releasing resources.

Figure 6C:
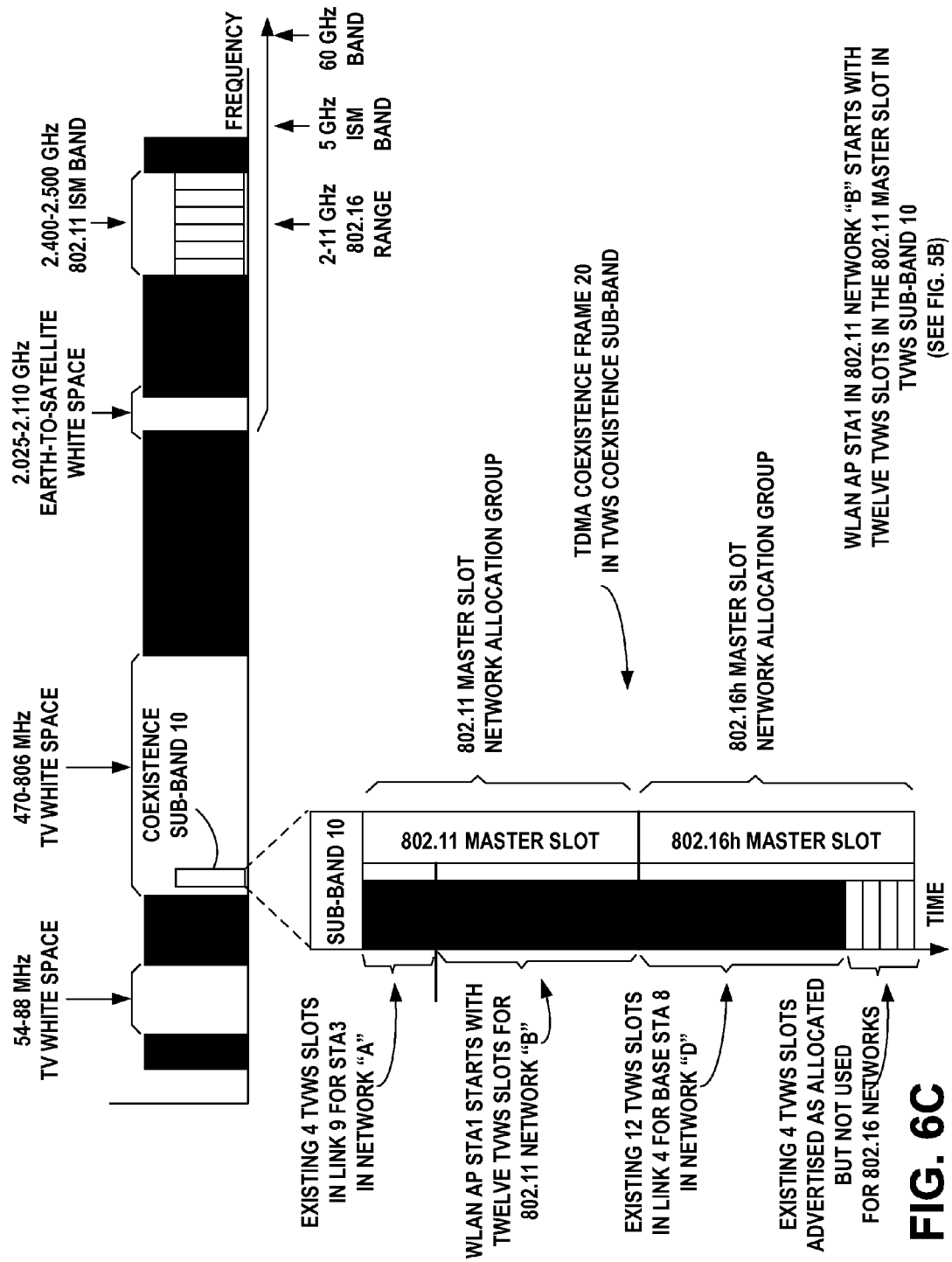
FIG. 6C is an example frequency band diagram illustrating a coexistence sub-band 10 in the TV band white space according to an embodiment of the present invention, illustrating an example of WLAN AP STA1 in 802.11 network "B", which starts with twelve TVWS slots in the 802.11 master slot in TVWS sub-band 10 (see FIG. 5B), according to an embodiment of the present invention.

FIG. 6C is an example frequency band diagram illustrating a coexistence sub-band 10 in the TV band white space according to an embodiment of the present invention, illustrating WLAN AP STA1 in 802.11 network "B" starts with twelve TVWS slots in the 802.11 master slot in TVWS sub-band 10. (See FIG. 5B)

Figure 6D:
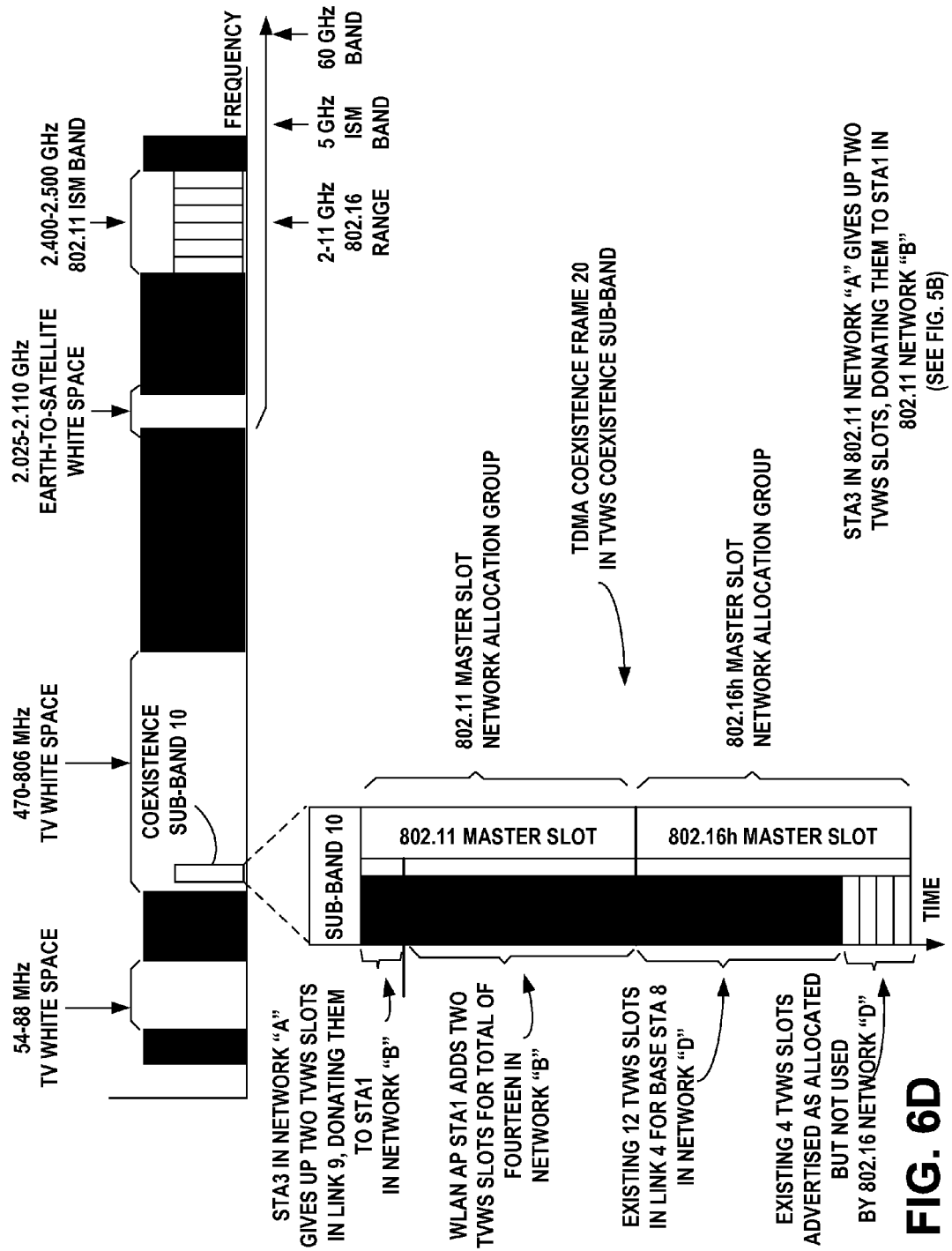
FIG. 6D is an example frequency band diagram illustrating a coexistence sub-band 10 in the TV band white space according to an embodiment of the present invention, illustrating an example of STA3 in 802.11 network "A" giving up two TVWS slots, donating them to STA1 in 802.11 network "B" (see FIG. 5B), according to an embodiment of the present invention.

FIG. 6D is an example frequency band diagram illustrating a coexistence sub-band 10 in the TV band white space according to an embodiment of the present invention, illustrating STA3 in 802.11 network "A" gives up two TVWS slots, donating them to STA1 in 802.11 network "B". (See FIG. 5B)

Figure 6E:
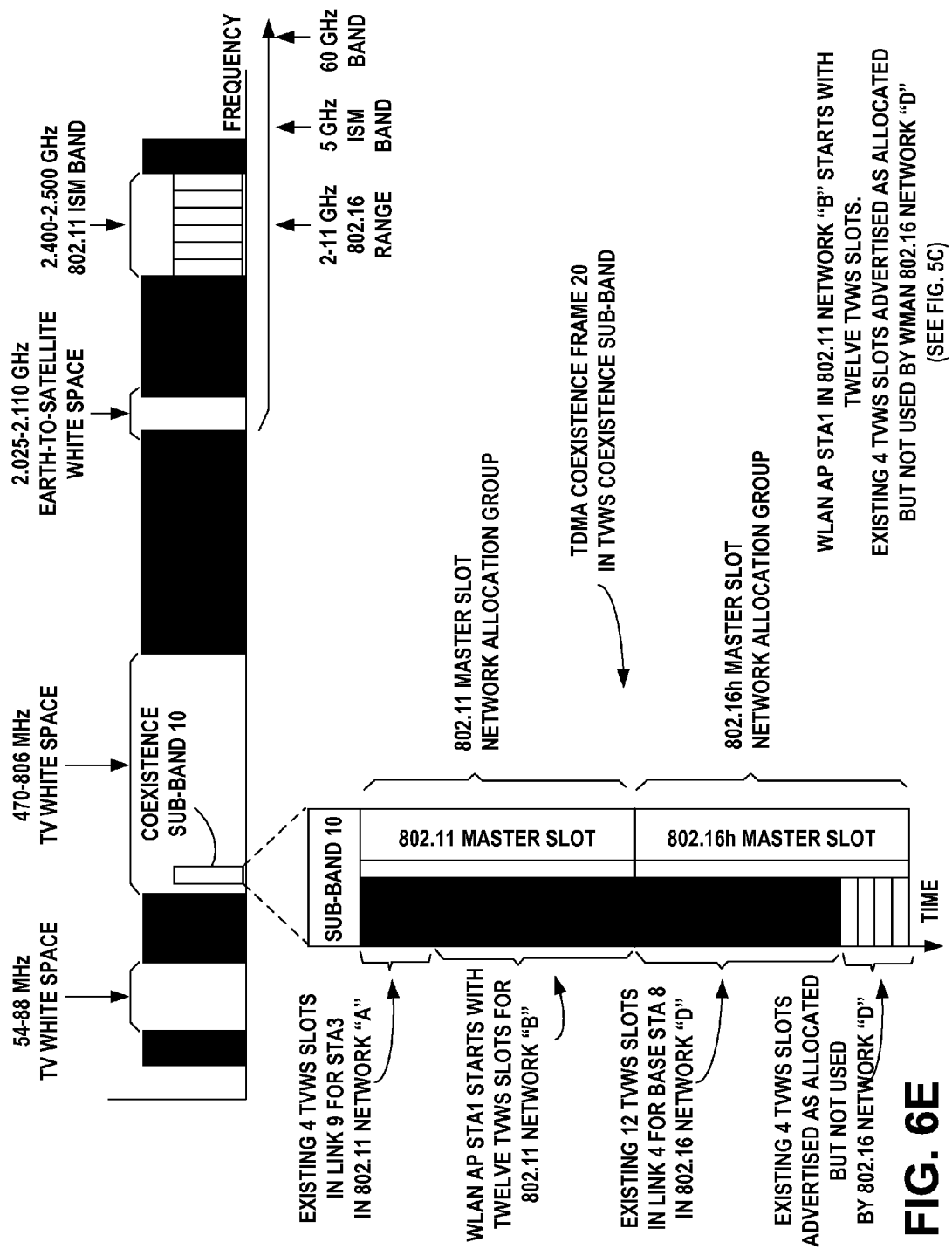
FIG. 6E is an example frequency band diagram illustrating a coexistence sub-band 10 in the TV band white space according to an embodiment of the present invention, illustrating an example of WLAN AP STA1 in 802.11 network "B" starting with twelve TVWS slots. There are also 4 TVWS slots advertised as allocated but not used by WMAN 802.16 network "D" (see FIG. 5C), according to an embodiment of the present invention.

FIG. 6E is an example frequency band diagram illustrating a coexistence sub-band 10 in the TV band white space according to an embodiment of the present invention, illustrating WLAN AP STA1 in 802.11 network "B" starts with twelve TVWS slots existing 4 TVWS slots advertised as allocated but not used by WMAN 802.16 network "D" (See FIG. 5C)

Figure 6F:
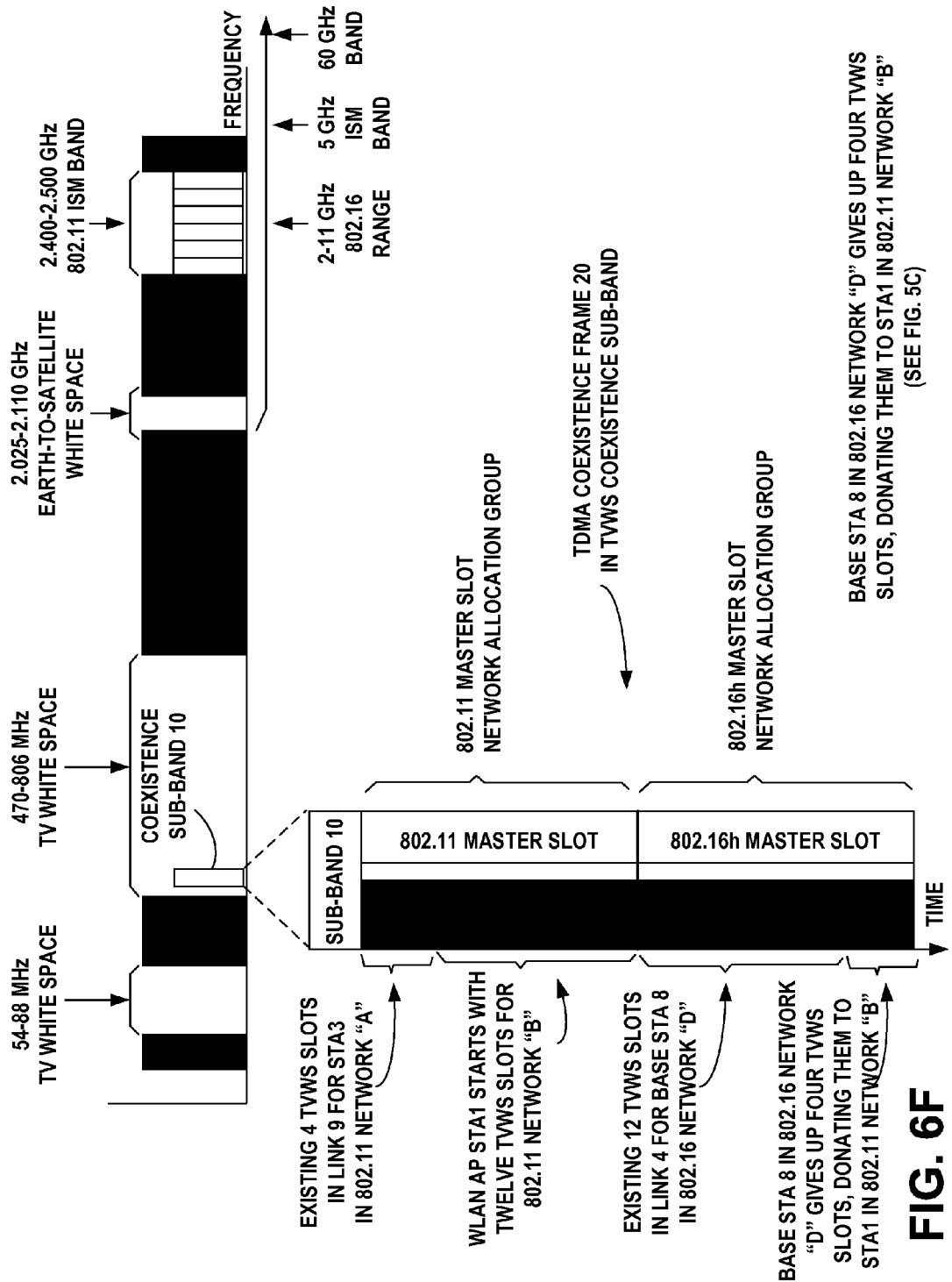
FIG. 6F is an example frequency band diagram illustrating a coexistence sub-band 10 in the TV band white space according to an embodiment of the present invention, illustrating an example of base STA8 in 802.16 network "D" giving up four TVWS slots, donating them to STA1 in 802.11 network "B" (see FIG. 5C), according to an embodiment of the present invention.

FIG. 6F is an example frequency band diagram illustrating a coexistence sub-band 10 in the TV band white space according to an embodiment of the present invention, illustrating base STA 8 in 802.16 network "D" gives up four TVWS slots, donating them to STA1 in 802.11 network "B" (See FIG. 5C)

A more extensive reallocation is typically required in the following circumstances:
1. When a primary user (existing licensed uses, for example, licensed TV broadcaster, etc.) has appeared in a channel currently available for secondary usage, either occupied at the moment by a secondary network or the primary has evacuated a channel.
2. When a new secondary network has entered the area.
3. When interference level by some cause has raised to intolerable level.
4. When a new channel is found available for secondary usage.
5. When a secondary network in the area has closed its operation.

Figure 6G:
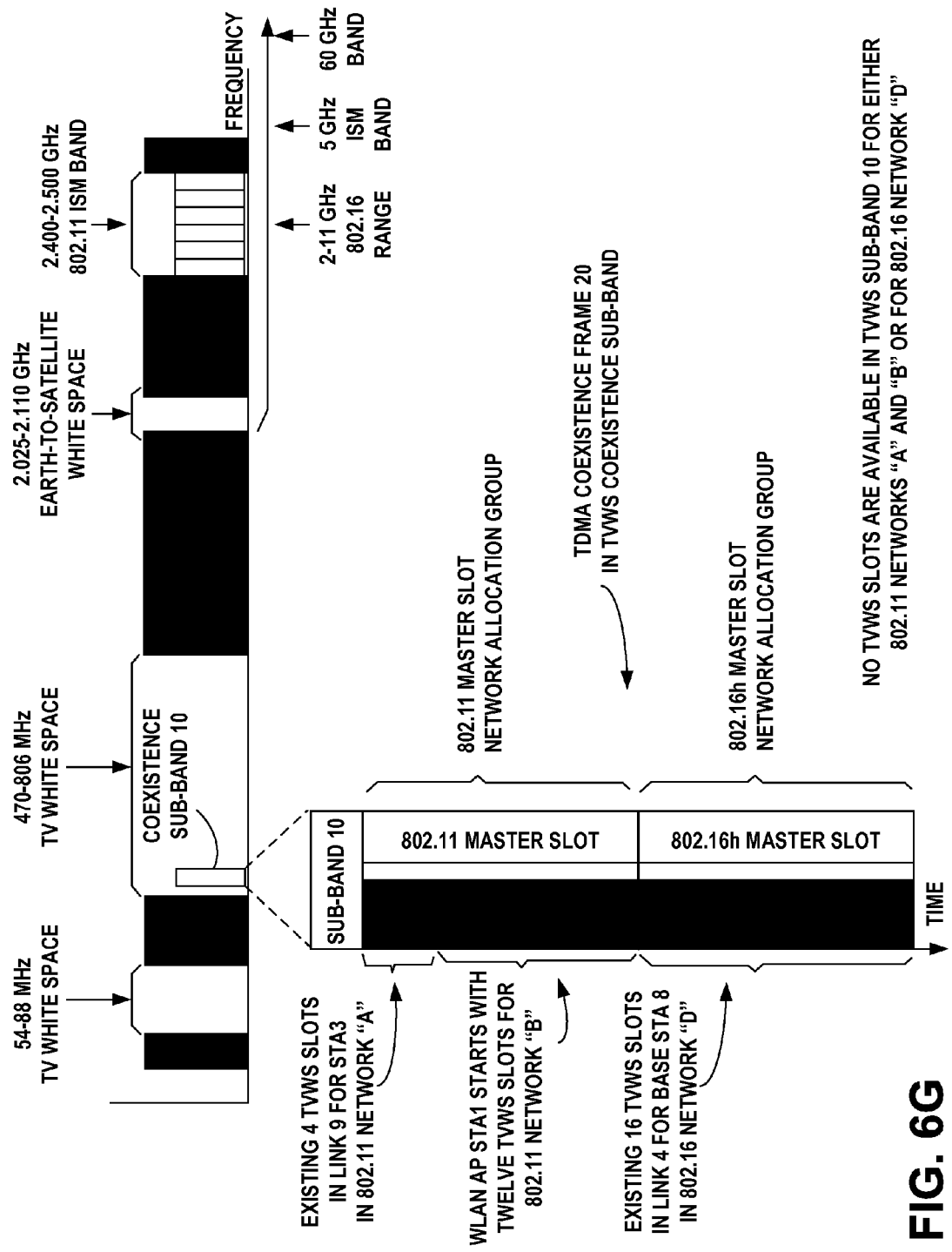
FIG. 6G is an example frequency band diagram illustrating a coexistence sub-band 10 in the TV band white space according to an embodiment of the present invention, illustrating an example of no TVWS slots being available in TVWS sub-band 10 for either 802.11 networks "A" and "B" or for 802.16 network "D", according to an embodiment of the present invention.

FIG. 6G is an example frequency band diagram illustrating a coexistence sub-band 10 in the TV band white space according to an embodiment of the present invention, illustrating no TVWS slots are available in TVWS sub-band 10 for either 802.11 networks "A" AND "B" or for 802.16 network "D".

Figure 6H:
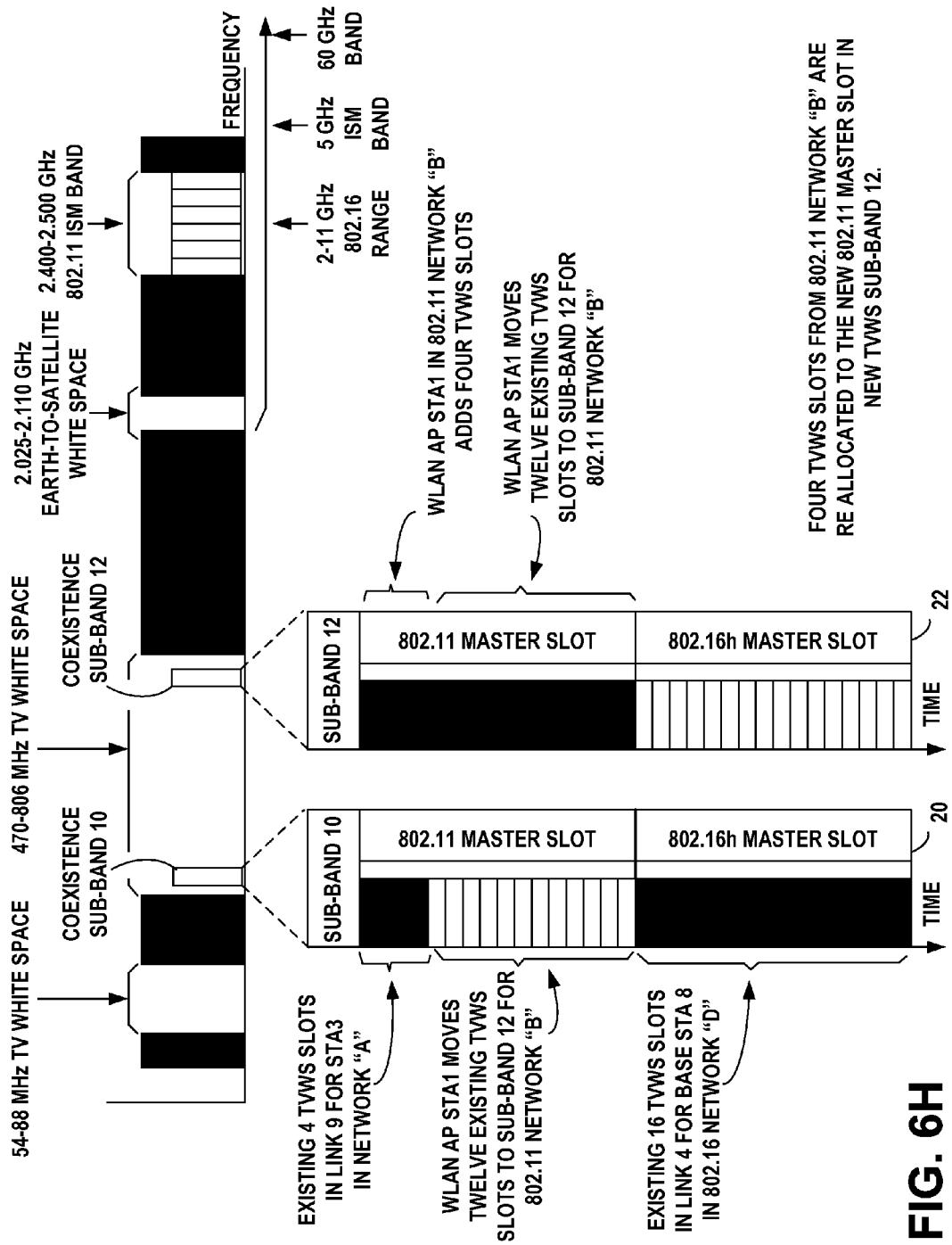
FIG. 6H is an example frequency band diagram illustrating two coexistence sub-bands 10 and 2 in the TV band white space according to an embodiment of the present invention, illustrating an example of four TVWS slots from 802.11 network "B" being re allocated to the new 802.11 master slot in new TVWS sub-band 12, according to an embodiment of the present invention.

FIG. 6H is an example frequency band diagram illustrating two coexistence sub-bands 10 and 2 in the TV band white space according to an embodiment of the present invention, illustrating four TVWS slots from 802.11 network "B" are reallocated to the new 802.11 master slot in new TVWS sub-band 12.

Figure 7:
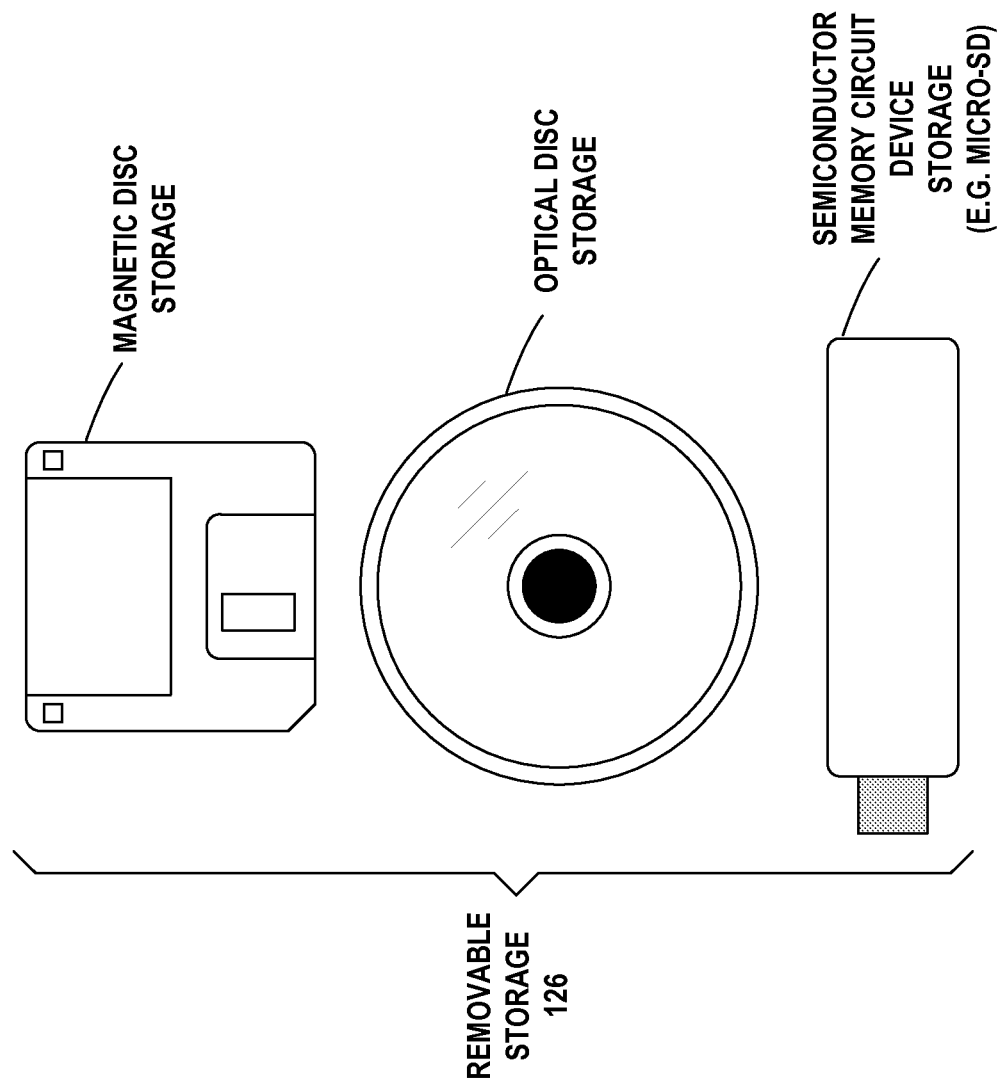
FIG. 7 illustrates an example embodiment of the invention, wherein examples of removable storage media are shown, based on magnetic, electronic and/or optical technologies, such as magnetic disks, optical disks, and semiconductor memory circuit devices for storing data and/or computer program code as an example computer program product, in accordance with at least one embodiment of the present invention.

FIG. 7 illustrates an example embodiment of the invention, wherein examples of removable storage media 126 are shown, based on magnetic, electronic and/or optical technologies, such as magnetic disks, optical disks, and semiconductor memory circuit devices, such as a Micro-SD device, or storing data and/or computer program code as an example computer program product, in accordance with at least one embodiment of the present invention.

Figure 8A:
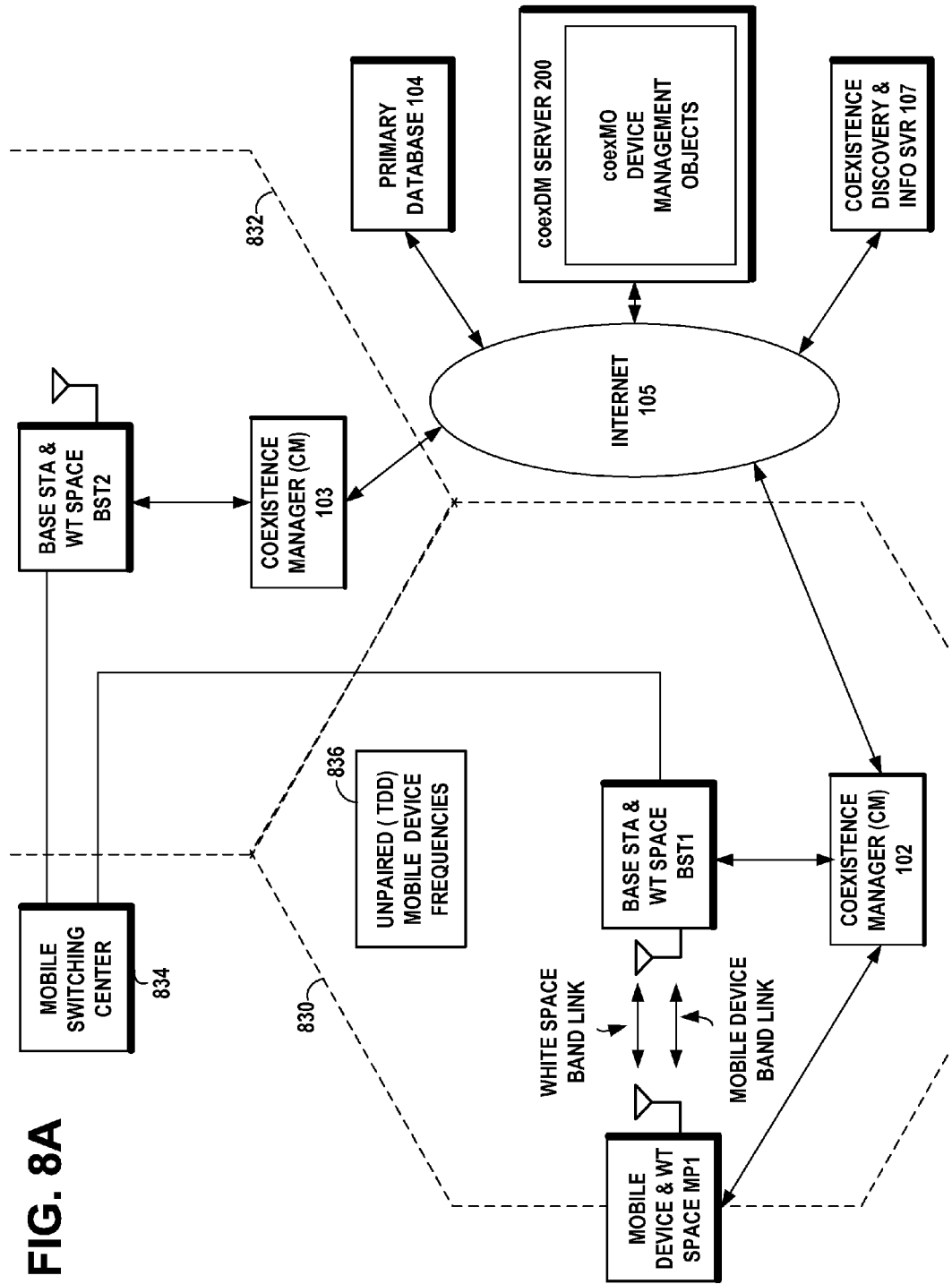
FIG. 8A is an example system architecture according to an example embodiment of the invention, illustrating coexistence management for a mobile device communications system, wherein unpaired time domain duplex frequencies are available for use as a coexistence band for mobile stations and base stations, the figure further illustrating example communication paths over the Internet between network controllers or coexistence managers CMs serving mobile stations and base stations, a device management for coexistence (coexDM) server, a primary database, and a coexistence network element coexistence discovery and Information server (CDIS), in an example embodiment of the invention.

FIG. 8A is an example system architecture according to an example embodiment of the invention, illustrating coexistence management for a communication system, for example a Global System for Mobile Communications (GSM) network. The base stations BST1 and BST2 communicate over the air interface with mobile devices, such as the mobile device MP1, in respective domains 830 and 832. The base stations BST1 and BST2 may be connected to a mobile switching center 834 and to a Home Subscription Server (HSS). The mobile device may connect via the base stations to a Mobility Management Entity (MME), which may contact visitor location and home location registers and authentication server for subscription and authentication. The device may connect via the base stations to the public switched telephone network. In an example packet network architecture, an MME may arrange a Packet Data Network (PDN) gateway connection for the device and may use at least one of an additional serving gateway functionality for the device to connect to the packet network, for example, the Internet. Each base station BST1 and BST2 may be in radio contact with multiple mobile devices, including mobile phones, fixed phones, mobile web browsers, laptops, pads, communicators, tablets, smart devices, PDAs, MP3 players, gaming devices with transceivers, and the like. A base station will generally support a large number of users per cell for example on spectrum allocations from 5 Megahertz (MHz) up to 20 MHz, or by aggregating carriers even up to 100 MHz. However, in such a case, it is expected that the availability of spectrum becomes a critical resource in operations.

In an example embodiment of the invention, the base stations BST1 and BST2 and the mobile device MP1 may be equipped to use unpaired time domain duplex frequencies 836 as a coexistence band. FIG. 8A illustrates example communication paths over the Internet 105 between network controllers or coexistence managers CMs 102 and 103 serving mobile stations such as MP1 and base stations such as BST1 and BST2, the device management for coexistence (coexDM) server 200, the primary database 104, and the coexistence network element coexistence discovery and Information server (CDIS) 107, in an example embodiment of the invention.

In the example embodiment shown in FIG. 8A, the mobile device MP1 may be unable to make a connection in the cell 830 because there are too many other users of the cell. The example system architecture of FIG. 8A shows the coexistence manager 102 forwarding a GET request from the mobile device MP1 in cell 830, the GET request being forwarded to the coexDM server 200. The GET request is to retrieve the device management object for coexistence, coexMO, or a specified sub-tree or node of the coexMO object, expressed as a URL. The GET request will cause the coexDM server 200 to perform a GET function to retrieve the specified device management object or portion thereof and return it to the requesting mobile device MP1. The mobile device MP1 may then be able to apply the device management information provided by the coexDM server 200, to manage coexistence with its neighboring wireless devices in the cell.

Figure 8B:
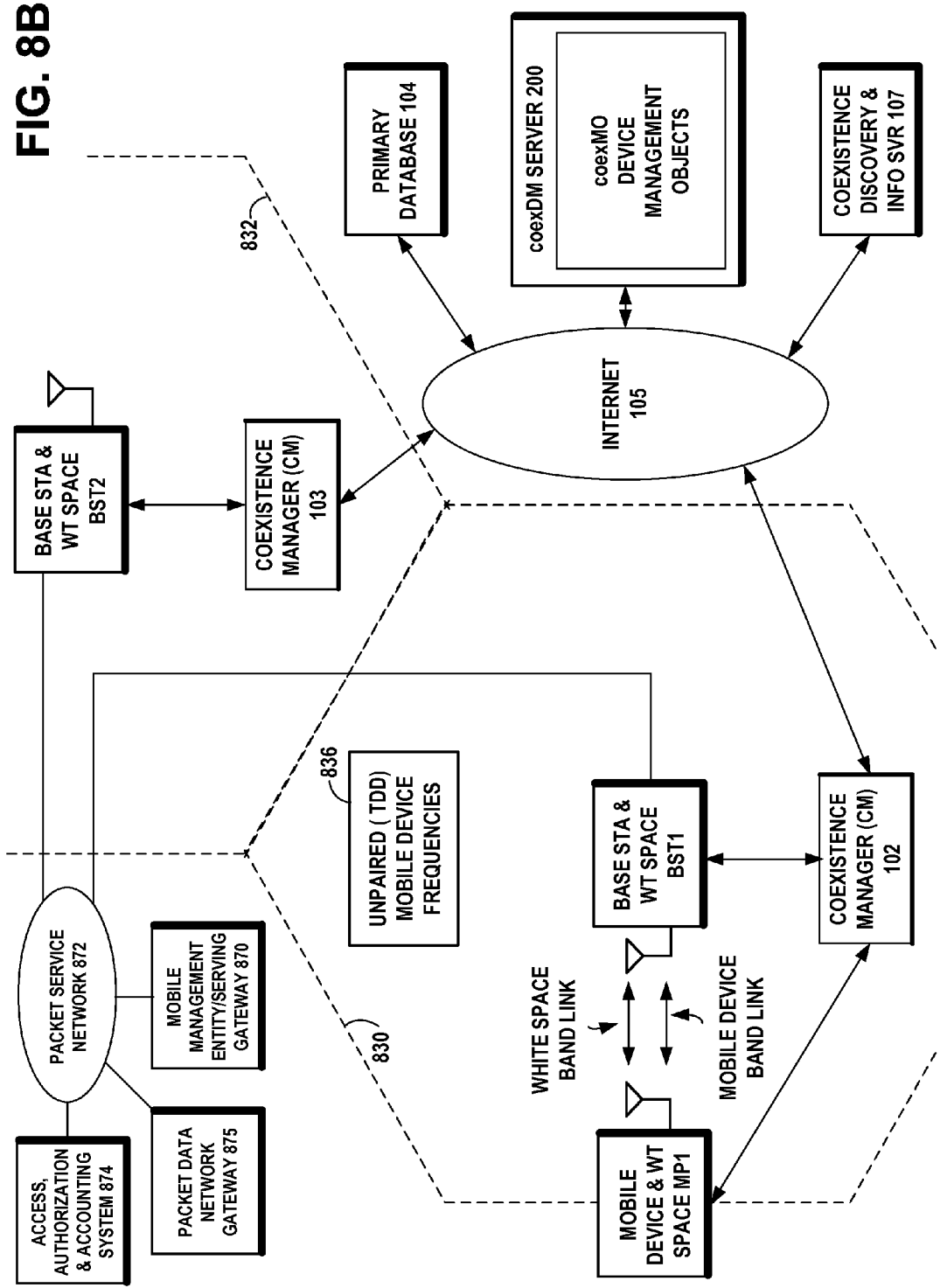
FIG. 8B is an example system architecture according to an example embodiment of the invention, illustrating coexistence management for a mobile device communications system, wherein unpaired time domain duplex frequencies are available for use as a coexistence band for mobile stations and base stations, the figure further illustrating an example communication system having an exemplary long-term evolution (LTE) and E-UTRA (Evolved Universal Terrestrial Radio Access) architectures, in an example embodiment of the invention.

FIG. 8B is an example system architecture according to an example embodiment of the invention, illustrating coexistence management for a system, wherein unpaired time domain duplex frequencies are available for use as a coexistence band for mobile stations and base stations. FIG. 8B further illustrates an example communication system having an exemplary long-term evolution (LTE) and Evolved Universal Terrestrial Radio Access (E-UTRA) architectures, in an example embodiment of the invention.

In an example embodiment of the invention, a base station BST1 and a mobile device MP1 may communicate in the system using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, base stations BST1 and BST2 comprise a radio network of enhanced Node B (eNB) base stations in an Evolved Universal Terrestrial Radio Access Network (EUTRAN).

In an example embodiment of the invention, the base stations BST1 and BST2 and the mobile device MP1 are equipped to use unpaired time domain duplex frequencies 836 as a coexistence band. FIG. 8B illustrates example communication paths over the Internet 105 between network controllers or coexistence managers CMs 102 and 103 mobile stations such as MP1 and base stations such as BST1 and BST2, the device management for coexistence (coexDM) server 200, the primary database 104, and the coexistence network element coexistence discovery and Information server (CDIS) 107, in an example embodiment of the invention.

In an example embodiment of the invention, as shown in FIG. 8B, one or more mobile devices MP1 communicate with a base station BST1, which is part of an access network, such as, WiMAX (Worldwide Interoperability for Microwave Access), 3GPP LTE (or EUTRAN), for example. Under the 3GPP LTE architecture, base station BST1 may be denoted as an enhanced Node B (eNB).

In an example embodiment of the invention, at least one of a Mobile Management Entity (MME) and a Serving Gateway 870 may be connected to the base stations BST1 and BST2 in a configuration using tunneling over a packet transport network, for example, an Internet Protocol (IP) network 872. Exemplary functions of the MME/Serving gateway 870 include distribution of paging messages to the base stations BST1 and BST2, and mobility management of the mobile device. The Serving gateway 870 serves as a gateway to external networks, for example, the Internet or private networks 872. The Access, Authorization and Accounting system (AAA) 874 acts to securely determine the identity and privileges of a user and the connections to the services he uses by the mobile device. The MME 870 may act as an important control-node for the LTE access-network and may be responsible for idle mode tracking and paging procedure for mobile devices. The MME/Serving gateway 870 may also be involved in the bearer activation/deactivation process and may be responsible for selecting the Packet Data Network Gateway (PGW) 875 for a mobile device, for example, at the initial attach.

A more detailed description of the LTE architecture is provided in 3GPP TR 25.813, entitled *E-UTRA and E-UTRAN: Radio Interface Protocol Aspects*, Rel/7, Sep. 22, 2006, which is incorporated herein by reference in its entirety.

Figure 8C:
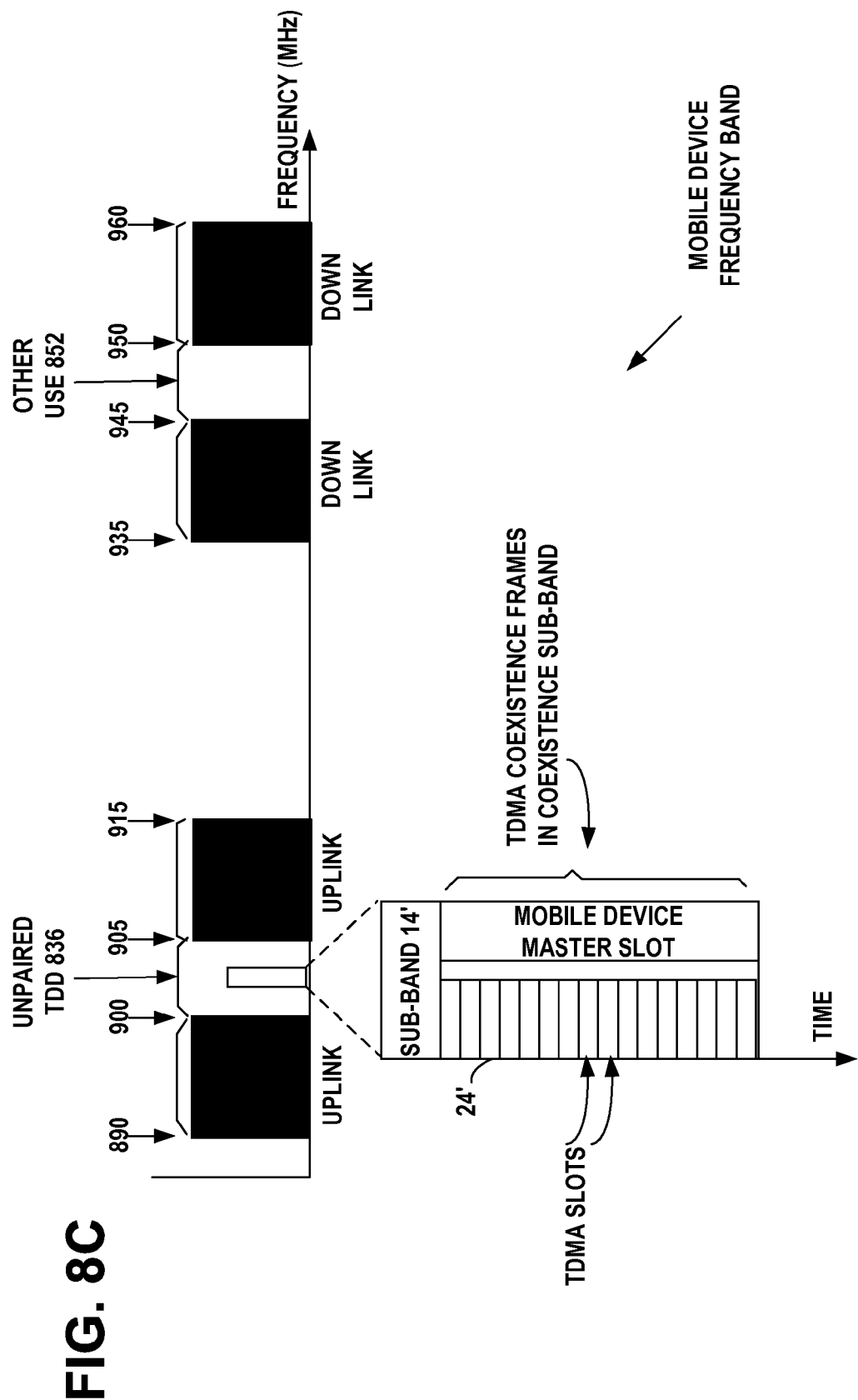
FIG. 8C is an example frequency band diagram illustrating an example TDMA coexistence frame 24' in sub-band 14' in an unpaired time domain duplex frequency white space of 900 to 905 MHz in the uplink portion of a mobile device communications frequency band, according to an example embodiment of the invention.

In an example embodiment of the invention, FIG. 8C is an example frequency band diagram illustrating an example TDMA coexistence frame 24' in sub-band 14' in an unpaired time domain duplex frequency white space 836 of 900 to 905 MHz in the uplink portion of a mobile device frequency band, according to an example embodiment of the invention. FIG. 8C illustrates an example frequency plan for the example mobile device frequency band, with an uplink portion between 890 and 915 MHz and a down link portion between 935 and 960 MHz, similar to a portion of the frequency plan for GSM. In the example frequency plan shown in FIG. 8C, a 5 MHz band between 945 and 950 MHz in the down link portion is reserved for other uses, for example as an emergency services band. Since the time domain duplex operation of the mobile device system requires matched uplink frequencies to the allocated down link frequencies, there is an unpaired band between 900 and 905 MHz in the uplink portion. In accordance with an example embodiment of the invention, the unpaired band between 900 and 905 MHz is used as a coexistence band. FIG. 8A shows an example TDMA coexistence frame 24' in sub-band 14' in the unpaired time domain duplex frequency white space 836 in the uplink portion of the mobile device frequency band.

Figure 8D:
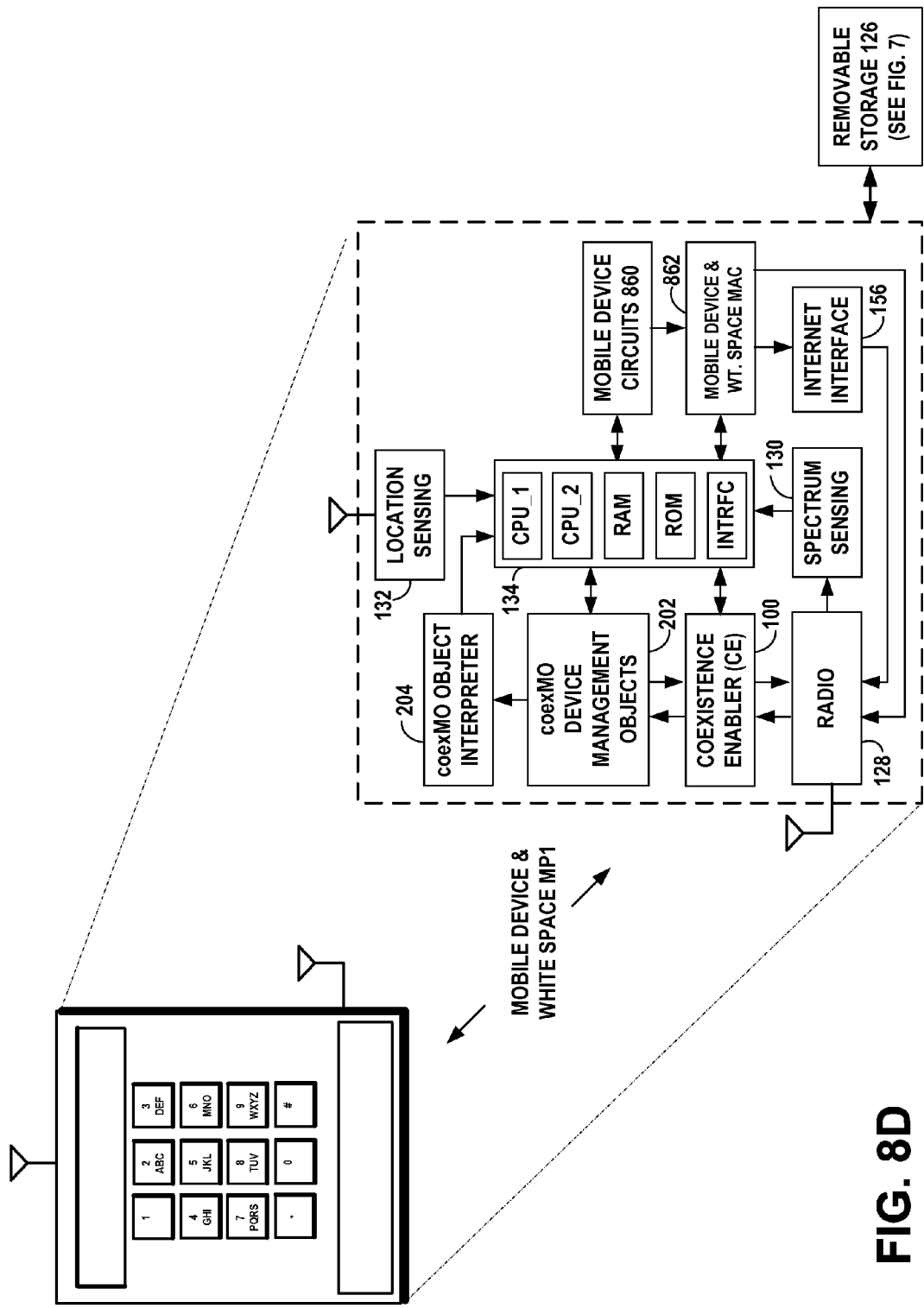
FIG. 8D is a functional block diagram according to an example embodiment of the invention, illustrating an example mobile communications device with white space capability, including a cache storing the device management object (coexMO), a coexMO Object interpreter, and the control node or coexistence enabler for the mobile device. The device may be configured to operate in an example unpaired time domain duplex frequency white space of 900 to 905 MHz in the uplink portion of a mobile device frequency band, in an example embodiment of the invention. The device may be configured to operate in example unpaired allocations in the downlink portion of the mobile device frequency band. The device may be configured to operate in example unpaired allocations; in general, large proportions of frequency bands are available for unpaired allocations.

In an example embodiment of the invention, FIG. 8D is a functional block diagram according to an example embodiment of the invention, illustrating an example mobile device having white space capability, MP1. The mobile device MP1 includes mobile device circuits 860 and mobile device and white space MAC 862. The mobile device MP1 includes a cache 202 storing the device management object (coexMO), a coexMO Object interpreter 204, and a control node or coexistence enabler 100 for the mobile device MP1. The mobile device MP1 may be configured to operate in an example unpaired time domain duplex frequency white space 836 of 900 to 905 MHz in the uplink portion of the mobile device frequency band of FIG. 8C, in an example embodiment of the invention.

In an example embodiment of the invention, the example mobile device MP1 of FIG. 8D may transmit a GET request to the coexDM server 200 to retrieve the device management object for coexistence, coexMO, or a specified sub-tree or node of the coexMO object, expressed as a URL. The mobile device MP1 may then apply the device management information provided by the coexDM server 200, to manage coexistence with its neighboring wireless devices in the cell.

The mobile device MP1 of FIG. 8D includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, and semiconductor memory circuit devices are shown at 126 and in FIG. 7, and may serve, for instance, as a data input/output means. Code may include any interpreted or compiled computer language including computer-executable instructions. The code and/or data may be used to create software modules such as operating systems, communication utilities, user interfaces, more specialized program modules, etc.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, phone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    receiving, by an apparatus, a request for a device management object for coexistence information, from a mobile wireless device, the request including at least location information of the mobile wireless device;
    accessing, by the apparatus, a dedicated database to obtain a description of allowed spectrum at the location of the mobile wireless device;
    composing, by the apparatus, a device management object that includes the description of allowed spectrum at the location of the mobile wireless device, based at least on the location information of the mobile wireless device, wherein the device management object is a subtree of a device management objects tree, the subtree including information for coexistence with neighboring wireless networks of the mobile wireless device, including frequency of shared spectrum, validity of granted access, power limits of granted access, and allowed device type; and
    transmitting, by the apparatus, the device management object to the requesting mobile wireless device.

2. The method of claim 1, further comprising:
    the request being received from a network controller serving a control node associated with the mobile wireless device; and
    the requested device management object information being provided to the mobile wireless device via the network controller and the control node.

3. The method of claim 1, further comprising:
    wherein the request is a GET command for accessing the device management object for coexistence, to be accessed from a device management objects tree.

4. The method of claim 1, further comprising:
    wherein the device management object information includes one or more descriptions of
        price and charging mechanism of granted access,
        certification requirements,
        radio systems and their priorities for access,
        known incompatibilities,
        scaling rules,
        measurements,
        device types, or
        variation of the device management information by device type.

5. The method of claim 1, further comprising:
    wherein provisioning the requested device management object information is performed with a PUSH command to the mobile wireless device.

6. The method of claim 1, further comprising:
    comparing, by the apparatus, the device management object information with reference device management object information;
    replacing, by the apparatus, at least a portion of the device management object information with a corresponding at least a portion of the reference device management object information; and
    providing, by the apparatus, the at least a portion of the reference device management object information to the mobile wireless device.

7. A method, comprising:
    transmitting a request, by a mobile wireless device in a wireless network, requesting a device management object for coexistence information for coexistence with neighboring wireless networks of the mobile wireless device, wherein the device management object is a subtree of a device management objects tree, the subtree including information for coexistence with neighboring wireless networks of the mobile wireless device, including frequency of shared spectrum, validity of granted access, power limits of granted access, and allowed device type; and receiving, by the mobile wireless device in the wireless network, at least a portion of the requested device management object information including descriptions of allowed spectrum access based on at least location of the mobile wireless device;
wherein the at least a portion of the requested device management object information is composed from a description of allowed spectrum at the location of the mobile wireless device, accessed from a dedicated database.

8. The method of claim 7, further comprising:
the mobile wireless device being associated with a control entity served by a network controller, and
the transmitting and receiving being via the control entity and the network controller.

9. The method of claim 7, further comprising:
wherein the request is a GET command for accessing the device management object for coexistence, to be accessed from a device management objects tree in a server.

10. The method of claim 7, further comprising:
wherein the device management object information includes one or more descriptions of
price and charging mechanism of granted access,
certification requirements,
radio systems and their priorities for access,
known incompatibilities,
scaling rules,
measurements,
device types, or
variation of the device management information by device type.

11. The method of claim 7, further comprising:
wherein the receiving the requested device management object information is performed with a PUSH command to the mobile wireless device.

12. The method of claim 7, further comprising:
wherein the device management object information is a subtree of a device management objects tree in a server, the subtree including information for coexistence with neighboring wireless networks of the mobile wireless device; and
applying in the mobile wireless device, the device management information, to manage coexistence with neighboring wireless networks of the mobile wireless device.

13. An apparatus, comprising:
at least one processor;
at least one memory including computer program code;
the at least one memory and the computer program code configured to, with the at least one processor, cause the apparatus at least to:
receive a request for a device management object for coexistence information, from a mobile wireless device, the request including at least location information of the mobile wireless device;
access a dedicated database to obtain a description of allowed spectrum at the location of the mobile wireless device;
compose a device management object that includes the description of allowed spectrum at the location of the mobile wireless device, based at least on the location information of the mobile wireless device, wherein the device management object is a subtree of a device management objects tree, the subtree including information for coexistence with neighboring wireless networks of the mobile wireless device, including frequency of shared spectrum, validity of granted access, power limits of granted access, and allowed device type; and
transmit the device management object to the requesting mobile wireless device.

14. The apparatus of claim 13, further comprising:
the request being received from a network controller serving a control node associated with the mobile wireless device; and
the requested device management object information being provided to the mobile wireless device via the network controller and the control node.

15. The apparatus of claim 13, further comprising:
the at least one memory and the computer program code configured to, with the at least one processor, cause the apparatus at least to:
compare the device management object information with reference device management object information;
replace at least a portion of the device management object information with a corresponding at least a portion of the reference device management object information; and
provide the reference device management object information to the mobile wireless device.

16. An apparatus, comprising:
at least one processor;
at least one memory including computer program code;
the at least one memory and the computer program code configured to, with the at least one processor, cause the apparatus at least to:
transmit a request requesting a device management object for coexistence information for coexistence with neighboring wireless networks of the apparatus, wherein the device management object is a subtree of a device management objects tree, the subtree including information for coexistence with neighboring wireless networks of the mobile wireless device, including frequency of shared spectrum, validity of granted access, power limits of granted access, and allowed device type; and
receive at least a portion of the requested device management object information including descriptions of allowed spectrum access based on at least location of the apparatus;
wherein the at least a portion of the requested device management object information is composed from a description of allowed spectrum at the location of the mobile wireless device, accessed from a dedicated database.

17. The apparatus of claim 16, further comprising:
the apparatus being associated with a control node served by a network controller, and
the transmitting and receiving being via the control node and the network controller.

18. The apparatus of claim 16, further comprising:
wherein the device management object information is a subtree of a device management objects tree in a server, the subtree including information for coexistence with neighboring wireless networks of the apparatus;
the at least one memory and the computer program code configured to, with the at least one processor, cause the apparatus at least to:
apply in the apparatus, the device management object information, to manage coexistence with neighboring wireless networks of the apparatus.

19. A computer program product comprising computer executable program code recorded on a computer readable, non-transitory storage medium, the computer executable program code comprising:
code for receiving, by an apparatus, a request for a device management object for coexistence information, from a mobile wireless device, the request including at least location information of the mobile wireless device;

accessing, by the apparatus, a dedicated database to obtain a description of allowed spectrum at the location of the mobile wireless device;

composing, by the apparatus, a device management object that includes the description of allowed spectrum at the location of the mobile wireless device, based at least on the location information of the mobile wireless device, wherein the device management object is a subtree of a device management objects tree, the subtree including information for coexistence with neighboring wireless networks of the mobile wireless device, including frequency of shared spectrum, validity of granted access, power limits of granted access, and allowed device type; and transmitting, by the apparatus, the device management object to the requesting mobile wireless device.

20. A computer program product comprising computer executable program code recorded on a computer readable, non-transitory storage medium, the computer executable program code comprising:

code for transmitting a request, by a mobile wireless device in a wireless network, requesting a device management object for coexistence information for coexistence with neighboring wireless networks of the mobile wireless device, wherein the device management object is a subtree of a device management objects tree, the subtree including information for coexistence with neighboring wireless networks of the mobile wireless device, including frequency of shared spectrum, validity of granted access, power limits of granted access, and allowed device type; and code for receiving, by the mobile wireless device in the wireless network, at least a portion of the requested device management object information including descriptions of allowed spectrum access based on at least location of the mobile wireless device;

wherein the at least a portion of the requested device management object information is composed from a description of allowed spectrum at the location of the mobile wireless device, accessed from a dedicated database.

21. A method, comprising:

receiving, by an apparatus, a request for a device management object for coexistence information, from a mobile wireless device, the request including at least location information of the mobile wireless device;

accessing, by the apparatus, a dedicated database to obtain a description of allowed spectrum at the location of the mobile wireless device;

composing, by the apparatus, a device management object that includes the description of allowed spectrum at the location of the mobile wireless device, based at least on the location information of the mobile wireless device, wherein the device management object is a subtree of a device management objects tree, the subtree including information for coexistence with neighboring wireless networks of the mobile wireless device, including frequency of shared spectrum and validity of granted access; and transmitting, by the apparatus, the device management object to the requesting mobile wireless device.

22. A method, comprising:

transmitting a request, by a mobile wireless device in a wireless network, requesting a device management object for coexistence information for coexistence with neighboring wireless networks of the mobile wireless device, wherein the device management object is a subtree of a device management objects tree, the subtree including information for coexistence with neighboring wireless networks of the mobile wireless device, including frequency of shared spectrum and validity of granted access; and receiving, by the mobile wireless device in the wireless network, at least a portion of the requested device management object information including descriptions of allowed spectrum access based on at least location of the mobile wireless device;

wherein the at least a portion of the requested device management object information is composed from a description of allowed spectrum at the location of the mobile wireless device, accessed from a dedicated database.

23. An apparatus, comprising:

at least one processor;

at least one memory including computer program code;

the at least one memory and the computer program code configured to, with the at least one processor, cause the apparatus at least to:

receive a request for a device management object for coexistence information, from a mobile wireless device, the request including at least location information of the mobile wireless device;

access a dedicated database to obtain a description of allowed spectrum at the location of the mobile wireless device;

compose a device management object that includes the description of allowed spectrum at the location of the mobile wireless device, based at least on the location information of the mobile wireless device, wherein the device management object is a subtree of a device management objects tree, the subtree including information for coexistence with neighboring wireless networks of the mobile wireless device, including frequency of shared spectrum and validity of granted access; and transmit the device management object to the requesting mobile wireless device.

24. An apparatus, comprising:

at least one processor;

at least one memory including computer program code;

the at least one memory and the computer program code configured to, with the at least one processor, cause the apparatus at least to:

transmit a request requesting a device management object for coexistence information for coexistence with neighboring wireless networks of the apparatus, wherein the device management object is a subtree of a device management objects tree, the subtree including information for coexistence with neighboring wireless networks of the mobile wireless device, including frequency of shared spectrum and validity of granted access; and receive at least a portion of the requested device management object information including descriptions of allowed spectrum access based on at least location of the apparatus;

wherein the at least a portion of the requested device management object information is composed from a description of allowed spectrum at the location of the mobile wireless device, accessed from a dedicated database.

25. A computer program product comprising computer executable program code recorded on a computer readable, non-transitory storage medium, the computer executable program code comprising:

code for receiving, by an apparatus, a request for a device management object for coexistence information, from a mobile wireless device, the request including at least location information of the mobile wireless device;

accessing, by the apparatus, a dedicated database to obtain a description of allowed spectrum at the location of the mobile wireless device;

composing, by the apparatus, a device management object that includes the description of allowed spectrum at the location of the mobile wireless device, based at least on the location information of the mobile wireless device, wherein the device management object is a subtree of a device management objects tree, the subtree including information for coexistence with neighboring wireless networks of the mobile wireless device, including frequency of shared spectrum and validity of granted access;

and transmitting, by the apparatus, the device management object to the requesting mobile wireless device.

26. A computer program product comprising computer executable program code recorded on a computer readable, non-transitory storage medium, the computer executable program code comprising:

code for transmitting a request, by a mobile wireless device in a wireless network, requesting a device management object for coexistence information for coexistence with neighboring wireless networks of the mobile wireless device, wherein the device management object is a subtree of a device management objects tree, the subtree including information for coexistence with neighboring wireless networks of the mobile wireless device, including frequency of shared spectrum and validity of granted access; and code for receiving, by the mobile wireless device in the wireless network, at least a portion of the requested device management object information including descriptions of allowed spectrum access based on at least location of the mobile wireless device;

wherein the at least a portion of the requested device management object information is composed from a description of allowed spectrum at the location of the mobile wireless device, accessed from a dedicated database.

* * * * *